US007692688B2

(12) United States Patent
Kurata

(10) Patent No.: US 7,692,688 B2
(45) Date of Patent: Apr. 6, 2010

(54) METHOD FOR CORRECTING DISTORTION OF CAPTURED IMAGE, DEVICE FOR CORRECTING DISTORTION OF CAPTURED IMAGE, AND IMAGING DEVICE

(75) Inventor: Tohru Kurata, Saitama (JP)

(73) Assignee: Sony Corporation, Tokyo (JP)

( * ) Notice: Subject to any disclaimer, the term of this patent is extended or adjusted under 35 U.S.C. 154(b) by 418 days.

(21) Appl. No.: 11/673,283

(22) Filed: Feb. 9, 2007

(65) Prior Publication Data
US 2007/0188619 A1    Aug. 16, 2007

(30) Foreign Application Priority Data
Feb. 13, 2006    (JP) .................. P2006-035341

(51) Int. Cl.
*H04N 5/228* (2006.01)
(52) U.S. Cl. .................................. 348/208.5
(58) Field of Classification Search ............ 348/208.99, 348/208.4, 208.5
See application file for complete search history.

(56) References Cited
U.S. PATENT DOCUMENTS
6,144,405 A * 11/2000 Toba ................... 348/208.4

6,573,930 B2 * 6/2003 Kyuma et al. ............ 348/208.5

FOREIGN PATENT DOCUMENTS

| JP | 6-86149 | 3/1994 |
|---|---|---|
| JP | 7-283999 | 10/1995 |
| JP | 2001-250119 | 9/2001 |
| JP | 3303312 | 7/2002 |
| JP | 3384459 | 12/2002 |
| JP | 2005-038396 | 2/2005 |
| JP | 2005-328117 | 11/2005 |

* cited by examiner

*Primary Examiner*—Justin P Misleh
(74) *Attorney, Agent, or Firm*—K&L Gates LLP

(57) ABSTRACT

A method for correcting distortion of a captured image is provided. The method includes receiving a detection output from a sensor; optically correcting distortion of a captured image in image data from the element due to the positional change of the imaging element by controlling a control mechanism depending on the detection output in the receiving step, the mechanism being configured to control a position at which incident light from a target object enters the imaging element; receiving image data resulting from the optical correction of a captured image in the correcting step from the element, and detecting a motion vector per one screen of a captured image from the image data; and further correcting distortion of a captured image due to the positional change of the imaging element for the image data from the imaging element based on the motion vector detected in the motion vector detecting step.

4 Claims, 47 Drawing Sheets

$$dx = \frac{\sum (Sxy \cdot Kx)}{4 \sum Sxy - 6 \sum (Sxy \cdot Kx^2)} \quad \cdots \text{(EQUATION A)}$$

$$dy = \frac{\sum (Sxy \cdot Ky)}{4 \sum Sxy - 6 \sum (Sxy \cdot Ky^2)} \quad \cdots \text{(EQUATION B)}$$

WHERE:

Kx = -1 IF x = -1         Ky = -1 IF y = -1
Kx = 0 IF x = 0           Ky = 0 IF y = 0
Kx = 1 IF x = 1           Ky = 1 IF y = 1

$$dx = \frac{8 \sum (Sxy \cdot Kx)}{25 \sum Sxy - 20 \sum (Sxy \cdot Kx^2)} + \Delta x \quad \cdots \text{(EQUATION C)}$$

$$dx = \frac{8 \sum (Sxy \cdot Ky)}{25 \sum Sxy - 20 \sum (Sxy \cdot Ky^2)} + \Delta y \quad \cdots \text{(EQUATION D)}$$

FIG. 18

SECTION Ra $$u = \frac{2S_3 - 11S_2 + 16S_1 - 7S_0 + \sqrt{(4S_3 - 7S_2 + 2S_1 + S_0)^2 + 15(S_3 - 3S_2 + 3S_1 - S_0)(S_1 - S_3)}}{3(S_3 - 3S_2 + 3S_1 - S_0)} \quad \cdots \text{(EQUATION E)}$$

SECTION Rb $$u = \frac{S_3 - 4S_2 + 5S_1 - 2S_0 + \sqrt{(S_3 - 5S_2 + 5S_1 - S_0)^2 + (S_2 - S_0)(S_1 - S_3)}}{3(S_3 - 3S_2 + 3S_1 - S_0)} \quad \cdots \text{(EQUATION F)}$$

SECTION Rc $$u = \frac{-4S_3 + 7S_2 - 2S_1 - S_0 + \sqrt{(4S_3 - 7S_2 + 2S_1 + S_0)^2 + 15(S_3 - 3S_2 + 3S_1 - S_0)(S_1 - S_3)}}{3(S_3 - 3S_2 + 3S_1 - S_0)} \quad \cdots \text{(EQUATION G)}$$

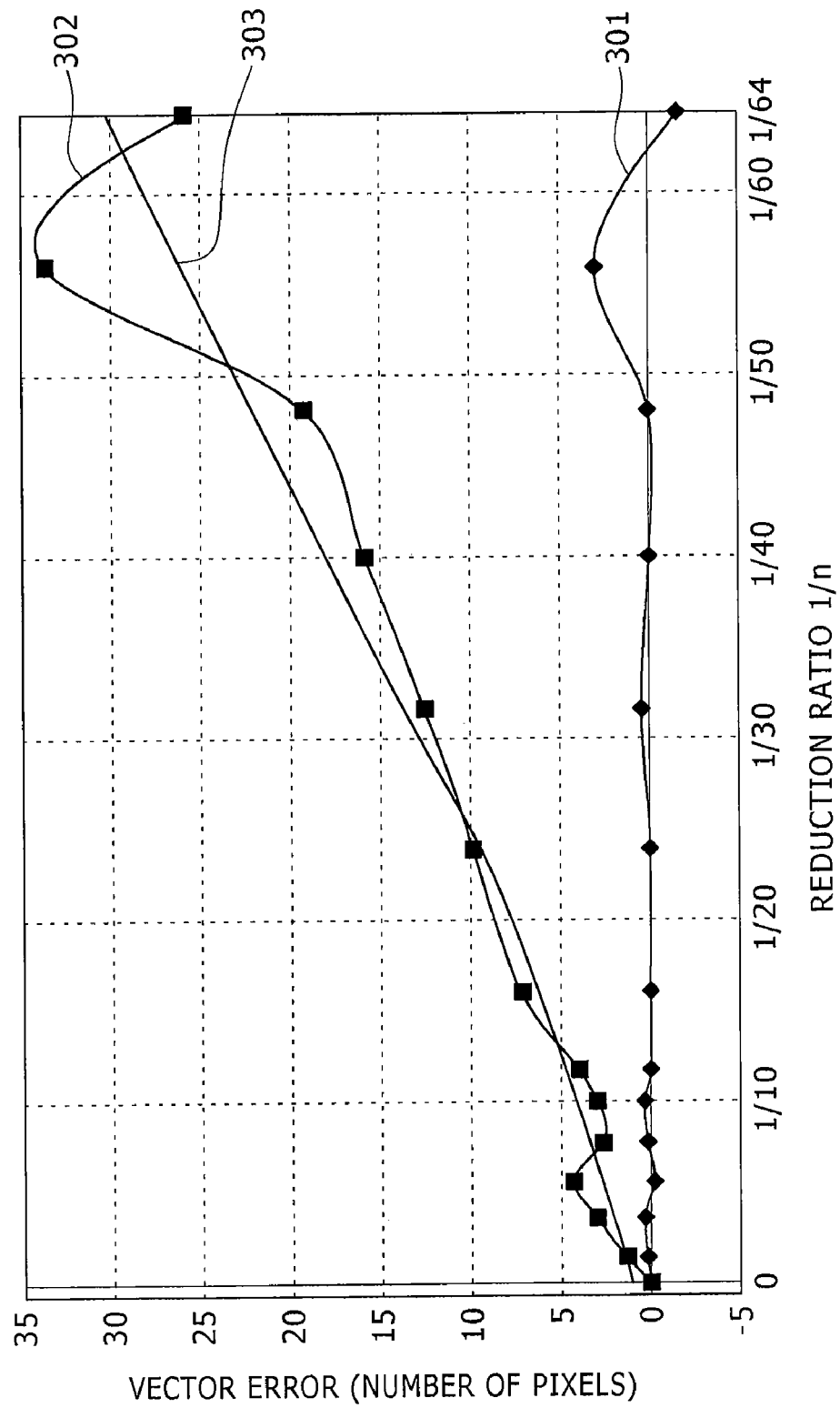

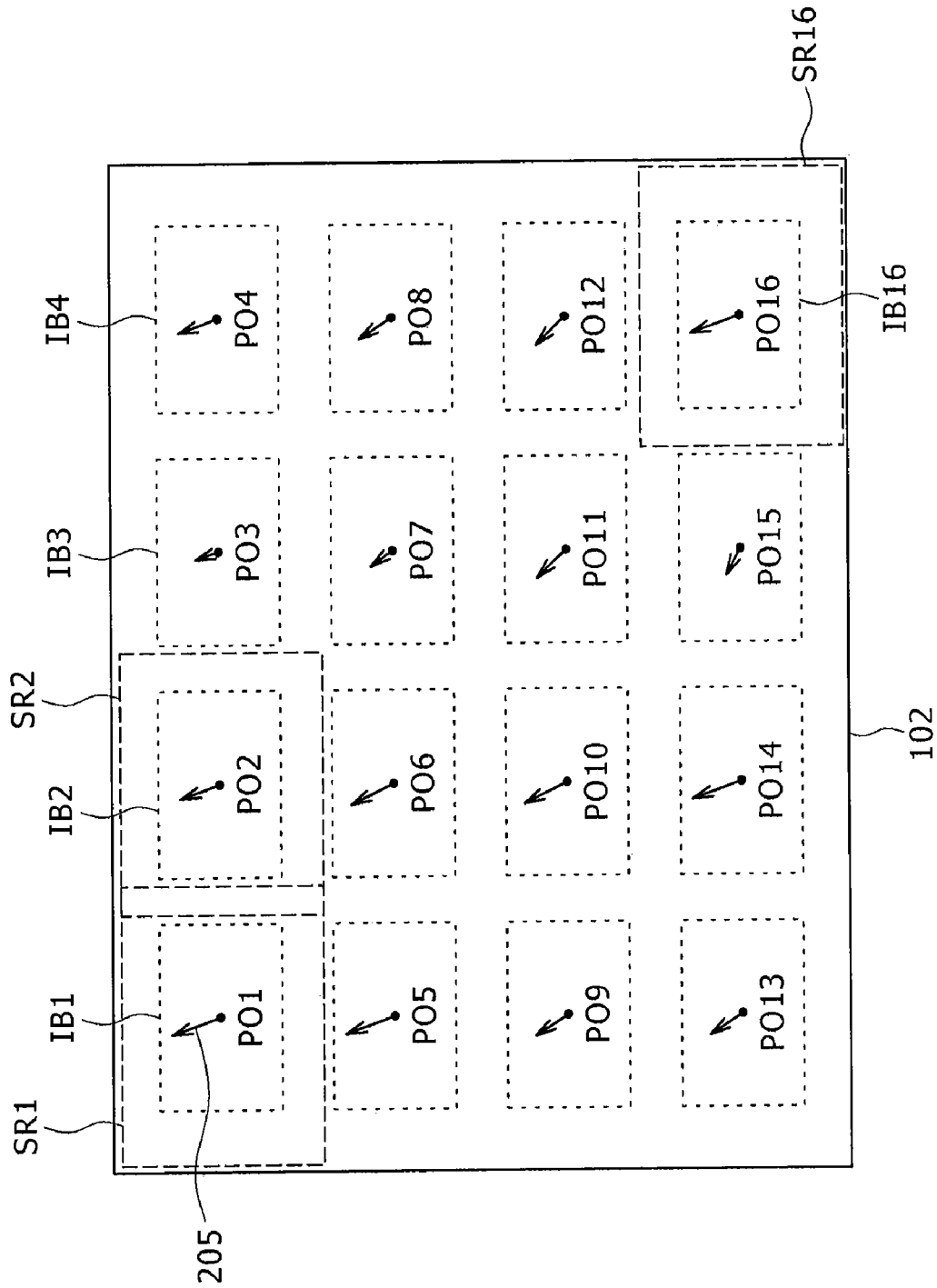

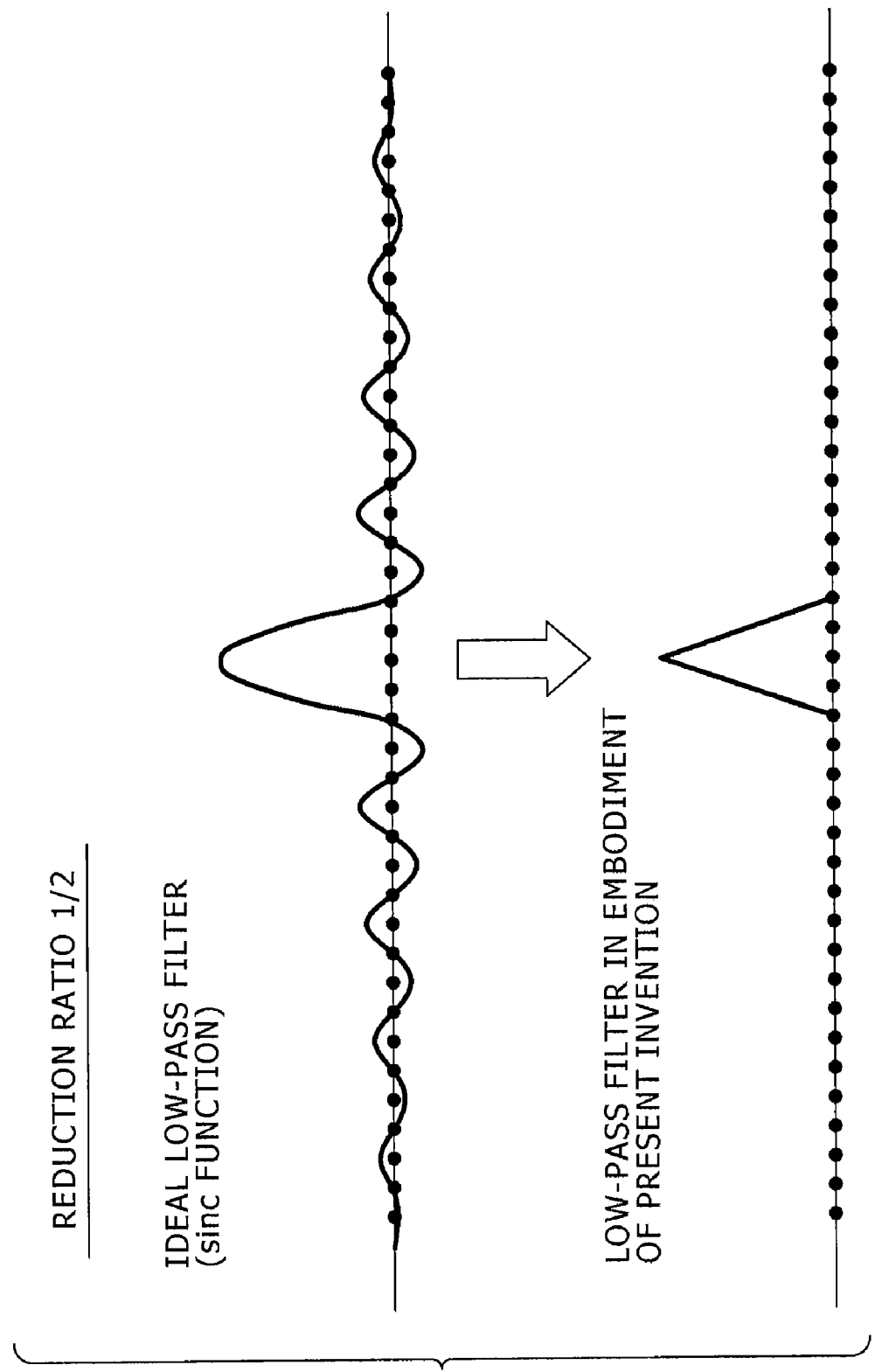

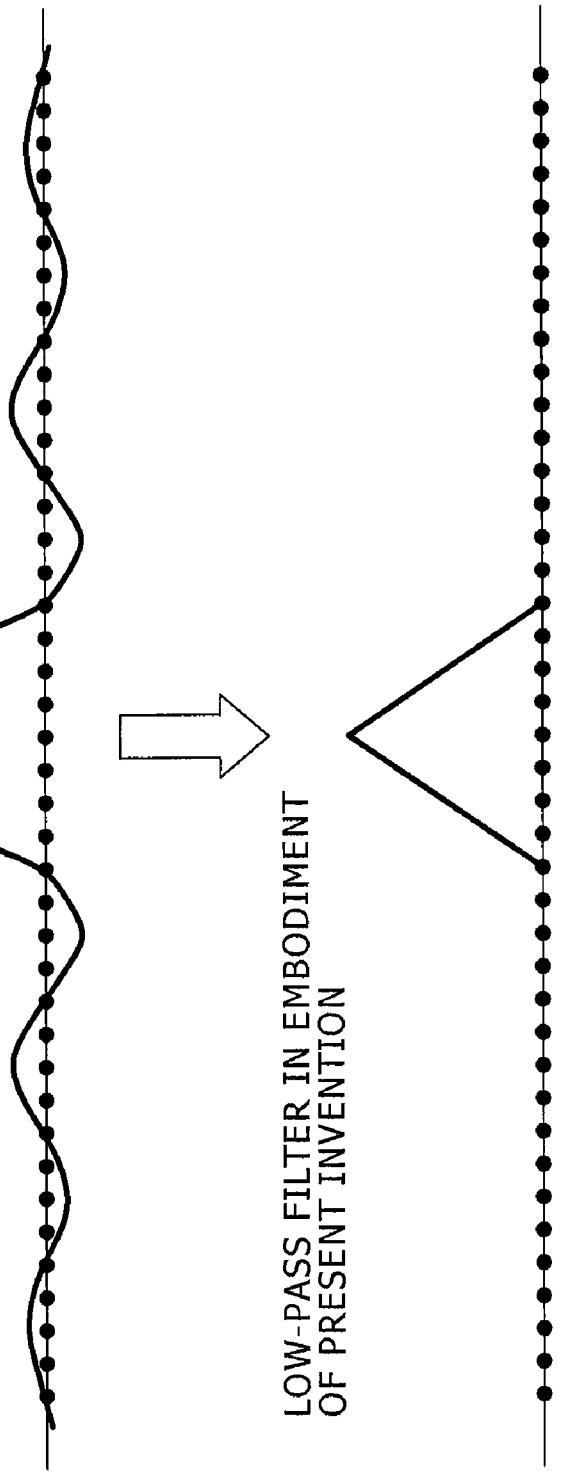

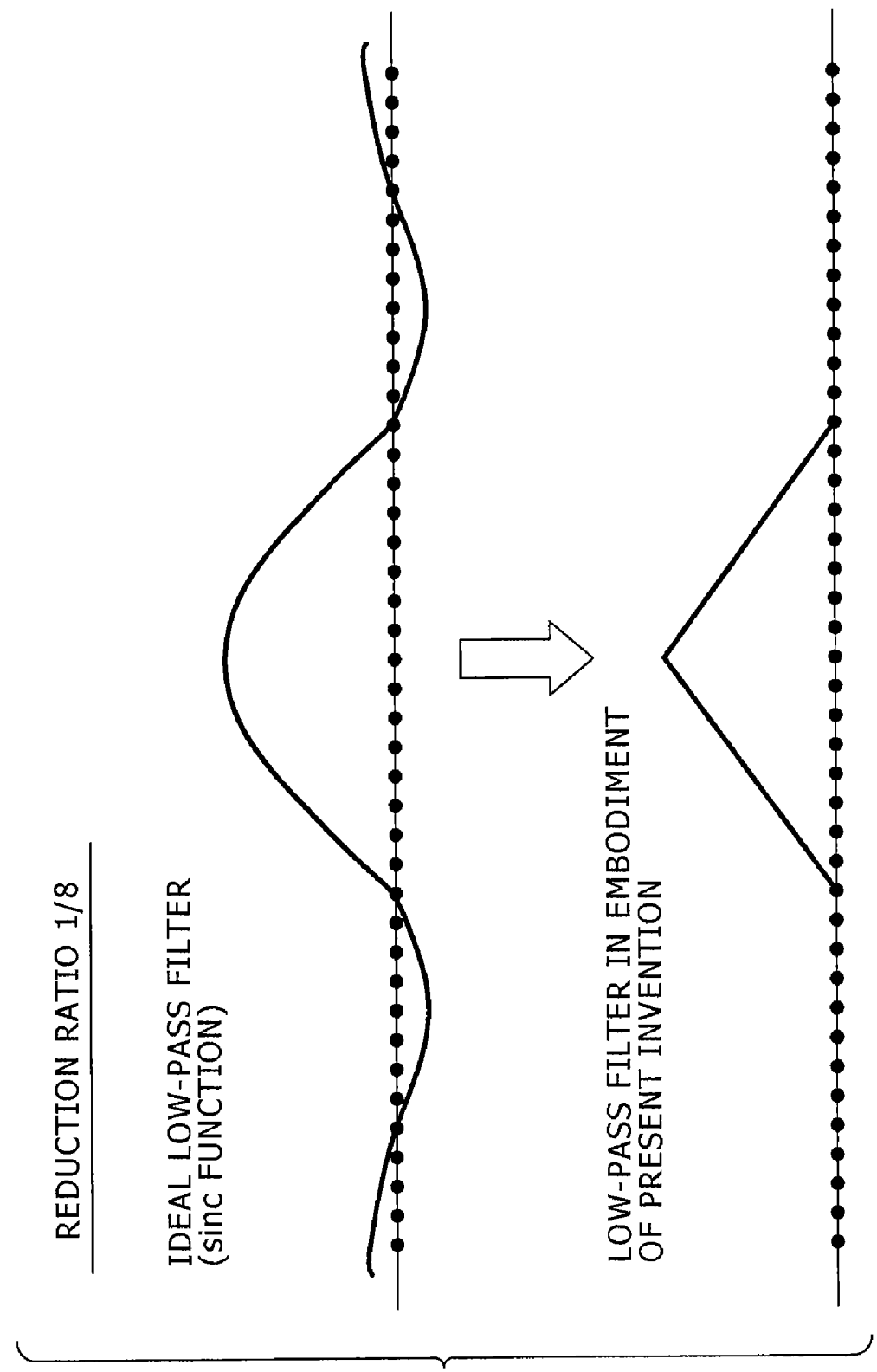

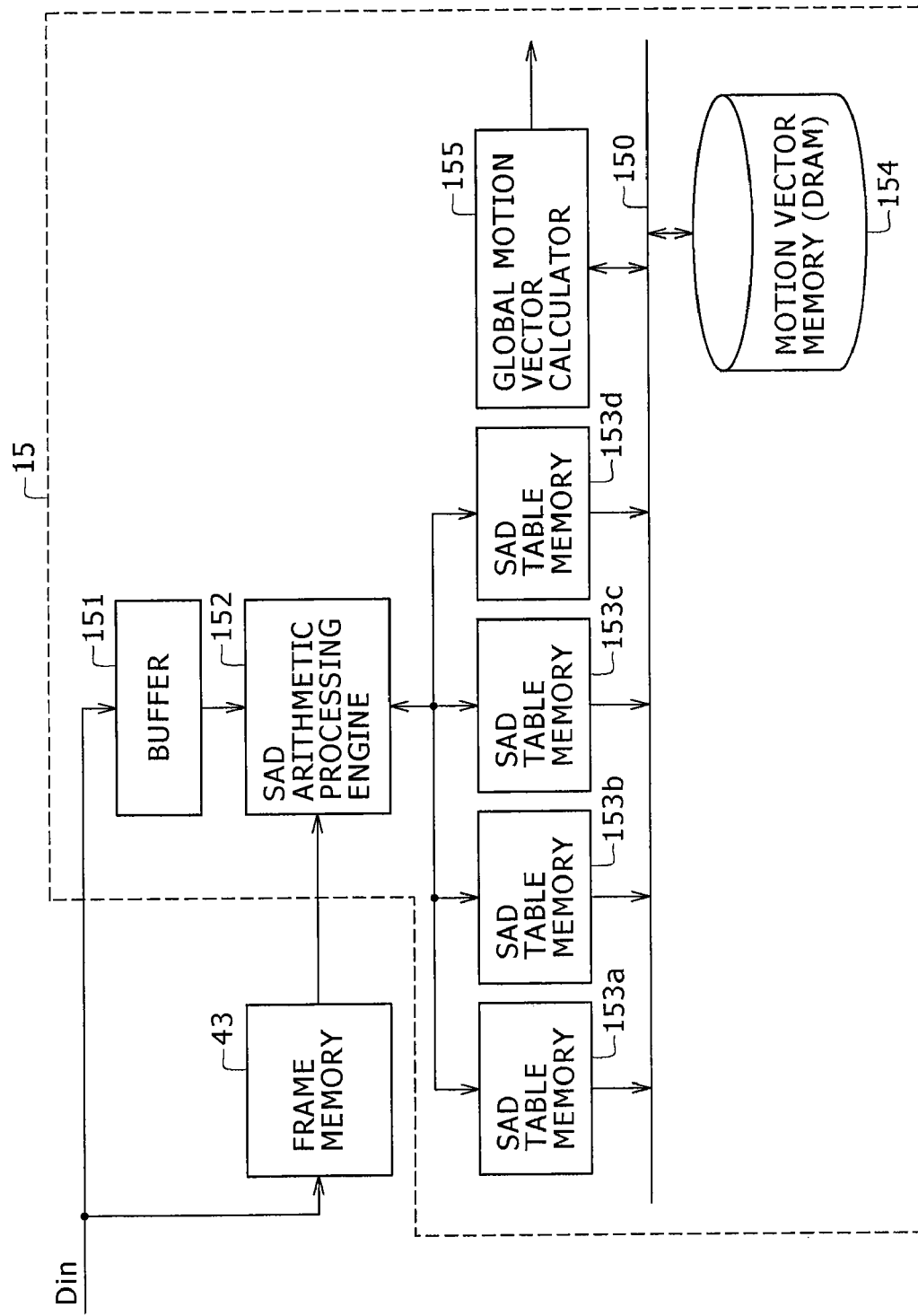

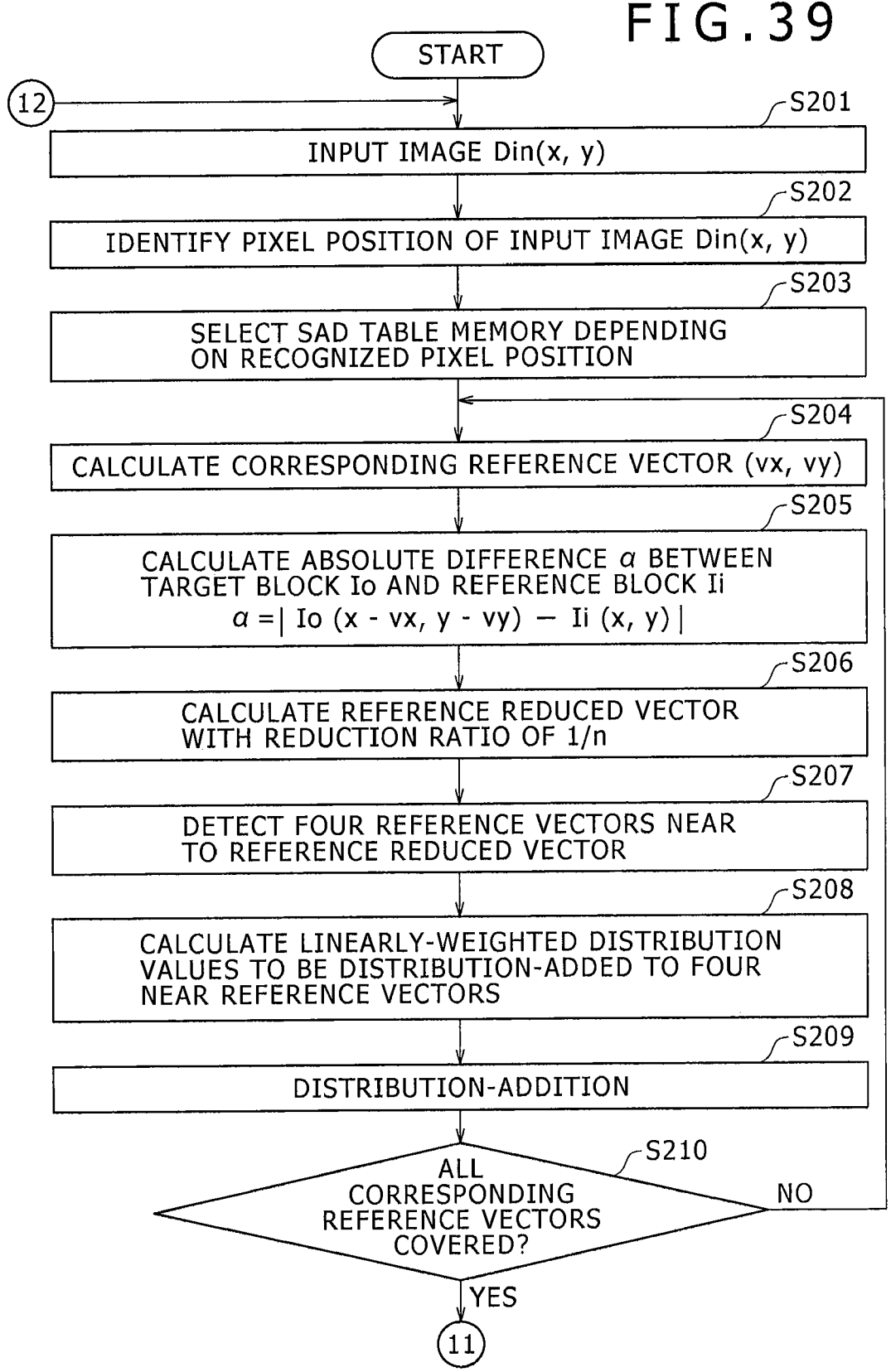

PRIOR ART

PRIOR ART

PRIOR ART

PRIOR ART

METHOD FOR CORRECTING DISTORTION OF CAPTURED IMAGE, DEVICE FOR CORRECTING DISTORTION OF CAPTURED IMAGE, AND IMAGING DEVICE

CROSS REFERENCES TO RELATED APPLICATIONS

The present application claims priority to Japanese Patent Application JP 2006-035341 filed with the Japanese Patent Office on Feb. 13, 2006, the entire contents of which is being incorporated herein by reference.

BACKGROUND

The present disclosure relates to a method for correcting distortion arising in a captured image due to a camera shake or the like at the time of capturing of an object image, a device for correcting the distortion, and an imaging device.

In capturing a moving image by a hand-held electronic imaging device, such as a video camera or digital still camera, which stores and retrieves captured images in and from an imaging element based on an electronic system, a comparatively high speed positional change of the imaging element in the horizontal direction and/or vertical direction of the captured image possibly arises due to a so-called camera shake. In the captured image, this positional change appears as image distortion such as image fluctuation.

Specifically, if a camera shake is absent, the formation position of a captured image is identical on the imaging plane of the imaging element. Therefore, when plural frame images along the time direction are arranged, as shown in FIG. 46A, the frame images overlap with each other at exactly the same position. In contrast, if a camera shake is caused, the position of a captured image is not identical on the imaging plane of the imaging element. Therefore, when plural frame images along the time direction are arranged, as shown in FIG. 46B, the plural frame images fluctuate.

The phenomenon of this camera shake readily becomes remarkable when a zoom lens is used on the telephoto side in particular. The occurrence of this camera shake phenomenon leads to a problem that a stationary object fluctuates and hence the image thereof becomes difficult to view. Furthermore, the camera shake leads also to a phenomenon that a target object is blurry in the captured image.

Also in capturing of a still image, when a captured output image is obtained through superposition of plural frame images, the occurrence of a camera shake results in a captured image involving image distortion of a blurry object similarly to the above description.

As far as existing methods to correct image distortion due to a camera shake, there have been proposed an optical camera shake correction system that employs a sensor for sensing a camera shake, and a sensorless camera shake correction system that executes digital signal processing for a captured image to thereby sense a camera shake and execute correction processing for the captured image.

In consumer products presently on the market, camera shake correction for still images is based on the optical camera shake correction system. Specifically, in these products, a camera shake vector is measured by using a gyro sensor or acceleration sensor and the measured vector is fed back to a mechanism system to thereby implement high-speed control so that an image projected on an image sensor (imaging element), such as a charge coupled device (CCD) imager or complementary metal oxide semiconductor (CMOS) imager, involves no fluctuation.

As this mechanism system, there have been proposed mechanisms to control the positions of a lens, prism and imager (or module integrated with an imager) by an actuator. These mechanisms are called a lens shift, prism shift and imager shift, respectively.

On the other hand, in the sensorless camera shake correction system, as disclosed in e.g. Japanese Patent No. 3303312 and Japanese Patent Laid-open No. Hei 6-86149, a motion vector of a captured image is detected per each screen from captured image data read out from an imaging element. Based on the motion vector, the reading-out position of captured image data stored in an image memory is shifted to thereby correct a camera shake.

In addition, as methods to realize sensorless camera shake for still images, some proposals typified by Japanese Patent Laid-open No. Hei 7-283999 have been made. Japanese Patent Laid-open No. Hei 7-283999 discloses an algorithm for executing the following operation. Specifically, some still images are continuously shot with such a short exposure time as to generate no camera shake, and a camera shake vector among the still images is calculated. In accordance with the camera shake vector, the continuously shot plural still images are added (or averaged) with being shifted in parallel (and rotated in the roll axis direction), to thereby eventually obtain a high-quality still image involving no camera shake and no low-illuminance noise.

As an example of a method for detecting a motion vector of a captured image per each screen from captured image information itself, block matching to find the correlation between captured images of two screens is known. The method of employing the block matching uses no mechanical component such as a gyro (angular velocity) sensor, and therefore has an advantage of being capable of realizing reduced size and weight of an imaging device.

The block matching is a method to calculate, for a captured image from an imaging device part, a motion vector per each screen between a reference screen as a screen of interest and an original screen that is the screen previous by one screen to the reference screen, by calculating the correlation between the reference screen and original screen regarding a rectangular block having a predetermined size.

The term "screen" refers to an image composed of image data of one frame or one field. In the present specification, a screen will be referred to as a frame based on an assumption that a screen is composed of one frame for convenience of explanation. Accordingly, a reference screen and an original screen will be referred to as a reference frame and an original frame, respectively.

For example, used as the image data of a reference frame is the image data of the current frame from an imaging device part or the image data resulting from storing of the image data of the current frame in a frame memory and delaying thereof by one frame. Used as the image data of an original frame is the image data resulting from storing of the image data of a reference frame in the frame memory and further delaying thereof by one frame.

FIGS. 47 and 48 are diagrams for explaining the outline of existing block matching. FIG. 49 is one example of a flowchart of the existing block matching processing.

In the block matching, as shown in FIG. 47, a target block 103 formed of a rectangular region that is composed of horizontal plural pixels and vertical plural lines and has a predetermined size is defined at any predetermined position in an original frame 101.

On the other hand, on a reference frame 102, an image block 104 as a projection of the target block (see the dotted line in FIG. 47) is assumed at the same position as that of the target block 103 on the original frame, and a search range 105 (see the dashed-dotted line in FIG. 47) centered on the image block 104 is defined. Furthermore, a reference block 106 having the same size as that of the target block 103 is defined.

The position of the reference block 106 is moved within the search range 105 on the reference frame 102. At each resultant position, the correlation between the image included in the reference block 106 and the image in the target block 103 is obtained. Through this operation, the position of the reference block 106 that has been detected as the block having the strongest correlation is defined as the position of the shifted target block 103 resulting from the movement of the target block 103 on the reference frame 102. In addition, the amount of the position shift between the position of the detected reference block 106 and the position of the original target block is detected as a motion vector as an amount including a direction component.

The reference block 106 is moved in the search range 105 e.g. on a pixel-by-pixel basis or pixels-by-pixels basis in the horizontal and vertical directions. Therefore, plural reference blocks are defined in the search range 105.

The correlation between the target block 103 and each reference block 106 arising from movement in the search range 105 is detected by calculating the sum of the absolute value of the difference between the luminance value of each pixel of all the pixels in the target block 103 and that of the corresponding pixel of all the pixels in the reference block 106 (the sum of the absolute value of the difference is called "sum of absolute difference", and will be referred to as SAD hereinafter). That is, the reference block 106 at the position yielding the minimum SAD value is detected as the reference block having the strongest correlation, so that the position shift amount of the reference block 106 relative to the target block 103 is detected as a motion vector.

In the block matching, the position shift amount of each of the plural reference blocks 106 defined in the search range 105 relative to the position of the target block 103 is expressed by a reference vector 107 (see FIG. 47) as an amount including a direction component. The reference vector 107 of each reference block 106 has the value dependent upon the position of the reference block 106 on the reference frame 102. In the existing block matching, the reference vector of the reference block 106 offering the minimum SAD value is detected as a motion vector.

To detect a motion vector, in typical block matching, as shown in FIG. 48, the SAD values between each of the plural reference blocks 106 defined in the search range 105 and the target block 103 (hereinafter, referred to simply as "SAD value of a reference block" for simplified explanation) are stored in a memory with being associated with the reference vector 107 dependent upon the position of the reference block 106. Furthermore, the reference block 106 offering the minimum SAD value among the SAD values of all the reference blocks 106 stored in the memory is detected to sense a motion vector 110.

The entity in which the SAD value of each of the plural reference blocks 106 defined in the search range 105 is stored in association with the reference vector 107 dependent upon the position of the reference block 106 is called a sum-of-absolute-difference table (hereinafter, referred to as an SAD table). This table is shown as an SAD table 108 in FIG. 48. The SAD value of each reference block 106 in this SAD table 108 is referred to as an SAD table element 109.

In the above description, the positions of the target block 103 and the reference block 106 refer to any specific positions in these blocks, such as the center positions of the blocks. Furthermore, the reference vector 107 indicates the amount of the shift (including a direction) between the position of the image block 104 as a projection of the target block 103 on the reference frame 102 and the position of the reference block 106. In the example of FIGS. 47 and 48, the target block 103 is defined at the center position of the frame.

Furthermore, the reference vectors 107 corresponding to the respective reference blocks 106 indicate the position shifts of the reference blocks 106 relative to the position corresponding to the target block 103 on the reference frame 102. Therefore, if the position of the reference block 106 is specified, the value of the reference vector is also specified corresponding to the position. Consequently, if the address of the SAD table element of a reference block on the memory for the SAD table 108 is specified, the corresponding reference vector is specified.

The processing of the above-described existing block matching will be described below with reference to the flowchart of FIG. 49.

Initially, one reference block Ii in the search range 105 is specified, which is equivalent to specifying of the reference vector corresponding to the reference block Ii (step S1). In FIG. 49, (vx, vy) denotes the position indicated by the specified reference vector, with the position of the target block on the frame being defined as the reference position (0, 0). Symbol vx denotes the component of the horizontal shift amount relative to the reference position, indicated by the specified reference vector, while symbol vy denotes the component of the vertical shift amount relative to the reference position, indicated by the specified reference vector.

The shift amounts vx and vy each have a value in units of pixels. For example, vx=+1 indicates the position shifted by one pixel in the right horizontal direction relative to the reference position (0, 0). Furthermore, vx=−1 indicates the position shifted by one pixel in the left horizontal direction relative to the reference position (0, 0). In addition, for example, vy=+1 indicates the position shifted by one pixel in the downward vertical direction relative to the reference position (0, 0). Moreover, vy=−1 indicates the position shifted by one pixel in the upward vertical direction relative to the reference position (0, 0).

As described above, (vx, vy) denotes a position relative to the reference position indicated by a reference vector (hereinafter, referred to simply as "a position indicated by a reference vector" for simplification of explanation), and corresponds to each of reference vectors. That is, if integer numbers are employed as vx and vy, (vx, vy) represents each of reference vectors. Therefore, in the following description, the reference vector indicating the position of a coordinate (vx, vy) is often referred to as a reference vector (vx, vy).

If the position of the target block, i.e., the reference position (0, 0), is defined as the center position of the search range, and the coverage of the search range in the horizontal and vertical directions is defined as ±Rx and ±Ry, respectively, the relationships −Rx≦vx≦+Rx and −Ry≦vy≦+Ry are obtained.

Subsequent to step S1, the coordinate (x, y) of one pixel in the target block Io is specified (step S2). The step S2 is followed by calculation of the absolute value α of the difference between the pixel value Io(x, y) of the specified coordinate (x, y) in the target block Io and the pixel value Ii(x+vx, y+vy) of the corresponding pixel position in the reference block Ii (step S3). That is, the absolute difference α is calculated in accordance with (Equation 1).

$$\alpha = |Io(x, y) - Ii(x+vx, y+vy)| \qquad \text{(Equation 1)}$$

Next, the calculated absolute difference α is added to the previous SAD value at the address (table element) indicated by the reference vector (vx, vy) of the reference block Ii, and the resultant SAD value is rewritten to this address (step S4). Specifically, if the SAD value corresponding to the reference vector (vx, vy) is expressed as SAD(vx, vy), this SAD(vx, vy) is calculated in accordance with (Equation 2), so that the calculated value is written to the address indicated by the reference vector (vx, vy).

$$SAD(vx, vy) = \Sigma\alpha = \Sigma |Io(x, y) - Ii(x+vx, y+vy)| \quad \text{(Equation 2)}$$

Next, a determination is made as to whether or not the above-described arithmetic operation has been performed on the pixels of all the coordinates (x, y) in the target block Io (step S5). If it is determined that the operation for all the coordinates (x, y) in the target block Io has not been completed yet, the processing sequence returns to the step S2, where the pixel position of the next coordinate (x, y) in the target block Io is specified, followed by repetition of the processing subsequent to the step S2.

In contrast, if it is determined in the step S5 that the above-described arithmetic operation has been performed on the pixels of all the coordinates (x, y) in the target block Io, a determination is made that calculation of the SAD value for the reference block has been completed. Therefore, subsequently, a determination is made as to whether or not the above-described arithmetic processing has been completed for all the reference blocks in the search range, i.e., for all the reference vectors (vx, vy) (step S6).

If it is determined in the step S6 that the reference vector (vx, vy) for which the above-described arithmetic processing has not been completed yet remains, the processing sequence returns to the step S1, where the next reference vector (vx, vy) for which the above-described arithmetic processing has not been completed is specified, followed by repetition of the processing subsequent to the step S1.

If it is determined in the step S6 that the search range has been free from the reference vector (vx, vy) for which the above-described arithmetic processing has not been completed, a determination is made that the SAD table has been completed. Therefore, subsequently, from the completed SAD table, the minimum SAD value is detected (step S7). Next, the reference vector corresponding to the address of the minimum SAD value is detected as a motion vector (step S8). If the minimum SAD value is expressed as SAD(mx, my), the intended motion vector is calculated as the vector (mx, my) indicating the position (mx, my).

The completion of the step S8 is equivalent to the end of the processing of detecting a motion vector through block matching regarding one target block.

In large part of general imaging elements, as shown in FIG. 50, all the pixels are not treated as effective pixels, but, of a region AFL composed of all the pixels (hereinafter, referred to as an all image region), the part other than the peripheral region, i.e., the center part defined by the horizontal and vertical effective ranges, is employed as an effective image region EFL.

In the case of using such an imager, even when the reading-out of pixel positions are changed due to camera shake correction, distortion correction can be carried out by use of pixel data originally possessed by the imager as long as the camera shake amount is smaller than the difference between the entire image region AFL and the effective image region EFL. Therefore, the degree of image deterioration is lower compared with the case of producing data necessary for camera shake correction through interpolation processing and so on.

In the recent market for electronic imaging devices, along with trends of gyro sensors toward lower cost, higher performance and smaller size, an optical camera shake correction system employing a gyro sensor has become more predominant as a camera shake correction system.

However, in recent years, a rapid spread of digital still cameras and a concurrent rapid trend toward a larger number of pixels are beginning to cause another problem. Specifically, although there is a strong demand for implementation of camera shake correction also in capturing of still images under low illuminance (long exposure time), only a scheme employing a sensor such as a gyro sensor is available as a solution to this demand. This has exposed certain weak points of gyro sensors and other problems.

That is, it is difficult for the detection accuracy of existing gyro sensors to detect a camera shake vector with pixel accuracy.

Furthermore, in the optical camera shake correction system, a control signal produced based on a camera shake vector detected by a gyro sensor is fed back to the mechanism that controls the positions of a lens, prism and imager (or a module integrated with an imager) by an actuator as described above. Therefore, in addition to the above-described accuracy error of the gyro sensor itself, a delay of the feedback to the mechanism system, error in prediction to avoid the feedback delay, and error in the control of the mechanism system are also superimposed, which makes it impossible to carry out camera shake correction with pixel accuracy.

On the other hand, the sensorless camera shake correction system can realize detection of a camera shake vector with pixel accuracy, including a rotation component in the roll axis direction, in principle. Furthermore, the system does not require a sensor and a mechanism such as a lens shift, and hence is considerably superior also in terms of costs.

However, as long as a technique that depends on existing block matching is employed, the scale of an SAD table increases in proportion to the number of pixels on one screen. Therefore, it is very difficult to realize motion vector detection for present still image sizes over five million pixels with a practical circuit scale.

In the past, manufacturers had a hard time to reduce, with making various improvements, the scale of a circuit for detecting a camera shake vector even for an NTSC (National Television System Committee) moving image with as small as at most one hundred seventy thousand pixels. Furthermore, although the search range for a camera shake for an NTSC moving image may be small because an NTSC moving image is premised on a high frame rate such as 60 fps (frame per second) or 30 fps, the search range for a still image is extremely large because a still image is based on the premise that the frame rate of plural frames to be superimposed upon each other is about 3 fps. This large search range for a still image also contributes to the difficulty of the problems. This is because the number of table elements in an SAD table increases in proportion to the search range as well as the number of pixels.

Thus, the most serious problem in a block matching technique is an increase in the size of an SAD table. As described above, in recent digital cameras, which are based on the premise that an imager therein has five million pixels or more, it is inevitable that the size of an SAD table becomes larger in proportion to the number of pixels. Furthermore, in the case of a still image, of which frame rate is about 3 fps as described above, a search range larger by a factor of several tens than a camera shake range for a moving image, of which frame rate is 60 fps, is necessary. The increase in the size of the search range is equivalent to an increase in the size of an SAD table.

According to studies, it has been revealed that a camera shake range for a still image of 3 fps is about ±10% of the entire frame if the entire frame is 100. According to this evaluation, the estimated value of the necessary SAD table size is about 80 megabits when the existing technique is employed for an imager having twelve million pixels, which is included in some high-class products that have already come to market. In addition, in order to meet practical processing speed, it may be required that a memory in which this SAD table is stored be a built-in static random access memory (SRAM). Although the decrease in the semiconductor process rule has progressed to a large degree, the estimated table size is larger than practical levels by a factor of thousands.

Accordingly, there is a need to address the above-described problems, and to provide methods and devices that allow implementation of camera shake correction with pixel accuracy.

SUMMARY

According to an embodiment, there is provided a method for correcting distortion of a captured image. The method includes the steps of receiving a detection output from a sensor that detects a change corresponding to a positional change of an imaging element in the horizontal direction and/or the vertical direction of a captured image at the time of imaging, and optically correcting distortion of a captured image in image data from the imaging element due to the positional change of the imaging element by controlling a control mechanism depending on the detection output received from the sensor in the detection output receiving step. The control mechanism is configured to control the position at which incident light from a target object enters the imaging element. The method further includes the steps of receiving image data resulting from the optical correction of a captured image in the correcting step from the imaging element, and detecting a motion vector per one screen of a captured image from the image data, and further correcting distortion of a captured image due to the positional change of the imaging element for the image data from the imaging element based on the motion vector detected in the motion vector detecting step.

According to the embodiment with the above-described configuration, a sensor such as a gyro sensor detects a change corresponding to a positional change of an imaging element in the horizontal direction and/or the vertical direction of a captured image at the timing of imaging, attributed to e.g. a camera shake. Based on a detection output from the sensor, optical correction is carried out.

However, more than the optical correction is required to achieve image distortion correction (e.g., camera shake correction) with pixel accuracy as described above. In the embodiment, a motion vector is detected from captured image data from the imaging element resulting from the optical correction, and based on the detected motion vector, in image distortion correcting step, image distortion is corrected with pixel accuracy.

In the motion vector detecting step, the motion vector is detected from the image data of the captured image resulting from the optical correction, and hence this motion vector is equivalent to image distortion resulting from insufficiency in the optical correction. Therefore, even when the above-described block matching is used in the motion vector detecting step, a search range for a motion vector can be set to a small one corresponding to the image distortion resulting from failure in complete removal through the optical camera shake correction, which allows the number of elements in an SAD table to be set to a practical level.

According to present embodiments, signal processing is executed on captured image data from an imaging element resulting from optical correction so that image distortion resulting from insufficiency in the optical correction is removed. Therefore, the embodiments allow correction of image distortion with pixel accuracy with addressing problems in existing optical camera shake correction systems and sensorless camera shake correction systems.

Additional features and advantages are described herein, and will be apparent from, the following Detailed Description and the figures.

BRIEF DESCRIPTION OF THE FIGURES

FIG. 18 is a diagram for explaining the second example of processing for detecting an accurate motion vector in a method for detecting a motion vector according to an embodiment;

FIG. 20 is a diagram for explaining the processing performance in a method for detecting a motion vector according to an embodiment;

FIG. 21 is a diagram for explaining the outline of a method for detecting a motion vector according to an embodiment;

FIG. 22 is a diagram for explaining a feature of a method for detecting a motion vector according to an embodiment, based on a comparison with an existing method;

FIG. 23 is a diagram for explaining a feature of a method for detecting a motion vector according to an embodiment, based on a comparison with an existing method;

FIG. 24 is a diagram for explaining a feature of a method for detecting a motion vector according to an embodiment, based on a comparison with an existing method;

FIG. 38 is a block diagram showing a configuration example of major part of a motion vector detector 15 in the imaging device of the second embodiment;

FIG. 39 is a part of a flowchart for explaining an example of the motion vector detection processing of the imaging device of the second embodiment;

DETAILED DESCRIPTION

Examples are provided, according to embodiments, below in which devices and methods for correcting distortion in a captured image are applied to an imaging device, with reference to the drawings.

Figure 1:
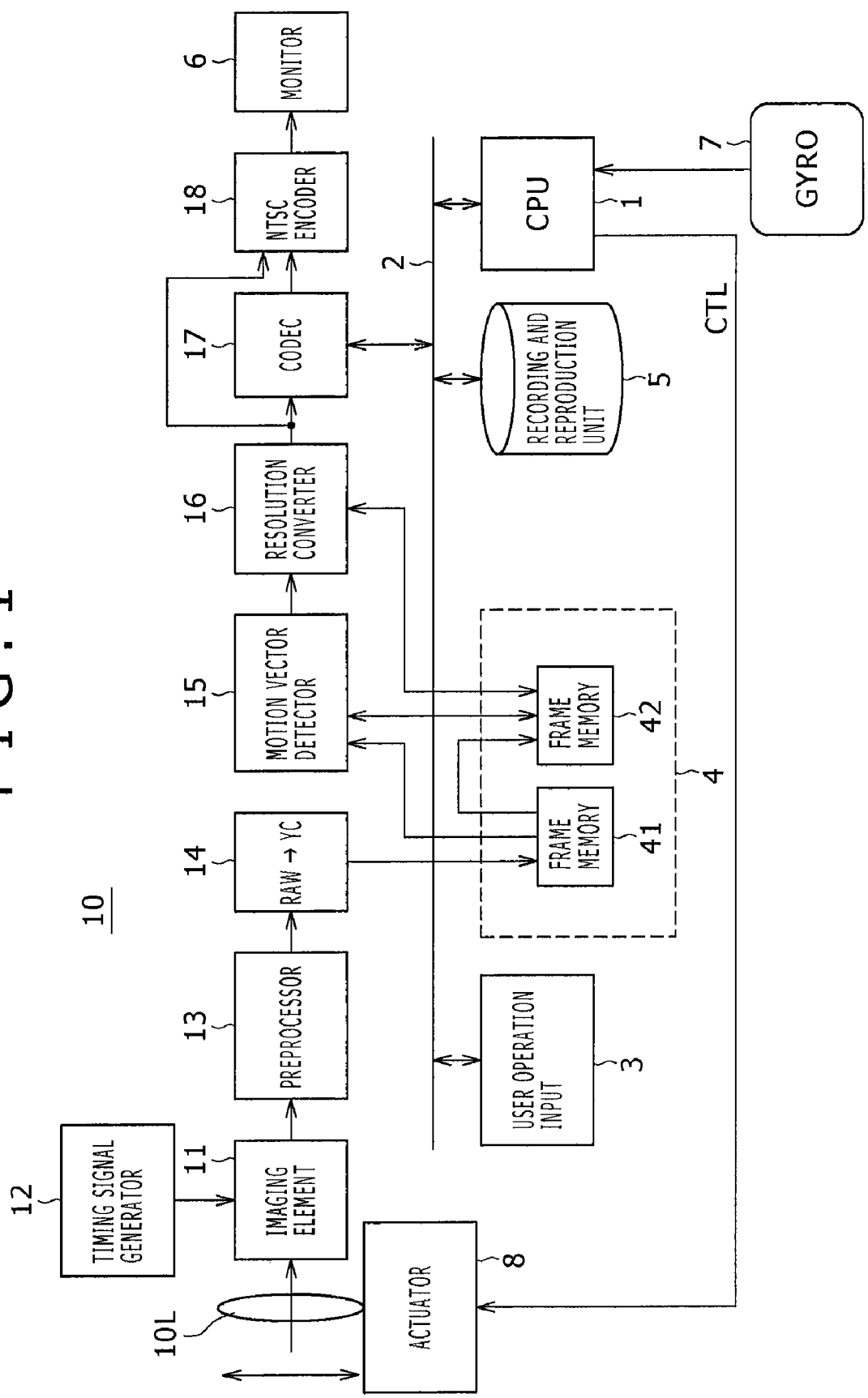
FIG. 1 is a block diagram showing a configuration example of an imaging device to which a method for correcting distortion of a captured image according to a first embodiment is applied.

Device for Correcting Distortion in Captured Image According to First Embodiment FIG. 1 is a block diagram showing one example of an imaging device to which a device for correcting distortion in a captured image according to a first embodiment is applied.

Referring to FIG. 1, in the imaging device of this embodiment, a central processing unit (CPU) 1 is connected to a system bus 2. Furthermore, an imaging signal processing system 10, a user operation input 3, an image memory 4, a recording and reproducing unit 5, and so on are connected to the system bus 2. In the present specification, the CPU 1 encompasses a read only memory (ROM) in which a program for executing various kinds of software processing is stored, a work area RAM, and so on.

A gyro sensor 7 is attached to a predetermined position in the imaging device of this embodiment. The gyro sensor 7 detects a change corresponding to a positional change of an imaging element 11 (so-called camera shake) in the horizontal direction and/or the vertical direction of a captured image at the time of imaging. A detection output from the gyro sensor 7 is supplied to the CPU 1.

Furthermore, in this embodiment, a camera optical system 10L including a lens, prism and so on for imaging is equipped with an optical camera shake correction mechanism that can control the position at which incident light from a target object enters the imaging element 11 by an actuator 8 for optical camera shake correction. In this example, the optical camera shake correction mechanism shifts the position of the lens or prism in the camera optical system 10L in a direction perpendicular to the optical axis of the incident light.

To the actuator 8, an optical camera shake correction signal CTL produced depending on a camera shake detection output from the gyro sensor 7 is supplied from the CPU 1, so that the optical camera shake correction mechanism for shifting the position of the lens or prism in the camera optical system 10L is controlled. Thereby, correction (optical correction) is carried out so that the position at which incident light from a target object enters the imaging element 11 is kept identical irrespective of a positional change of the imaging element 11 in the horizontal direction and/or the vertical direction of a captured image at the time of imaging.

The above-described optical correction may be carried out, not by using an optical camera shake correction mechanism that shifts the position of the lens or prism in the camera optical system 10L in a direction perpendicular to the optical axis of incident light, but by using one that shifts the position of the imaging element 11 by the actuator 8 in a direction perpendicular to the optical axis of incident light.

In the imaging device of the example of FIG. 1, in response to operation of starting captured image recording through the user operation input 3, processing of recording captured image data is executed as described later. In addition, in response to operation of starting reproduction of a captured and recorded image through the user operation input 3, the imaging device of FIG. 1 executes processing of reproducing captured image data recorded in a recording medium of the recording and reproducing unit 5.

As shown in FIG. 1, incident light from a target object passes through a camera optical system (not shown) including the imaging lens 10L, followed by being received by the imaging element 11 so as to be captured as an image. The imaging element 11 is formed of a CCD imager or CMOS imager.

If a camera shake is caused in the imaging, the CPU 1 produces a motion vector (camera shake vector) dependent upon the caused camera shake based on a detection output from the gyro sensor 7, and produces the optical camera shake correction signal CTL from the produced motion vector. Subsequently, the CPU 1 supplies the produced optical camera shake correction signal CTL to the actuator 8. This allows the captured image data from the imaging element 11 to be obtained as data for which optical camera shake correction has been carried out.

In the imaging device of this example, upon execution of operation of starting captured image recording, the captured image data for which the optical camera shake correction has been carried out is sampled from the imaging element 11 in response to a timing signal from a timing signal generator 12. Thereby, a digital imaging signal is output as a RAW signal based on a Bayer array composed of the three primary colors of red (R), green (G) and blue B.

The output imaging signal is supplied to a preprocessor 13 and therein subjected to preprocessing such as defect correction and γ correction, followed by being supplied to a data converter 14.

The data converter 14 converts the input imaging signal into a digital imaging signal (YC data) composed of a luminance signal component Y and color difference signal components Cb/Cr, and supplies the digital imaging signal to the image memory 4 via the system bus.

In the example of FIG. 1, the image memory 4 includes two frame memories 41 and 42. The digital imaging signal from the data converter 14 is first stored in the frame memory 41. When the period of one frame has elapsed, the digital imaging signal stored in the frame memory 41 is transferred to the frame memory 42, and a digital imaging signal of a new frame from the data converter 14 is written to the frame memory 41. Therefore, stored in the frame memory 42 is the frame image previous by one frame to the frame image stored in the frame memory 41.

In this embodiment, a motion vector detector 15 employs block matching for obtaining the correlation between two screens as a method for detecting a motion vector of a captured image. In this block matching, the search range for the above-described target block may be small because this block matching is to detect a remaining motion vector resulting from insufficiency in the correction of an original motion vector by the optical camera shake correction.

In the first embodiment, this search range is fixedly defined in advance. Specifically, in this embodiment, the magnitude of the above-described remaining motion vector, which results from insufficiency in the correction by the optical camera shake correction, is detected through measurement or the like in advance. Furthermore, the search range in the motion vector detector 15 is defined so that at least the remaining motion vector can be detected.

The remaining motion vector would be dependent upon the magnitude of a camera shake motion vector detected by the gyro sensor 7. With the possible maximum magnitude of the remaining motion vector being defined in advance, the search range is defined so that at least the maximum magnitude of the remaining motion vector can be detected.

Furthermore, in defining the search range, there is a need to take into consideration the feedback delay in the optical camera shake correction mechanism based on the actuator 8. Specifically, there is a time lag between a detection output by the gyro sensor 7 and actual execution of optical camera shake correction through the operation of the optical camera shake correction mechanism, which is triggered by production of the optical camera shake correction signal CTL and supply thereof to the actuator 8.

This delay causes a possibility that the camera shake motion vector that is a detection output by the gyro sensor 7 at the timing when captured image data read out from the imaging element 11 has been obtained is different from the camera shake motion vector serving as the source to produce the optical camera shake correction signal. The difference in the camera shake motion vector is included in a motion vector detected by the motion vector detector 15.

To address this, in this embodiment, the search range is defined to have such a size as to be capable of detecting a camera shake motion vector that has the magnitude resulting from addition of the difference in a camera shake motion vector due to the feedback delay of the optical camera shake correction to the above-described maximum magnitude of the remaining motion vector. It should be obvious that in the defining of an actual search range, the accuracy error of the gyro sensor 7 itself is taken into consideration, and a predetermined margin is also added for further safety.

The motion vector detector 15 accesses the two frame memories 41 and 42 via the system bus 2 to retrieve the captured image data stored therein, and executes processing of detecting a motion vector from the captured image data based on the defined search range. In this processing, the frame image stored in the frame memory 42 is treated as an original frame image, while the frame image stored in the frame memory 41 is treated as a reference frame image.

The motion vector detector 15 transmits a motion vector, which is the detection result, as a control signal to a subsequent-stage resolution converter 16.

The resolution converter 16 executes processing of converting into requisite resolution and image size, with sequentially extracting the image data of the delayed frame stored in the frame memory 42 in accordance with the motion vector received from the motion vector detector 15. Due to this sequential extraction from the frame memory 42 in accordance with the calculated image distortion correction amount, the converted image is obtained as an image from which the camera shake has been removed with pixel accuracy.

The image data from the resolution converter 16, from which image distortion based on the camera shake has been removed, is converted into an NTSC (National Television System Committee) standard color video signal by an NTSC encoder 18, followed by being supplied to a monitor display 6 included in an electronic view finder, so that the image at the time of the imaging is displayed on the monitor screen.

In parallel to the monitor displaying, the image data from the resolution converter 16, free from the camera shake, is subjected to coding processing such as record modification by a codec 17, followed by being supplied to the recording and reproducing unit 5 so as to be recorded in a recording medium such as an optical disc typified by a digital versatile disc (DVD) or hard disc.

The captured image data recorded in a recording medium in the recording and reproducing unit 5 is retrieved in response to reproduction start operation through the user operation input 3 so as to be supplied to the codec 17 and decoded therein for reproduction. The decoded image data is supplied via the NTSC encoder 18 to the monitor display 6, so that the reproduced image is displayed on the monitor screen. An output video signal from the NTSC encoder 18 can be led to the external via a video output terminal, although illustration thereof is omitted in FIG. 1.

The motion vector detector 15 can be constructed by hardware, or can be constructed by using a digital signal processor (DSP). More alternatively, it can be implemented through software processing by the CPU 1. Similarly, the resolution converter 16 can also be constructed by hardware, or can be constructed by using a digital signal processor (DSP). More alternatively, it can be implemented through software processing by the CPU 1.

Configuration Example Of Motion Vector Detector 15

In this embodiment, as described above, block matching for obtaining the correlation between two screens is employed as a method for detecting a motion vector from captured image data in the motion vector detector 15.

In this embodiment, a small search range can be used in the block matching processing by the motion vector detector 15 as described above. Therefore, even for detection of a motion vector with pixel accuracy, the scale of an SAD table can be decreased to a practical level.

Furthermore, this embodiment employs a novel block matching scheme that can further decrease the scale of an SAD table compared with by existing schemes, to thereby allow construction of the motion vector detector 15 with a more practical circuit scale.

As a practical proposal at a feasible level to provide a method for decreasing the scale of an SAD table, Japanese Patent Laid-open No. 2005-38396 can be cited. The configuration disclosed in Japanese Patent Laid-open NO. 2005-38396 includes an entity that obtains a motion vector on an image resulting from image size reduction, and an entity that allows plural blocks to share the same SAD table. The image reduction and sharing of an SAD table by plural blocks are greatly favorable schemes to realize a decrease in the SAD table size, and are used also in other fields, such as motion vector detection and scene change detection in an MPEG (Moving Picture Experts Group) image compression system.

However, the algorithm in Japanese Patent Laid-open No. 2005-38396 involves the following problems. Specifically, the time and memory capacity are consumed in the image reduction and accompanying memory (dynamic random access memory (DRAM)) access. Furthermore, because the plural blocks access an SAD table based on time division, the number of times of memory access is greatly large and this access processing takes a long time. This problem of the long processing time is serious in camera shake correction for a moving image because real-time processing and shortening of the system delay time may be required.

Furthermore, in the reduction conversion of an original image, a low-pass filter for removing aliasing and low-illuminance noise needs to be implemented as preprocessing of the reduction processing. However, the characteristics of the low-pass filter change depending on the reduction ratio. Furthermore, in the case of a vertical low-pass filter in particular, if a multi-tap digital filter is employed as the low-pass filter, a large number of line memories and arithmetic logics may be required, which leads to a problem of an increase in the circuit scale.

In view of the above-described problems, this embodiment is to provide image processing method and device that allow use of a SAD table having a greatly decreased size in detection of a motion vector between two frames by use of block matching.

In the above description, two problems have been presented regarding the method to reduce an SAD table size through image reduction, disclosed in Japanese Patent Laid-open NO. 2005-38396, of existing proposed methods relating to the above-described block matching. The problems are as follows: an increase in the processing time and consumption of the memory capacity that accompany the image reduction conversion; and a circuit scale increase that accompanies implementation of a proper low-pass filter for avoiding aliasing due to the image reduction conversion. The embodiment described below is to solve also these problems.

Outline of Block Matching Method Used in an Embodiment

This embodiment also employs the above-described block matching to detect a motion vector between two frames. However, in the embodiment, an SAD value obtained as the relationship between a target block and reference block is not stored with being associated with the reference vector of the reference block. In the embodiment, the size of the reference vector is reduced, and an SAD value is stored with being distribution-added to plural reference vectors that correspond to the reference reduced vector and are in the vicinity of the reference reduced vector.

By this operation, the size of an SAD table is greatly reduced compared with existing SAD tables.

Figure 2:
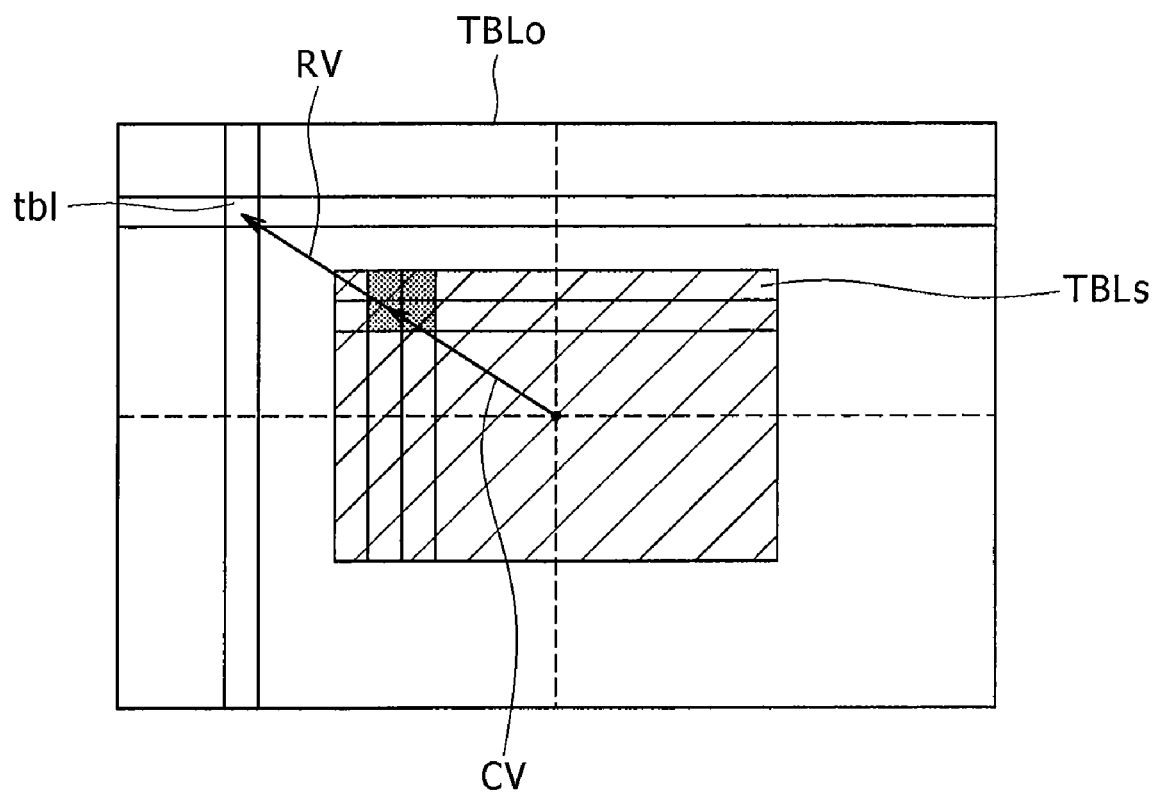
FIG. 2 is a diagram for explaining the outline of processing for detecting a motion vector in an embodiment.
Figure 3A:
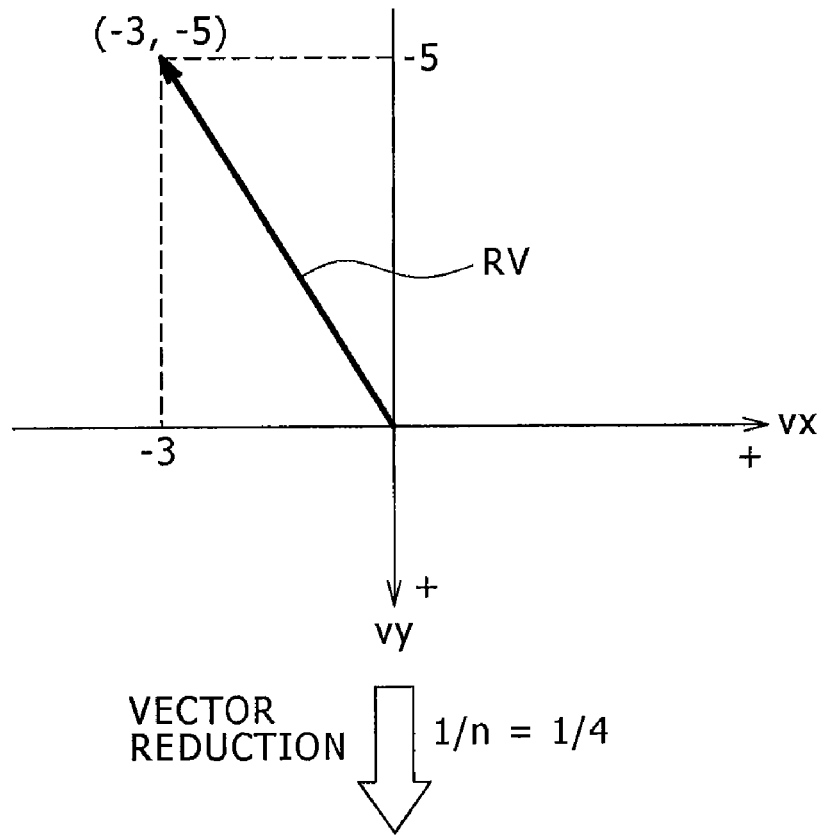
FIGS. 3A and 3B are diagrams for explaining the outline of processing for detecting a motion vector in an embodiment.
Figure 3B:
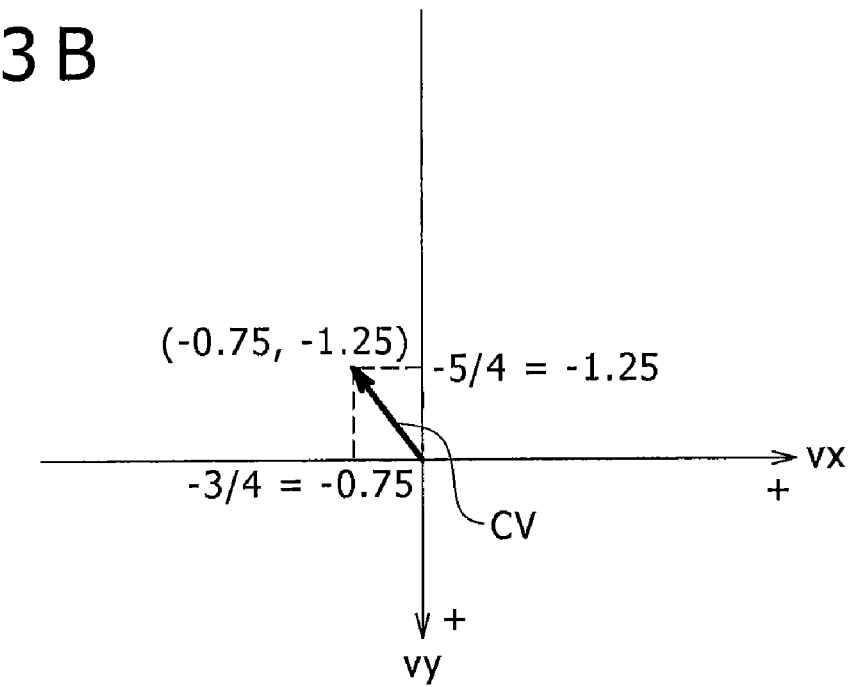
Figure 4:
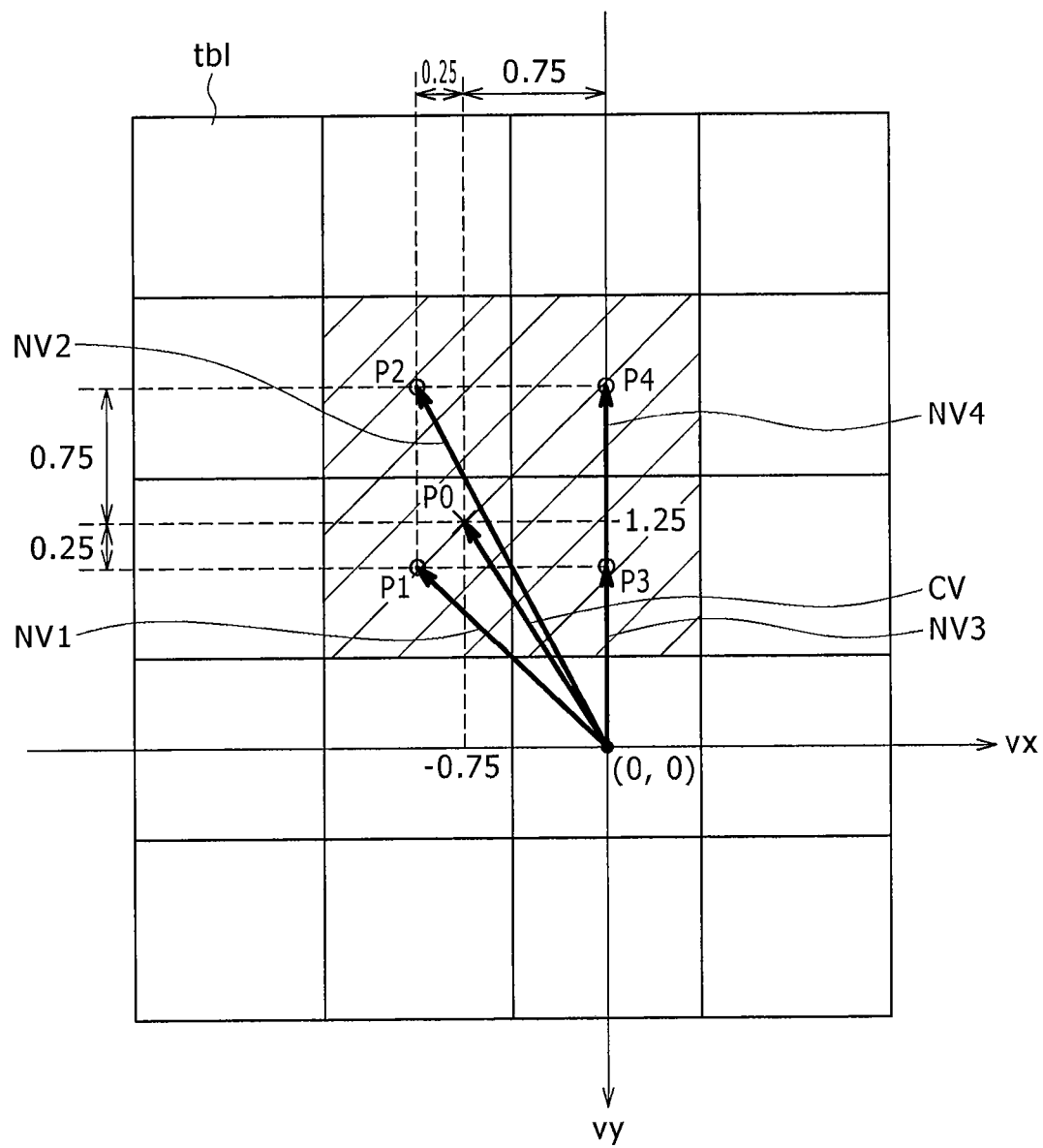
FIG. 4 is a diagram for explaining the outline of processing for detecting a motion vector in an embodiment.

FIGS. 2 to 4 are diagrams for explaining the outline of a novel block matching method used in the embodiment. FIG. 2 shows the relationship between an existing SAD table TBLo and a reduced SAD table TBLs created in the novel block matching method used in the embodiment.

Figure 47:
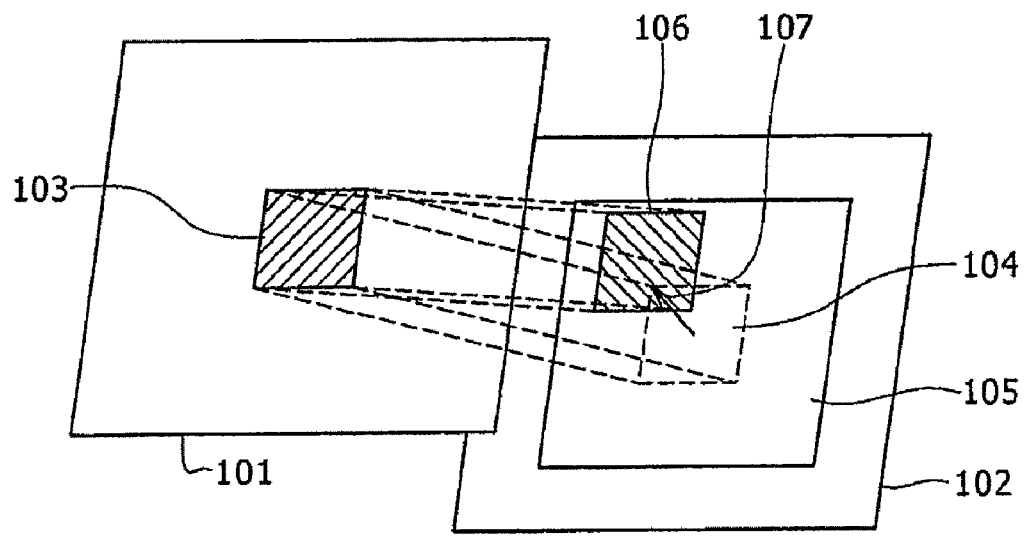
FIG. 47 is a diagram for explaining motion vector detection processing employing block matching.
Figure 48:
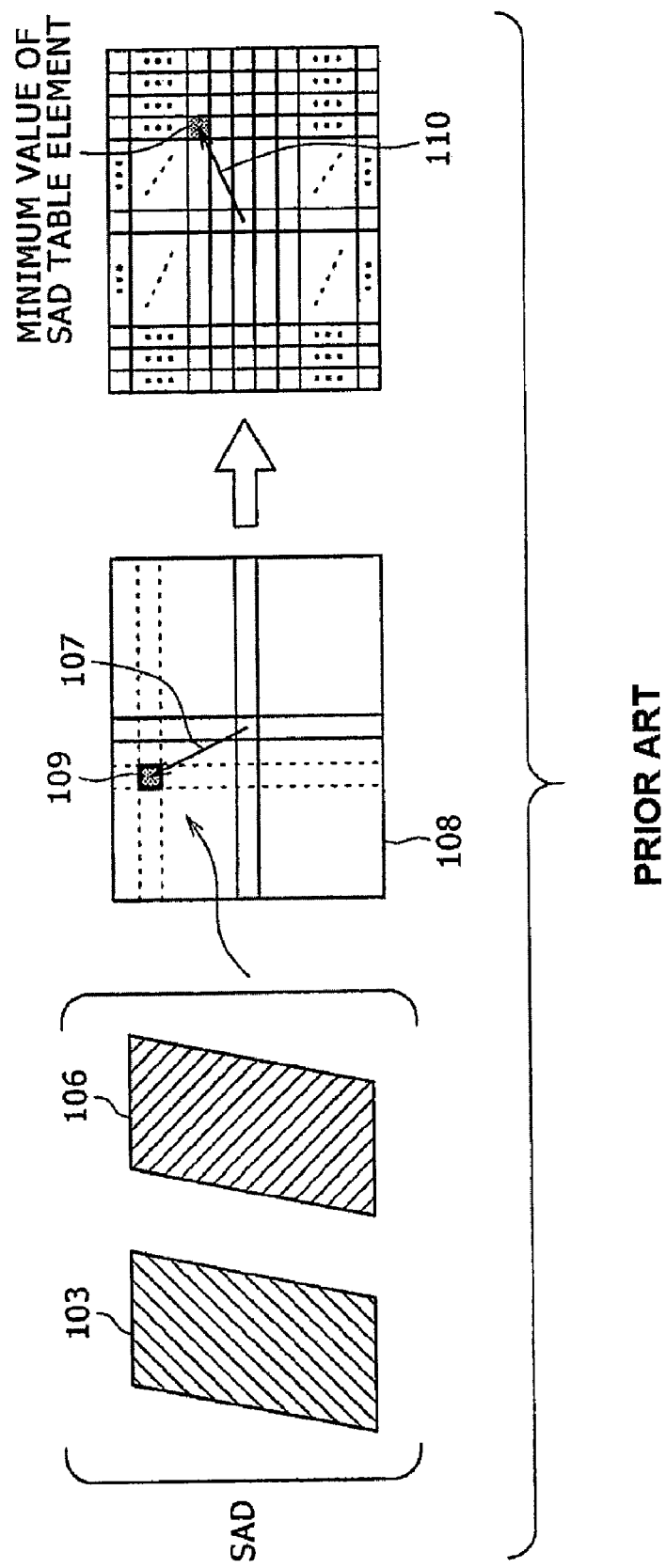
FIG. 48 is a diagram for explaining the motion vector detection processing employing block matching.

Also in this embodiment, similarly to an existing scheme shown in FIG. 47, a search range is defined on a reference frame with being centered on the position of a target block defined on an original frame. In this search range, the above-described plural reference blocks are defined, and the sum of the absolute value of the difference between the luminance value of each pixel in the reference block and that of the corresponding pixel in the target block, i.e., an SAD value, is calculated for each reference block.

In the existing scheme, as shown in FIG. 2, the obtained SAD value is written to the SAD table TBLo as a table element tb1 at the address corresponding to the reference vector RV of the reference block.

Therefore, in the existing block matching, one-to-one correspondence is made between the reference vector RV, which represents the position shift amount on a frame image between the target block and a reference block, and the SAD value of the reference block as a table element on the SAD table TBLo. That is, the existing SAD table TBLo includes the same number of table elements of SAD values as the reference vectors RV that can be defined in the search range.

In contrast, in the block matching of this embodiment, as shown in FIGS. 2, 3A and 3B, the size of the reference vector RV of the reference block is reduced by a reduction ratio of 1/n (n is a natural number) so as to be converted into a reference reduced vector CV.

In the following, the reduction ratio of the horizontal direction is made identical to that of the vertical direction for convenience of explanation. However, the reduction ratios may be independent of and different from each other. As described later, it is more preferable that the reduction ratios of the horizontal and vertical directions can be independently set to values obtained by dividing one by any natural number optionally, because high flexibility is obtained.

Also in this embodiment, similarly to the above-described existing block matching method, the position of the target block, at the center of the search range, is defined as the reference position (0, 0). A reference vector indicates the pixel-by-pixel basis shift amounts (vx, vy) (vx and vy are integer numbers) in the horizontal and vertical directions, respectively, from the reference position, and each of the reference vectors RV is represented as a reference vector (vx, vy).

When a reference vector (vx, vy) is reduced to 1/n about both the horizontal and vertical directions so as to be converted into a reference reduced vector (vx/n, vy/n), the position (vx/n, vy/n) indicated by this reference reduced vector (vx/n, vy/n) does not include integer numbers but includes decimal components in some cases. Therefore, in this embodiment, an error is caused if an SAD value obtained about the before-reduction original reference vector RV is stored as a table element corresponding to one reference vector closest to the reference reduced vector CV.

To address this, in this embodiment, initially plural positions (table elements) indicated by plural reference vectors near to the position (vx/n, vy/n) indicated by the reference reduced vector CV are detected. Subsequently, the SAD value obtained about the reference block of the reference vector RV is added with being distributed to the SAD values corresponding to the detected near plural reference vectors.

In this embodiment, calculation is carried out in the following manner to obtain the values that are to be distribution-added as the components that should be written to the table elements corresponding to the positions indicated by the peripheral plural reference vectors near to the reference reduced vector CV. Specifically, with use of the relationship among the positions indicated by the reference reduced vector and the near reference vectors, SAD values that are to be distribution-added to the near reference vectors are calculated from the SAD value obtained about the before-reduction original reference vector RV. Each of the calculated SAD values is added as the table element component of the corresponding reference vector.

The plural reference vectors near to the reference reduced vector are redundantly detected for plural different reference reduced vectors. Therefore, the execution of not only distribution but also addition is equivalent to addition of redundant SAD values of one reference block.

If the position (vx/n, vy/n) indicated by the reference reduced vector CV is identical to the position indicated by a reference vector, i.e., the values of vx/n and vy/n are integer numbers, plural peripheral reference vectors do not need to be detected, but the SAD value obtained about the before-reduction original reference vector RV is stored with being associated with the reference vector indicating the position (vx/n, vy/n).

The above-described processing will be described below based on a specific example. For example, when as shown in FIG. 3A, the reference vector RV indicating the position (−3, −5) is reduced to 1/n=¼ about the horizontal and vertical directions with the position of the target block being defined as the reference (0, 0), the position indicated by the reference reduced vector CV has a coordinate (−0.75, −1.25) as shown in FIG. 3B.

Therefore, the position indicated by the reference reduced vector CV involves decimal components, and hence is not identical to a position indicated by a reference vector.

In this case, as shown in FIG. 4, plural near reference vectors that indicate positions near to the position indicated by the reference reduced vector CV are detected. In the example of FIG. 4, for one reference reduced vector CV, four near reference vectors NV1, NV2, NV3 and NV4 are detected.

Furthermore, as described above, in this embodiment, the SAD value obtained about the reference block of the reference vector RV is distribution-added as the SAD values corresponding to these four near reference vectors NV1, NV2, NV3 and NV4.

In this case, in this embodiment, the SAD values to be distribution-added to the four near reference vectors NV1, NV2, NV3 and NV4 are calculated as linearly-weighted distribution values, by use of the positional relationship among the position P0 (represented by the cross symbol in FIG. 4) indicated by the reference reduced vector CV and the positions P1, P2, P3 and P4 (represented by the circle symbols in FIG. 4) indicated by the four near reference vectors NV1, NV2, NV3 and NV4, respectively.

In the example of FIG. 4, the position P0 indicated by the reference reduced vector CV internally divides the line segments along the horizontal and vertical directions between the respective sides of the square defined by the positions P1, P2, P3 and P4 indicated by the peripheral four near reference vectors NV1, NV2, NV3 and NV4, respectively. The division ratio in the horizontal direction is 1 to 3, and that in the vertical direction is 3 to 1.

Therefore, when the SAD value obtained about the before-reduction original reference vector RV is defined as Sα, values SADp1, SADp2, SADp3 and SADp4 to be distribution-added to the SAD table elements corresponding to positions P1, P2, P3 and P4 indicated by the peripheral four near reference vectors NV1, NV2, NV3 and NV4, respectively, are expressed as follows.

$SADp1 = S\alpha \times 9/16$ $SADp2 = S\alpha \times 3/16$ $SADp3 = S\alpha \times 3/16$ $SADp4 = S\alpha \times 1/16$ In this embodiment, the respective obtained values SADp1, SADp2, SADp3 and SADp4 are added to the SAD table elements corresponding to the positions P1, P2, P3 and P4 indicated by the four near reference vectors NV1, NV2, NV3 and NV4, respectively.

In this embodiment, the above-described processing is executed for all the reference blocks in the search range.

As described above, in this embodiment, if the size of the reference vector RV is reduced to 1/n, the reduced SAD table TBLs is prepared, which is obtained by reducing to 1/n about the horizontal and vertical directions the existing SAD table TBLo of which table elements are in one-to-one correspondence with all the reference vectors. In addition, SAD values corresponding to reference vectors near to the reference reduced vector CV are calculated as table elements in the reduced SAD table TBLs (see FIG. 2).

Therefore, in this embodiment, the number of table elements in the reduced SAD table TBLs is $1/n^2$ times the number of table elements in the existing SAD table TBLo. That is, the table size can be greatly decreased.

In the above-described embodiment, four reference vectors near to the reference reduced vector CV are detected, and the SAD value calculated about the target reference block (reference vector RV) is linearly weighted and distribution-added to the SAD table elements corresponding to the four near reference vectors. However, the way of selecting plural reference vectors near to the reference reduced vector CV and a method of the distribution-addition to the SAD table elements corresponding to the near reference vectors are not limited to the above-described example.

For example, if nine or sixteen reference vectors near to the reference reduced vector CV are detected, and distribution-addition based on so-called cubic interpolation is executed for the SAD table elements corresponding to the nine or sixteen near reference vectors, the accuracy is further enhanced. However, if much emphasis is put on real-time processing and reduction in the arithmetic circuit, it is more effective to carry out the above-described linearly-weighted distribution-addition to table elements corresponding to the four near reference vectors.

Also in this embodiment, similarly to the existing method, the reference block is moved across the entire search range, so that substitution to an SAD table (reduced SAD table, in this embodiment) is carried out for the SAD values of all the reference blocks.

However, in the existing method, mere substitution to an SAD table is allowed because reference vectors are in one-to-one correspondence with addresses of SAD table elements. In contrast, in the method of the embodiment, an SAD value calculated about a reference block is distribution-added, and hence reference vectors are not in one-to-one correspondence with table addresses in a reduced SAD table. Accordingly, the method of the embodiment may require not mere substitution of SAD values to table addresses but substitution following addition, i.e., so-called additional substitution. Furthermore, for the additional substitution, the respective table elements in an SAD table (reduced SAD table) should be initialized (cleared to 0) at the beginning.

In the existing block matching method, the SAD table completed in the above-described manner is searched for the table element having the minimum SAD value, and the table address of the minimum-value table element is converted into a reference vector, which is equivalent to completion of detection of a motion vector.

In contrast, in the method of the embodiment, the employed SAD table is a reduced SAD table corresponding to a reference reduced vector arising from reduction of a reference vector. Therefore, the minimum value in the reduced SAD table does not correspond with an accurate motion vector directly.

In the case of a device in which an error is permitted to some extent, detection of a motion vector through the following operation would also be available. Specifically, a reference vector arising from conversion of the table address of the minimum-value table element in the reduced SAD table is multiplied by the inverse number of the reduction ratio 1/n, i.e., multiplied by n, so that the resultant vector is treated as a motion vector.

However, when detection of a more accurate motion vector is intended, interpolation processing is executed for table element values in a reduced SAD table as described below, to thereby detect an accurate motion vector with the original vector accuracy.

First Example Of Interpolation Processing For Detecting More Accurate Motion Vector A first example of the interpolation processing for detecting a more accurate motion vector is a method in which plural SAD table element values (SAD values) in a reduced SAD table are approximated by one quadratic surface. This example is equivalent to applying of the method disclosed in Patent Document 1 to a reduced SAD table.

Specifically, from a reduced SAD table, the table element having the minimum SAD value (integer-accuracy minimum-value table element (integer-accuracy table address)) and plural integer-accuracy table elements centered on this integer-accuracy minimum-value table element are found. Next, by use of the SAD values of these table elements, the quadratic surface of the SAD values is determined through the least-square method. Subsequently, the SAD value as the minimum value on this quadratic surface is detected, and the position corresponding to the detected minimum SAD value (position, on a reference frame, shifted from the reference position) is detected. The detected position is defined as the decimal-accuracy minimum-value table address (corresponding to the vector offering the minimum SAD value in the reduced SAD table (this vector will be referred to as a minimum-value vector)).

Figure 5A:
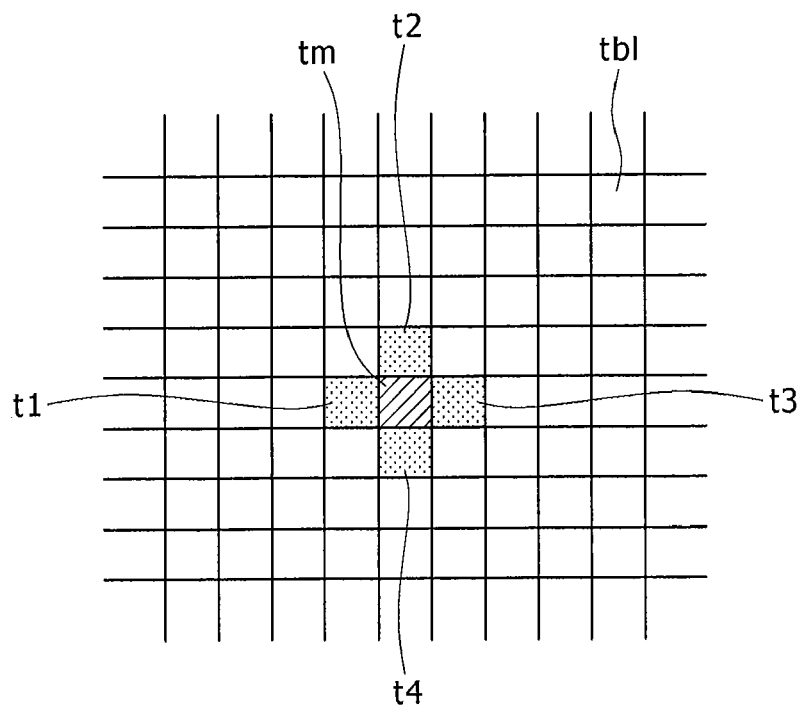
FIGS. 5A and 5B are diagrams for explaining a first example of processing for detecting an accurate motion vector in a method for detecting a motion vector according to an embodiment.
Figure 5B:
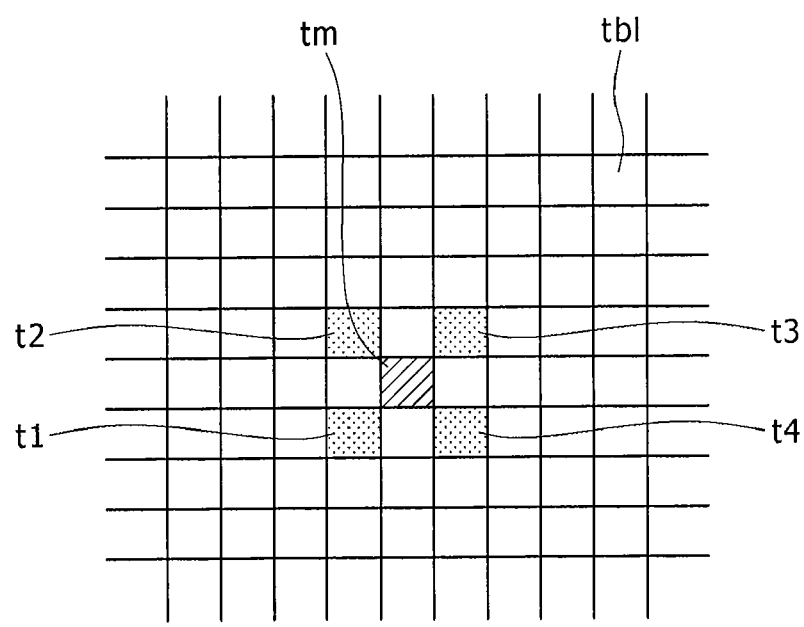

In order to define a unique quadratic surface, at least the following table elements may be required as shown in FIG. 5A or 5B: an integer-accuracy minimum-value table element tm; and four integer-accuracy table elements t1, t2, t3 and t4 that are near to the table element tm and sandwich the table element tm from both the sides thereof.

Figure 6:
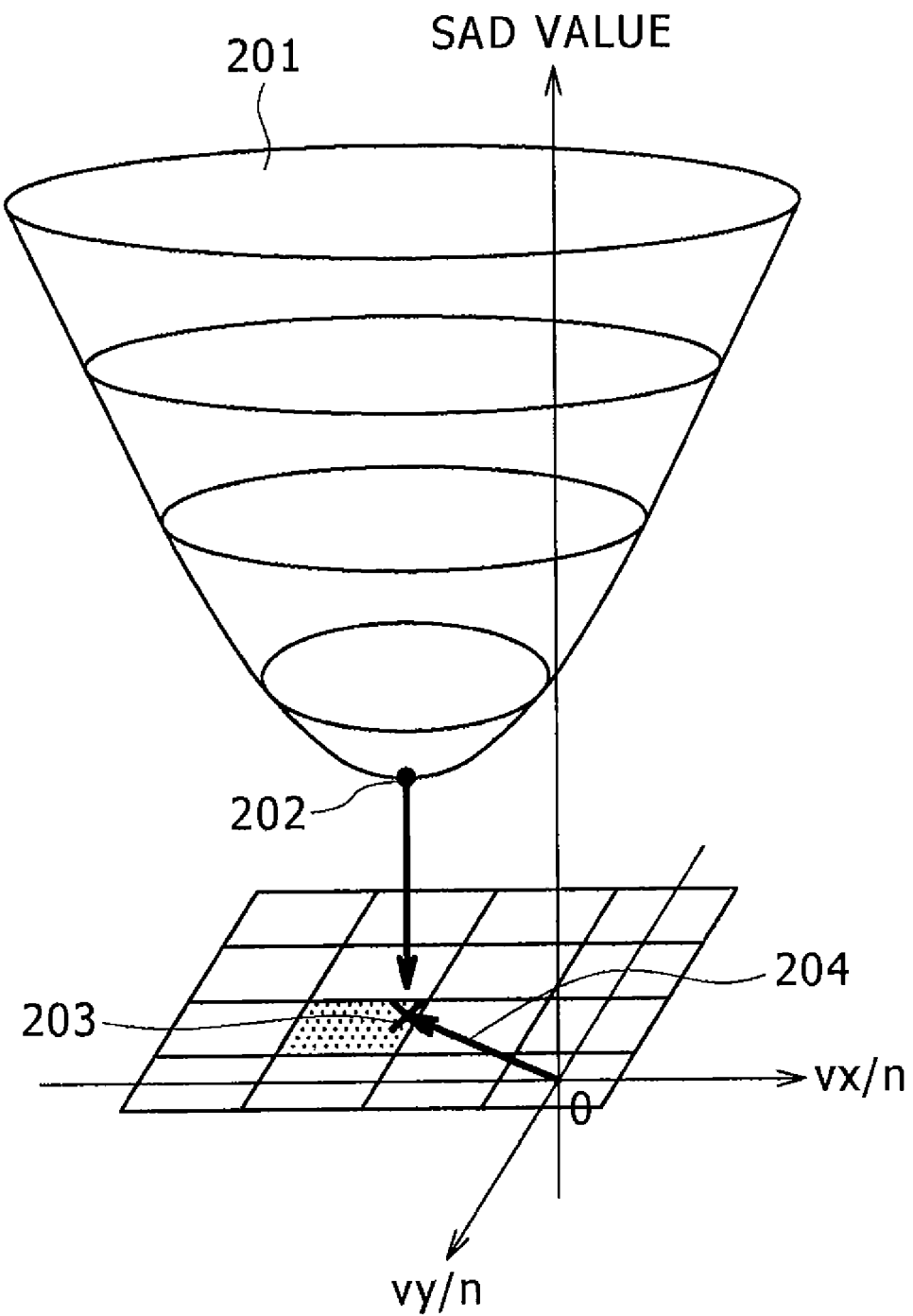
FIG. 6 is a diagram for explaining the first example of processing for detecting an accurate motion vector in a method for detecting a motion vector according to an embodiment.

Furthermore, as shown in FIG. 6, within the range of reference reduced vectors corresponding to the reduced SAD table in the search range on the reference frame, the axes vx/n and vy/n of shift amounts (corresponding to the reference reduced vectors) in the horizontal and vertical directions, respectively, are defined, with the position of the target block being defined as the reference position (0, 0). In addition, the axis of SAD values is defined as the axis perpendicular to these axes vx/n and vy/n, so that a coordinate space defined by these three axes is assumed.

Subsequently, from the SAD value of the integer-accuracy minimum-value table element tm and the SAD values of two table elements t1 and t3 that sandwich the integer-accuracy minimum-value table element tm, a quadratic curve is created in the coordinate space in FIG. 6. Furthermore, from the SAD value of the integer-accuracy minimum-value table element tm and the SAD values of other two table elements t2 and t4 that sandwich the minimum-value table element tm, another quadratic curve is created in the coordinate space in FIG. 6. Subsequently, a quadratic surface 201 including these two quadratic curves is obtained through the least-square method, and the quadratic surface 201 is created in the coordinate space as shown in FIG. 6.

Figure 7:
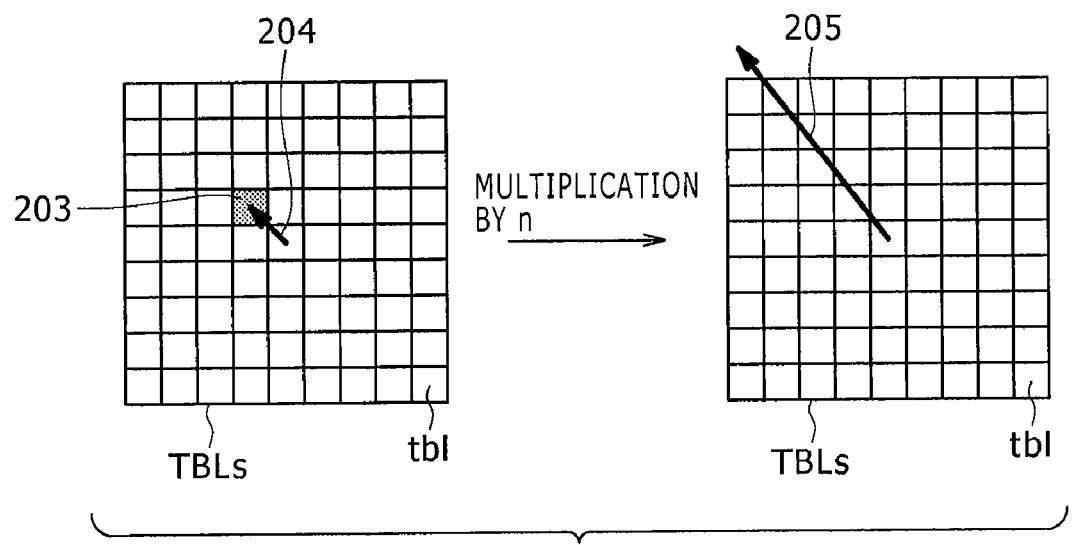
FIG. 7 is a diagram for explaining the outline of processing for detecting a motion vector in an embodiment.

Subsequently, a minimum value 202 on the created quadratic surface 201 of SAD values is detected, and the position (vx/n, vy/n) (position 203 in FIG. 6) corresponding to the detected minimum SAD value is detected. The detected position (vx/n, vy/n) is treated as a table element (table address) with decimal accuracy. Next, the vector (minimum-value vector) 204 corresponding to the detected decimal-accuracy table element is multiplied by n as shown in FIG. 7, to thereby obtain a motion vector 205 with the original magnitude accuracy.

Figure 8:
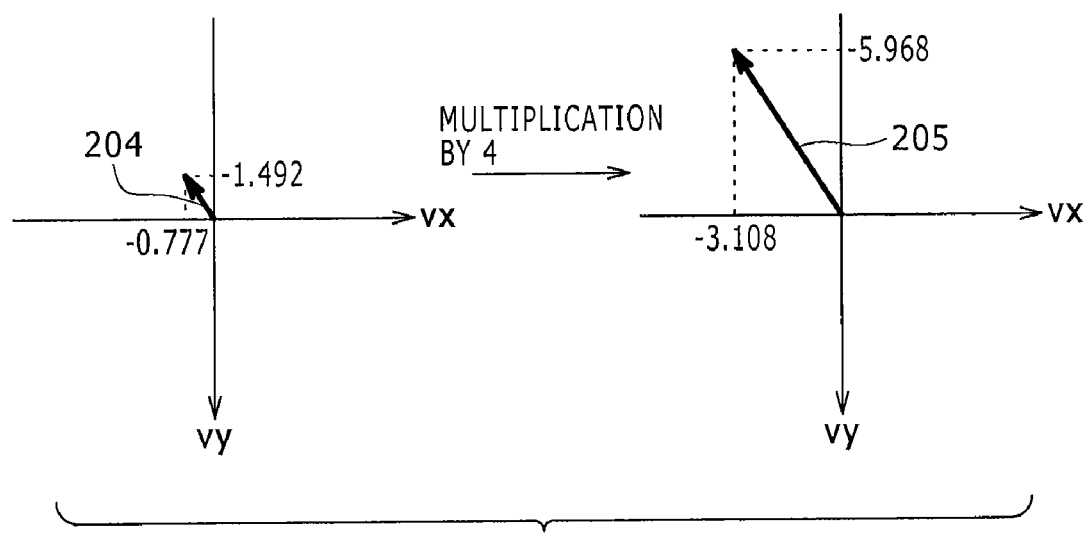
FIG. 8 is a diagram for explaining the outline of processing for detecting a motion vector in an embodiment.

For example, as shown in FIG. 8, if the size of a reference vector is reduced to ¼ and the minimum-value vector 204 obtained from the address of the minimum value of decimal-accuracy table elements on the reduced SAD table TBLs is (−0.777, −1.492), the vector (−3.108, −5.968) obtained by multiplying the minimum-value vector 204 by 4 is treated as the motion vector 205. This motion vector 205 reproduces a motion vector on the scale of the original image.

In the above-described example, the integer-accuracy minimum-value table element tm and four near table elements are employed. However, it is more preferable to use a larger number of plural near table elements for determination of a quadratic surface of SAD values through the least-square method. Therefore, a general scheme employs table elements in a rectangular region of horizontal m elements and vertical m elements (m is an integer number larger than 3, hereinafter referred to simply as table elements of an m×m rectangular region), centered on the integer-accuracy minimum-value table element tm.

However, it is not necessarily preferable to use a larger number of plural near table elements. Use of table elements in a wide range leads to a large operation amount and increases a possibility to use a local minimum pseudo value dependent upon the image pattern. Therefore, a proper number of plural near table elements in a rectangular region is employed.

In the following description of this embodiment, two examples will be described as an example in which a proper number of plural near table elements in a rectangular region are employed: an example in which table elements of a 3×3 rectangular region centered on the integer-accuracy minimum-value table element tm are employed; and an example in which table elements of a 4×4 rectangular region centered on the integer-accuracy minimum-value table element tm are employed.

Example Of Use Of Table Elements Of 3×3 Rectangular Region

FIG. 9 shows an example in which table elements of a 3×3 rectangular region (hatched area in FIG. 9) centered on the integer-accuracy minimum-value table element tm are employed.

Figure 9B:
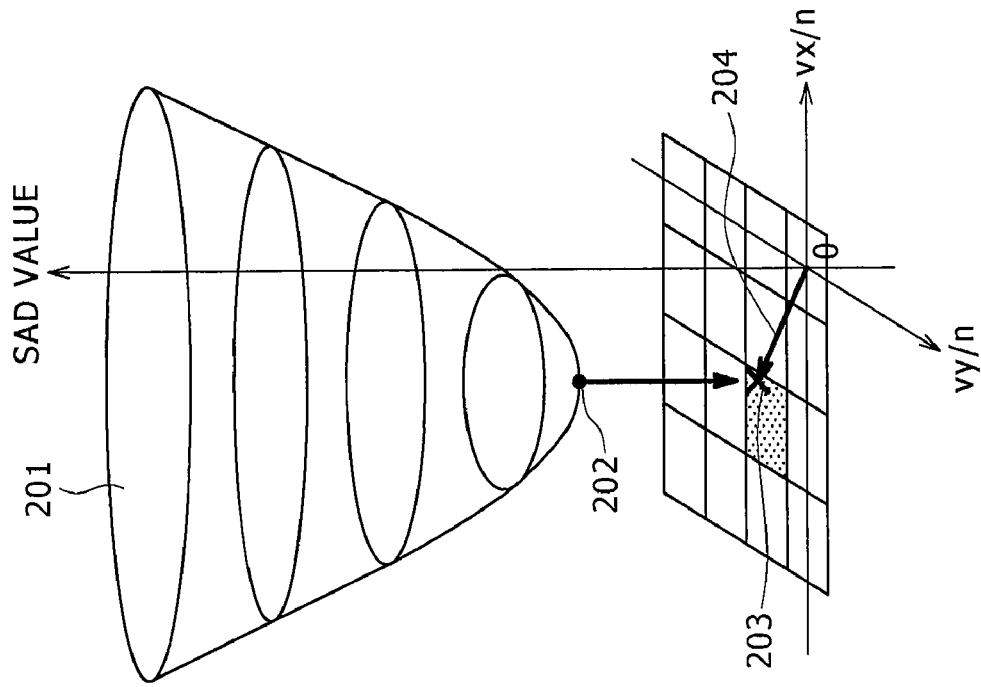
FIGS. 9A and 9B are diagrams for explaining the first example of processing for detecting an accurate motion vector in a method for detecting a motion vector according to an embodiment.
Figure 9A:
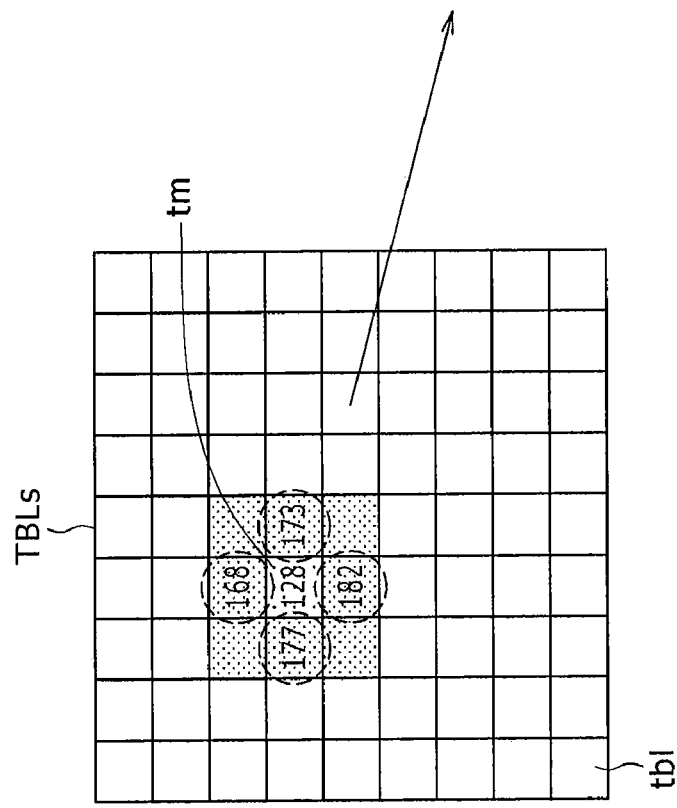

In the example of FIG. 9, as shown in FIG. 9A, the SAD values of the integer-accuracy minimum-value table element tm and eight near table elements are used to create the quadratic surface 201 shown in FIG. 9B through the least-square method. Subsequently, the minimum value 202 on the created quadratic surface 201 of SAD values is detected, and the position (vx/n, vy/n) (position 203 in FIG. 9B) corresponding to the detected minimum SAD value is detected. The detected position 203 is treated as the position of the decimal-accuracy minimum-value table element (decimal-accuracy minimum-value table address).

Next, the vector (minimum-value vector) 204 corresponding to the detected decimal-accuracy table element position 203 is multiplied by n as shown in the above-described FIG. 7, to thereby obtain the motion vector 205 with the original magnitude accuracy.

Figures 10, 11:
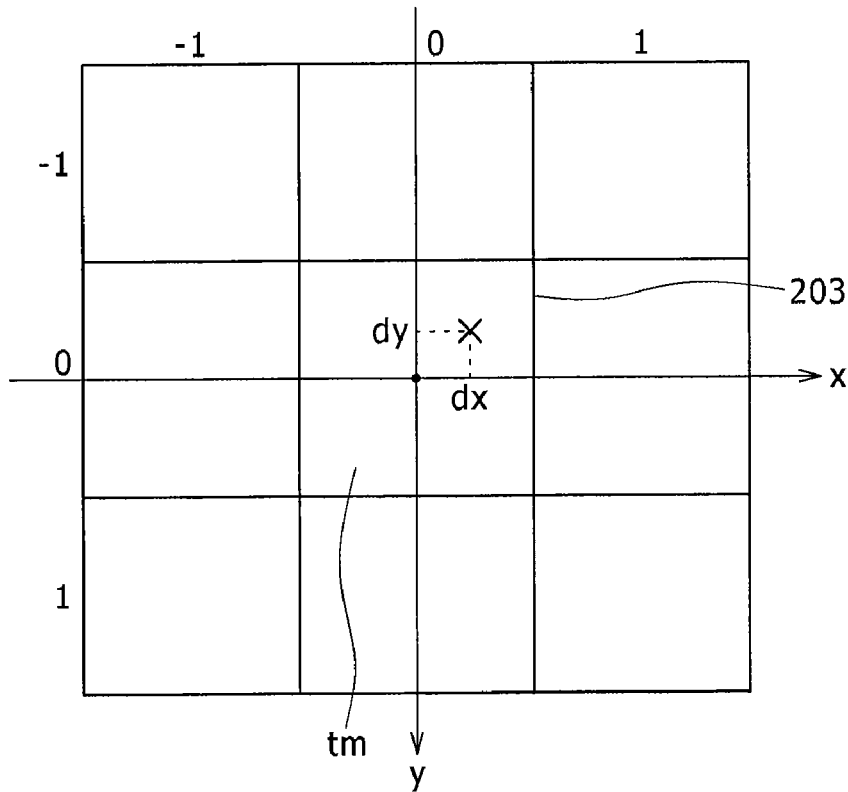
FIG. 10 is a diagram for explaining the first example of processing for detecting an accurate motion vector in a method for detecting a motion vector according to an embodiment.
FIG. 11 is a diagram for explaining the first example of processing for detecting an accurate motion vector in a method for detecting a motion vector according to an embodiment.

The method for calculating the position 203 corresponding to the minimum value 202 on the quadratic surface 201 of SAD values is as follows. Specifically, as shown in FIG. 10, a (x, y) coordinate system of which origin (0, 0) corresponds to the position of the integer-accuracy minimum-value table element tm is defined. In this case, the positions of the peripheral eight table elements are expressed by combinations between three x-coordinates of x=−1, 0 and 1 and three y-coordinates of y=−1, 0 and 1. That is, the eight positions are expressed as follows: (−1, −1), (0, −1), (1, −1), (−1, 0), (0, 1), (−1, 1), (0, 1), and (1, 1).

In this example, the SAD values of the respective table elements in the table of FIG. 10 are defined as Sxy. Therefore, for example, the SAD value of the integer-accuracy minimum-value table element tm (position (0, 0)) is expressed as $S_{00}$, and the SAD value of the table element at the lower-right position (1, 1) is expressed as $S_{11}$.

Based on this definition, the decimal-accuracy position (dx, dy) of the minimum SAD value in the (x, y) coordinate system of which origin (0, 0) corresponds to the position of the integer-accuracy minimum-value table element tm can be obtained by (Equation A) and (Equation B) shown in FIG. 11.

(Equation A) and (Equation B) of FIG. 11 involve the following relationships.

$Kx=-1$ if $x=-1$ $Kx=0$ if $x=0$ $Kx=1$ if $x=1$ $Ky=-1$ if $y=-1$ $Ky=0$ if $y=0$ $Ky=1$ if $y=1$

The thus obtained decimal-accuracy position (dx, dy) is the relative position to the position of the integer-accuracy minimum-value table element tm, which is defined as the origin (0, 0). Therefore, from the decimal-accuracy position (dx, dy) and the position of the integer-accuracy minimum-value table element tm, the position 203 relative to the center position of the related search range can be detected.

Example Of Use Of Table Elements Of 4×4 Rectangular Region

Figure 12B:
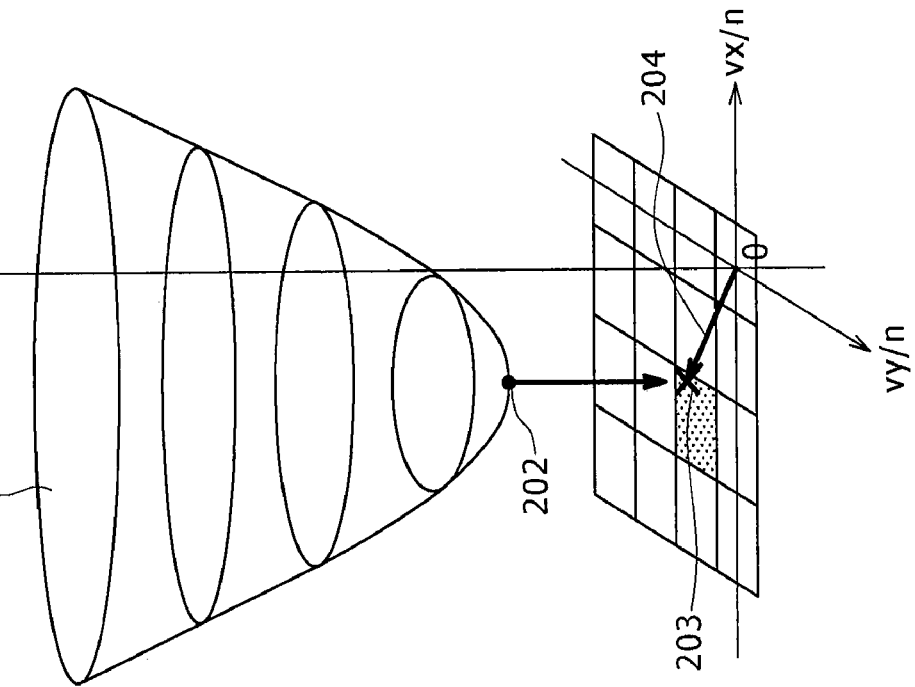
FIGS. 12A and 12B are diagrams for explaining the first example of processing for detecting an accurate motion vector in a method for detecting a motion vector according to an embodiment.
Figure 12A:
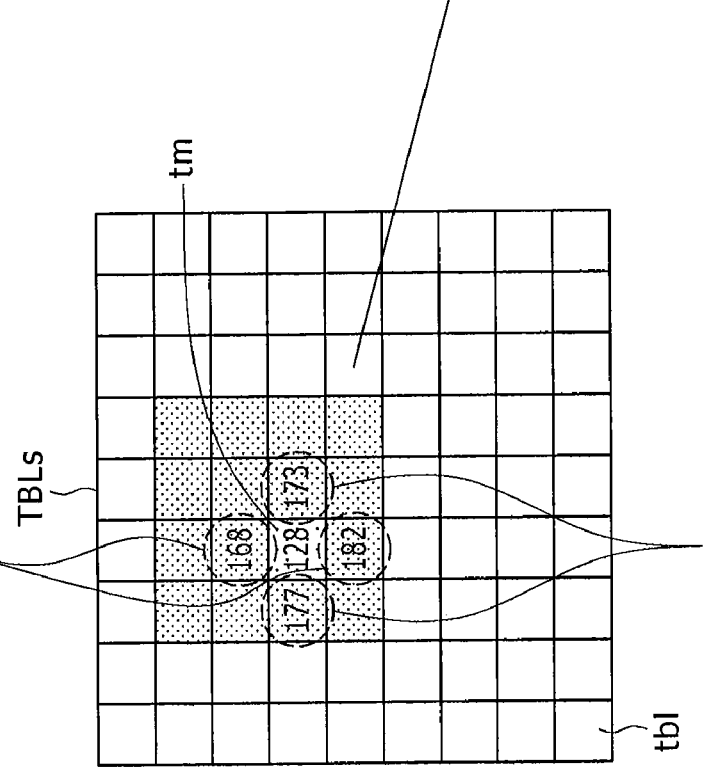

FIG. 12 shows an example in which table elements of a 4×4 rectangular region (hatched area in FIG. 12) approximately centered on the integer-accuracy minimum-value table element tm are employed.

If the above-described value m is an odd number, i.e., if the integer-accuracy minimum-value table element tm and eight table elements near thereto (3×3) or twenty-four table elements near thereto (5×5) are used for example, the integer-accuracy minimum-value table element tm is placed at the center of the employed rectangular region including the plural table elements. Therefore, the table range can be simply determined.

In contrast, if the value m is an even number, i.e., if fifteen near table elements (4×4) are used for example, the integer-accuracy minimum-value table element tm is not placed at the center position of the employed rectangular region including the plural table elements, and hence some degree of ingenuity may be required.

Specifically, the SAD values of two table elements that are adjacent to the integer-accuracy minimum-value table element tm in the horizontal direction are compared with each other, so that the table element adjacent to the table element having the smaller SAD value in the horizontal direction is employed as one of the near table elements on the fourth column of the 4×4 rectangular region. Similarly, the SAD values of two table elements that are adjacent to the integer-accuracy minimum-value table element tm in the vertical direction are compared with each other, so that the table element adjacent to the table element having the smaller SAD value in the vertical direction is employed as one of the near table elements on the fourth row of the 4×4 rectangular region.

More specifically, in the example of FIG. 12, the SAD values of two table elements that are adjacent to the integer-accuracy minimum-value table element tm in the horizontal direction are "177" and "173", respectively. Therefore, the column on the right side of the right adjacent table element having the smaller SAD value "173" is employed as the fourth column. Furthermore, the SAD values of two table elements that are adjacent to the integer-accuracy minimum-value table element tm in the vertical direction are "168" and "182", respectively. Therefore, the row on the upper side of the upper adjacent table element having the smaller SAD value "168" is employed as the fourth row.

In the example of FIG. 12, the SAD values of the integer-accuracy minimum-value table element tm and fifteen near table elements are used to create the quadratic surface 201 through the least-square method. Subsequently, the minimum value 202 on the created quadratic surface 201 of SAD values is detected, and the position (vx/n, vy/n) (position 203 in FIG. 12) corresponding to the detected minimum SAD value is detected. The detected position 203 is treated as the position of the decimal-accuracy minimum-value table element (decimal-accuracy minimum-value table address).

Next, the vector (minimum-value vector) 204 corresponding to the detected decimal-accuracy table element position 203 is multiplied by n as shown in the above-described FIG. 7, to thereby obtain the motion vector 205 with the original magnitude accuracy.

In this example, the method for calculating the position 203 corresponding to the minimum value 202 on the quadratic surface 201 of SAD values is as follows. Specifically, as shown in FIG. 13, a (x, y) coordinate system of which origin (0, 0) corresponds to the position of the integer-accuracy minimum-value table element tm is defined.

In this example, to cover the possible relative positions of the integer-accuracy minimum-value table element tm in the rectangular region composed of the sixteen table elements, four patterns of the table element arrangement shown in FIGS. 13A, 13B, 13C and 13D need to be taken into consideration.

In this case, as shown in FIGS. 13A, 13B, 13C and 13D, the positions of the peripheral fifteen table elements are expressed by combinations between four x-coordinates of x=−1, 0, 1 and 2 or −2 and four y-coordinates of y=−1, 0, 1 and 2 or −2.

Also in this example, the SAD values of the respective table elements in the table of FIG. 13 are defined as Sxy. Therefore, for example, the SAD value of the integer-accuracy minimum-value table element tm (position (0, 0)) is expressed as $S_{00}$, and the SAD value of the table element at the position (1, 1) is expressed as $S_{11}$.

Figures 14, 15:
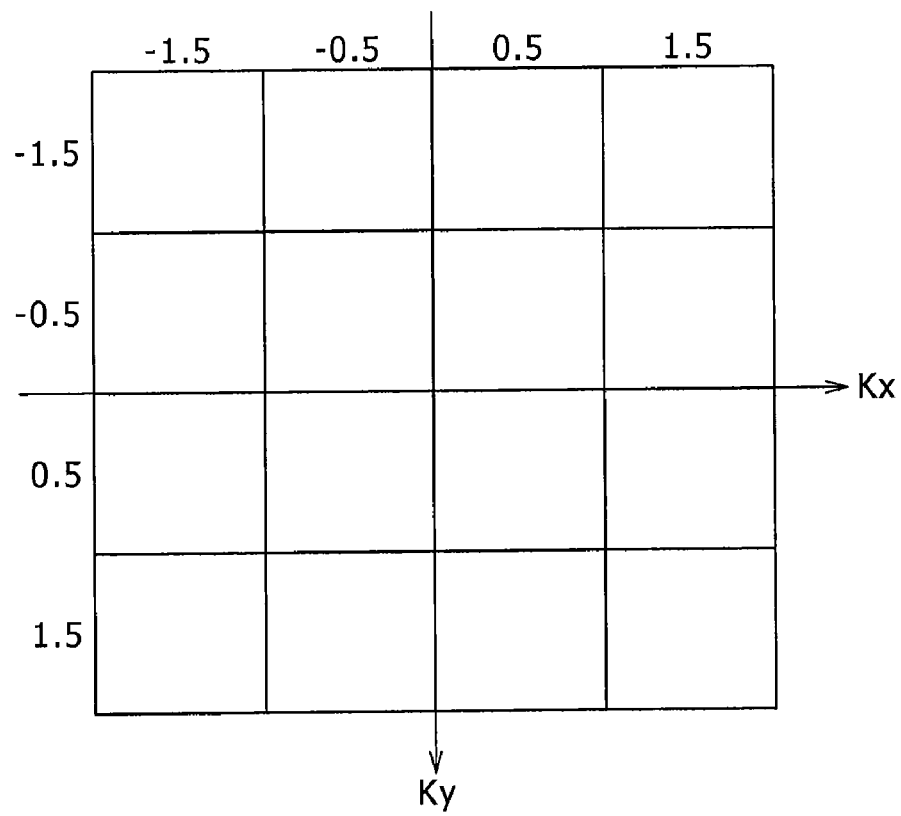
FIG. 14 is a diagram for explaining the first example of processing for detecting an accurate motion vector in a method for detecting a motion vector according to an embodiment.
FIG. 15 is a diagram for explaining the first example of processing for detecting an accurate motion vector in a method for detecting a motion vector according to an embodiment.

Based on this definition, the decimal-accuracy position (dx, dy) of the minimum SAD value in the (x, y) coordinate system of which origin (0, 0) corresponds to the center position of the rectangular region composed of the integer-accuracy minimum-value table element tm and peripheral sixteen table elements can be obtained by (Equation C) and (Equation D) shown in FIG. 14.

Symbols Kx and Ky in (Equation C) and (Equation D) of FIG. 14 denote the values on a (Kx, Ky) coordinate system of which origin (0, 0) corresponds to the center position of the rectangular region composed of the integer-accuracy minimum-value table element tm and peripheral sixteen table elements. The values Kx and Ky are dependent on the table element arrangement, of which four patterns are shown in FIGS. 13A, 13B, 13C and 13D. FIG. 15 shows the (Kx, Ky) coordinate system.

Specifically, for the arrangement of FIG. 13A, the values Kx and Ky are defined as follows.

$Kx=-1.5$ if $x=-2$ $Kx=-0.5$ if $x=-1$ $Kx=0.5$ if $x=0$ $Kx=1.5$ if $x=1$ $Ky=-1.5$ if $y=-2$ $Ky=-0.5$ if $y=-1$ $Ky=0.5$ if $y=0$ $Ky=1.5$ if $y=1$

For the arrangement of FIG. 13B, the values Kx and Ky are defined as follows.

$Kx=-1.5$ if $x=-2$ $Kx=-0.5$ if $x=-1$ $Kx=0.5$ if $x=0$ $Kx=1.5$ if $x=1$ $Ky=-1.5$ if $y=-1$ $Ky=-0.5$ if $y=0$ $Ky=0.5$ if $y=1$ $Ky=1.5$ if $y=2$

Figure 13B:
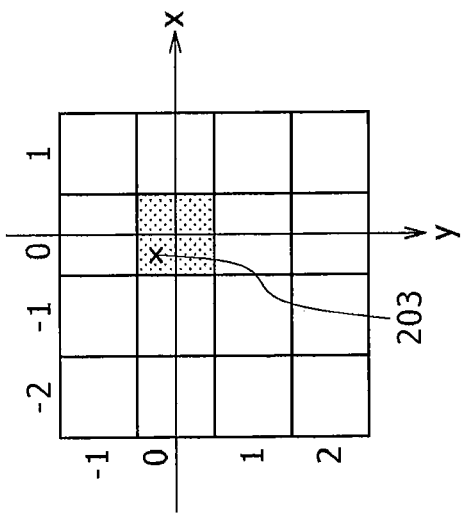
FIGS. 13A to 13D are diagrams for explaining the first example of processing for detecting an accurate motion vector in a method for detecting a motion vector according to an embodiment.
Figure 13D:
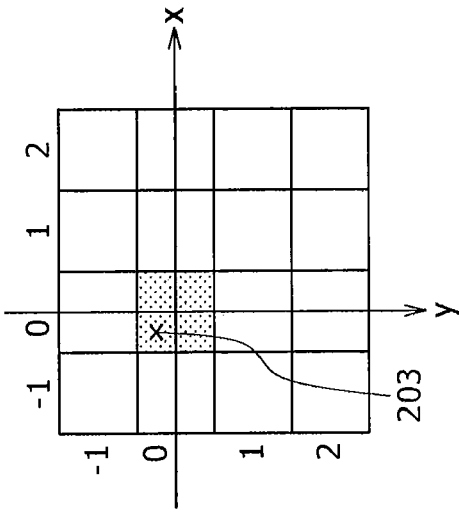

For the arrangement of FIG. 13C, the values Kx and Ky are defined as follows.

$Kx=-1.5$ if $x=-1$ $Kx=-0.5$ if $x=0$ $Kx=0.5$ if $x=1$ $Kx=1.5$ if $x=2$ $Ky=-1.5$ if $y=-2$

Ky=−0.5 if y=−1

Ky=0.5 if y=0

Ky=1.5 if y=1

For the arrangement of FIG. 13D, the values Kx and Ky are defined as follows.

Kx=−1.5 if x=−1

Kx=−0.5 if x=0

Kx=0.5 if x=1

Kx=1.5 if x=2

Ky=−1.5 if y=−1

Ky=−0.5 if y=0

Ky=0.5 if y=1

Ky=1.5 if y=2

Furthermore, symbols Δx and Δy in (Equation C) and (Equation D) of FIG. 14 denote the shift amounts of the (x, y) coordinates, relative to the (Kx, Ky) coordinates, for the respective table element arrangements of FIGS. 13A, 13B, 13C and 13D.

Figure 13A:
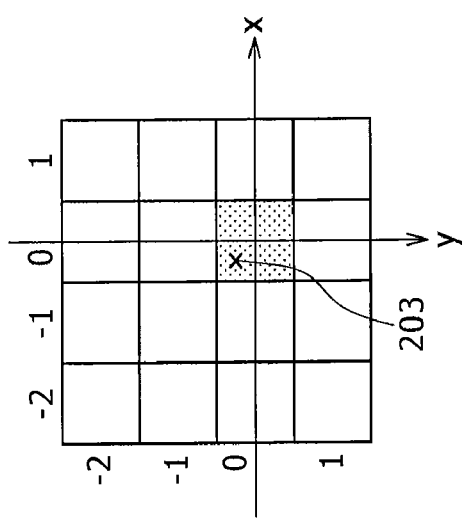
Figure 13C:
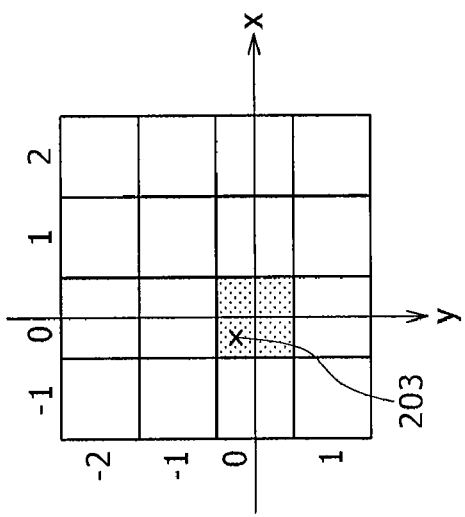

Specifically, for the arrangement of FIG. 13A, Δx=−0.5, Δy=−0.5.

For the arrangement of FIG. 13B, Δx=−0.5, Δy=0.5.
For the arrangement of FIG. 13C, Δx=0.5, Δy=−0.5.
For the arrangement of FIG. 13D, Δx=0.5, Δy=0.5.

The thus obtained decimal-accuracy position (dx, dy) is the relative position to the position of the integer-accuracy minimum-value table element tm, which is defined as the origin (0, 0). Therefore, from the decimal-accuracy position (dx, dy) and the position of the integer-accuracy minimum-value table element tm, the position 203 relative to the center position of the related search range can be detected.

Second Example Of Interpolation Processing For Detecting More Accurate Motion Vector In a second example of the interpolation processing for detecting a more accurate motion vector, a cubic curve along the horizontal direction is created by use of the SAD values of plural table elements along the horizontal direction, in a reduced SAD table, including the integer-accuracy minimum-value table element. Furthermore, a cubic curve along the vertical direction is created by use of the SAD values of plural table elements along the vertical direction, including the integer-accuracy minimum-value table element. Subsequently, the position (vx, vy) corresponding to the minimum values on the respective cubic curves is detected, so that the detected position is defined as the decimal-accuracy minimum-value address.

Figure 16B:
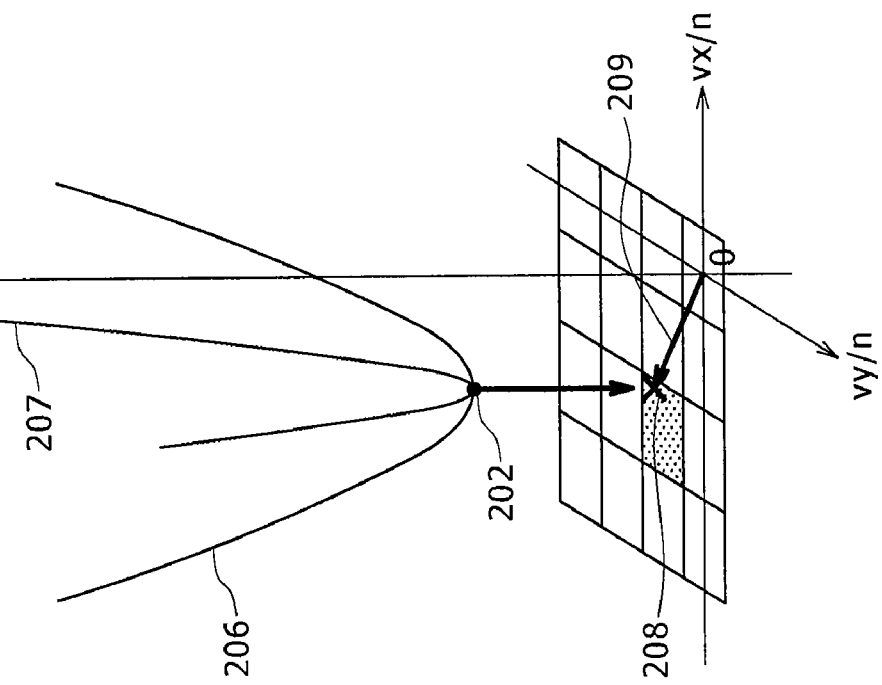
FIGS. 16A and 16B are diagrams for explaining a second example of processing for detecting an accurate motion vector in a method for detecting a motion vector according to an embodiment.
Figure 16A:
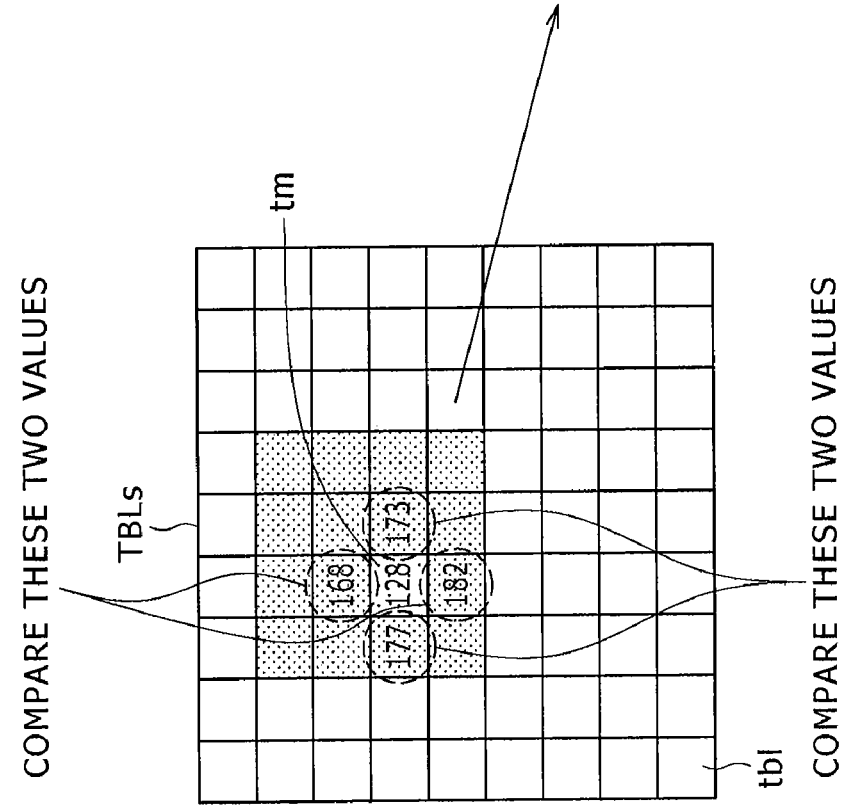

FIG. 16 is a diagram for explaining the second example. Similarly to the first example, the integer-accuracy minimum-value table element tm and plural integer-accuracy table elements around the integer-accuracy minimum-value table element are employed. In the example of FIG. 16, 4×4 (=16) table elements (hatched area in FIG. 16A) are employed.

Subsequently, similarly to the first example, as shown in FIG. 16B, within the range of reference reduced vectors corresponding to the reduced SAD table in the search range on the reference frame, the axes vx/n and vy/n of shift amounts (corresponding to the reference reduced vectors) in the horizontal and vertical directions, respectively, are defined, with the position of the target block being defined as the reference position (0, 0). In addition, the axis of SAD values is defined as the axis perpendicular to these axes vx/n and vy/n, so that a coordinate space defined by these three axes is assumed.

Subsequently, by using the SAD values of the four table elements along the horizontal direction including the integer-accuracy minimum-value table element tm, of the sixteen table elements including the integer-accuracy minimum-value table element tm, a cubic curve 206 along the horizontal direction is created in the coordinate space. Furthermore, the horizontal position vx/n corresponding to the minimum value on the horizontal cubic curve 206 is detected as the horizontal position of the decimal-accuracy minimum-value table element.

Subsequently, by using the SAD values of the four table elements along the vertical direction including the integer-accuracy minimum-value table element tm, of the sixteen table elements including the integer-accuracy minimum-value table element tm, a cubic curve 207 along the vertical direction is created in the coordinate space. The vertical position vy/n corresponding to the minimum value on the vertical cubic curve 207 is detected as the vertical position of the decimal-accuracy minimum-value table element.

From the detected horizontal and vertical positions of the decimal-accuracy minimum-value table element, a decimal-accuracy minimum-value table element position (decimal-accuracy minimum-value table address) 208 is obtained. Next, a vector (minimum-value vector) 209 corresponding to the detected decimal-accuracy table element position 208 is multiplied by n as shown in the above-described FIG. 7, to thereby obtain a motion vector with the original magnitude accuracy.

That is, the second example is a method in which four table elements along the horizontal direction and four table elements along the vertical direction are determined through the method of the first example, and then a cubic curve is uniquely defined for each of the horizontal and vertical directions as shown in FIG. 16B.

The method for calculating the position 208 corresponding to the minimum values 202 on the cubic curves 206 and 207 of SAD values is as follows. Specifically, the four SAD values in the vicinity of the minimum value on the cubic curve along the horizontal or vertical direction are defined as $S_0$, $S_1$, $S_2$ and $S_3$ in the order along the horizontal or vertical direction. Depending on which of three sections Ra, Rb, and Rc shown in FIG. 17 includes the decimal-accuracy minimum value, the equation for calculating a decimal component u that offers the minimum value is different.

The section Ra ranges between the positions of the SAD values $S_0$ and $S_1$. The section Rb ranges between the positions of the SAD values $S_1$ and $S_2$. The section Rc ranges between the positions of the SAD values $S_2$ and $S_3$.

Figure 17:
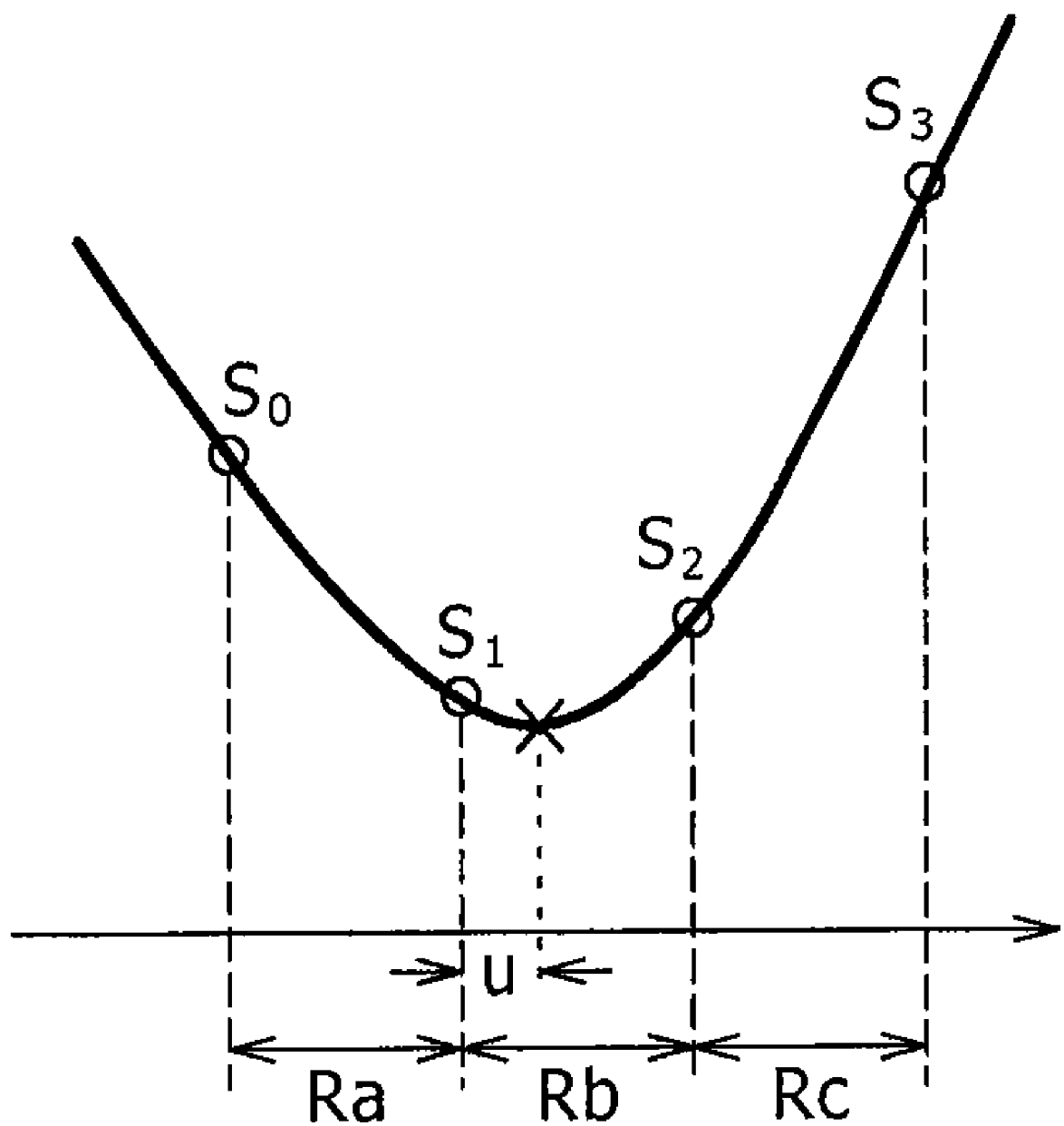
FIG. 17 is a diagram for explaining the second example of processing for detecting an accurate motion vector in a method for detecting a motion vector according to an embodiment.

If the section Ra shown in FIG. 17 includes the decimal-accuracy minimum value, by using (Equation E) of FIG. 18, the decimal component u equivalent to the shift between the integer-accuracy minimum-value position and the decimal-accuracy minimum-value position is calculated.

If the section Rb shown in FIG. 17 includes the decimal-accuracy minimum value, by using (Equation F) of FIG. 18, the decimal component u equivalent to the shift between the integer-accuracy minimum-value position and the decimal-accuracy minimum-value position is calculated.

If the section Rc shown in FIG. 17 includes the decimal-accuracy minimum value, by using (Equation G) of FIG. 18, the decimal component u equivalent to the shift between the integer-accuracy minimum-value position and the decimal-accuracy minimum-value position is calculated.

A determination as to which of the three sections Ra, Rb and Rc shown in FIG. 17 includes the decimal-accuracy minimum value is made in the following manner.

FIG. 19 is a diagram for explaining the determination manner. As shown in FIGS. 19A, 19B and 19C, initially the minimum integer-accuracy SAD value Smin and the second smallest integer-accuracy SAD value Sn2 are detected, so that the section between the positions of the detected minimum integer-accuracy SAD value Smin and second smallest integer-accuracy SAD value Sn2 is detected as the section including the decimal-accuracy minimum value. Subsequently, a determination is made as to which of the sections Ra, Rb and Rc the detected section corresponds to, depending on which of the SAD values S0, S1, S2 and S3 shown in FIG. 17 the minimum integer-accuracy SAD value Smin and the second smallest integer-accuracy SAD value Sn2 correspond to.

Figure 19A:
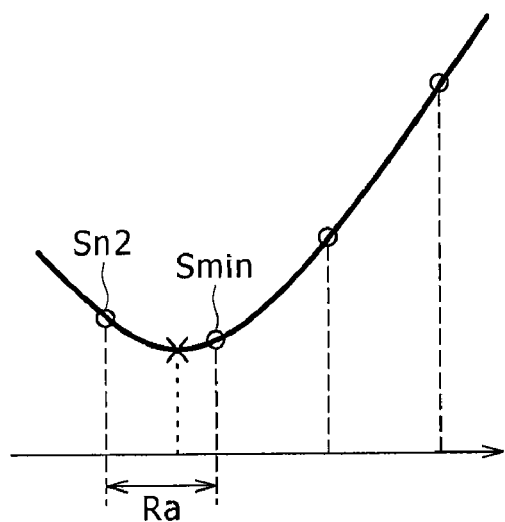
FIGS. 19A to 19D are diagrams for explaining the second example of processing for detecting an accurate motion vector in a method for detecting a motion vector according to an embodiment.
Figure 19B:
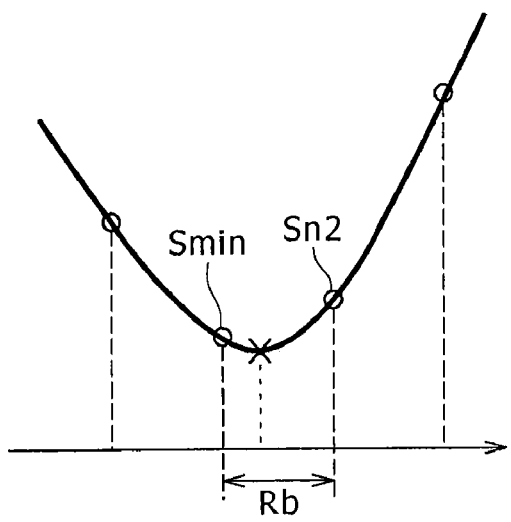
Figure 19C:
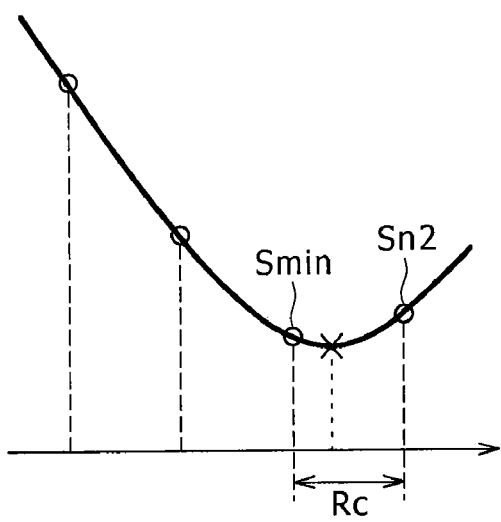
Figure 19D:
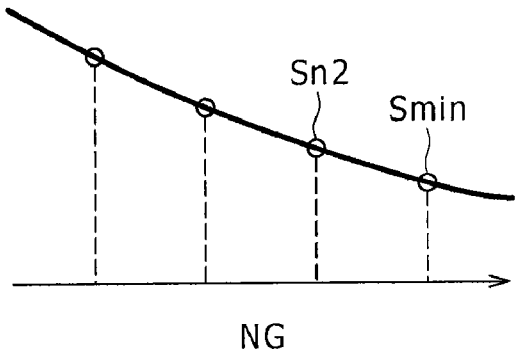

In this embodiment, if the minimum integer-accuracy SAD value 5 min is positioned at an end of the four table element values as shown in FIG. 19D, this state is treated as an error and hence the minimum-value position is not calculated based on a determination that the estimation of the minimum-value position is impossible. However, it should be obvious that the minimum-value position may be calculated also in the case of FIG. 19D.

As described above, according to this embodiment, a motion vector on the scale of an original image can be detected by using a reduced SAD table with a small size resulting from downsizing to $1/n^2$. FIG. 20 shows that the embodiment can obtain almost the same vector detection result as that by existing schemes although a reduced SAD table with a small size resulting from downsizing to $1/n^2$ is used.

The abscissa in FIG. 20 indicates the reduction ratio $1/n$ in a one-dimensional direction of the horizontal or vertical direction. The ordinate indicates an error in the detected motion vector (vector error). The numeric value of the vector error of FIG. 20 is represented by the number of pixels.

In FIG. 20, a curve 301 indicates the average of the vector error as a function of the reduction ratio. A curve 302 indicates the triple of the variance σ of the vector error (3σ (99.7%)) as a function of the reduction ratio. The curve 303 indicates an approximate straight line of the curve 302.

The reduction ratio $1/n$ shown in FIG. 20 as a parameter of the vector error variation is a ratio regarding a one-dimensional direction. Because the number of dimensions of an SAD table is two, a table size (the number of table elements) is reduced at the rate of the square of the reduction ratio shown in FIG. 20. However, even in response to this rapid size reduction, linear increases are shown as the increase in the vector error. This proves the usefulness of the method of this embodiment.

Furthermore, even at a reduction ratio of 1/64, the vector error is small and a failure such as detection and output of a very different motion vector is not observed. It follows that the size of an SAD table can be reduced to 1/4096 practically.

In camera shake correction for a moving image, real-time processing and reduction in system delay are strongly demanded as described above. In contrast, as for the accuracy thereof, some degree of vector detection error, excluding a failure of detection of a very different motion vector, is permitted. Therefore, it can be concluded that this embodiment, which can greatly reduce the size of an SAD table without a failure, provides high usefulness.

In an actual camera shake correction system, the reference frame 102 is divided into plural regions, and the motion vector 205 is detected for each of the divided regions. This is because there is a high possibility that a frame includes a moving object. Specifically, to take into consideration also the effect of a moving object, as shown in FIG. 21, sixteen motion vectors 205 are detected in one reference frame 102 for example. The detected motion vectors are processed statistically, with transition from the motion vectors 205 in past frames being also taken into consideration, to thereby determine one global vector per one frame, i.e., a camera shake vector of the frame.

For this operation, as shown in FIG. 21, search ranges SR1, SR2, ..., SR16 centered on reference positions PO1 to PO16 of the sixteen motion vectors 205 to be detected are defined, and image blocks IB1, IB2, ..., IB16 as projections of a target block are assumed in the respective search ranges.

Furthermore, reference blocks each having the same size as that of the projection image blocks IB1, IB2, ..., IB16 are defined. The defined reference blocks are moved in the respective search ranges SR1, SR2, ..., SR16 to thereby create reduced SAD tables similarly to the above description, so that the motion vectors 205 in the search ranges SR1, SR2, ..., SR16 are detected.

Subsequently, by use of the plural motion vectors obtained from the plural target blocks acquired in the reference frame, processing is executed statistically with transition from motion vectors in past frames being also taken into consideration, to thereby determine one global vector per one frame, i.e., a camera shake vector of the frame.

Compared with the existing method disclosed in Japanese Patent Laid-open NO. 2005-38396, in which a motion vector is detected on an image with a size resulting from image reduction conversion, the above-described image processing method of the embodiment offers greater advantages in terms of the following two points.

First, the method of this embodiment does not require the process of reducing an image at all unlike the existing method disclosed in Japanese Patent Laid-open NO. 2005-38396. This is because in the embodiment of this embodiment, address conversion corresponding to a reduction ratio is carried out simultaneously with additional substitution of SAD values calculated about a reference block into a SAD table (reduced SAD table).

Therefore, the method of this embodiment has an advantage of being free from the following factors unlike the existing method disclosed in Japanese Patent Laid-open NO. 2005-38396: necessity for logics to reduce an image; consumption of time and bandwidth accompanying storing of a reduced image in a memory; and necessity to ensure a region in the memory for the storing of a reduced image.

Secondly, as another serious problem in the existing method disclosed in Japanese Patent Laid-open NO. 2005-38396, there is a problem in the existence of a low-pass filter to remove aliasing and low-illuminance noise arising in the reduction conversion of an image as described above. Specifically, when an image is to be reduced, the image needs to be subjected to resampling after passing through a proper low-pass filter. Otherwise, unnecessary aliasing is caused, which significantly deteriorates the accuracy of detection of a motion vector with use of the reduced image.

It has been theoretically proven that the characteristics of an ideal low-pass filter for the reduction conversion encompass a function similar to the sinc function. The sinc function itself is expressed in the form of $\sin(x\Pi)/(x\Pi)$ and is realized by an infinite tap finite impulse response (FIR) filter having a cut-off frequency of $f/2$. When a reduction ratio is $1/n$, the function of the ideal low-pass filter with a cut-off frequency of f/(2n) is expressed as sin(xII/n)/(xII/n). However, this function may also be treated as one form of the sinc function.

The forms of the sinc function (ideal characteristic of a low-pass filter) when the reduction ratio is ½, ¼ and ⅛ are shown on the upper side of FIGS. 22, 23 and 24, respectively. FIGS. 22 to 24 show that a larger reduction ratio leads to a higher degree of expansion of the function in the tap axis direction. That is, even when the sinc function of an infinite tap filter is approximated by major coefficients, the number of taps in the FIR filter needs to be increased.

Furthermore, it is generally known that in a filter that realizes a cut-off frequency in a lower band, not the filter shape but the number of taps affects the performance of the filter more dominantly.

Accordingly, the existing method disclosed in Japanese Patent Laid-open NO. 2005-38396, in which a motion vector is calculated with use of a reduced image, involves the following contradiction. Specifically, although a larger ratio of the image reduction leads to larger effect of reduction in a SAD table, a larger reduction ratio leads to higher costs of a low-pass filter as a filter for preprocessing of image creation.

In general, when a higher-order tap FIR filter is realized, costs of arithmetic logics are increased in proportion to the square of the number of taps, which leads to a problem. However, a more serious problem is an increase in the number of line memories for realizing a vertical filter. In recent digital still cameras, for reduction in the size of line memories accompanying an increase in the number of pixels, so-called strip processing is executed. However, even if the size per one line is reduced, an increase in the number of line memories itself significantly increases the total costs, converted into the physical layout area.

As described above, the image reduction approach in the existing method disclosed in Japanese Patent Laid-open NO. 2005-38396 involves a large barrier to realization of a vertical low-pass filter in particular. In contrast, the method of the present embodiments can solve this problem simply in a very different manner.

The images of a low-pass filter in the novel block matching method employed in this embodiment are shown on the lower side of FIGS. 22 to 24. The novel block matching method employed in this embodiment is not accompanied by image reduction processing; the images shown in these diagrams relate to a low-pass filter in the process of creating a reduced SAD table.

As shown in the lower side of FIGS. 22 to 24, although this low-pass filter has a simple filter characteristic obtained by approximating major coefficient part of the sinc function by a linear function, the number of taps therein increases in linkage with the reduction ratio. This feature is suitable for the above-described fact that the number of taps affects the performance of a low-pass filter more dominantly as the cut-off frequency becomes lower. That is, the SAD distribution-addition processing itself in the present embodiments, such as the processing of linearly-weighted distribution-addition in the above-described embodiment, is equivalent to implementation of a high-performance low-pass filter linked with the reduction ratio by use of a simple circuit.

There are also other advantages regarding the low-pass filter. In the existing method disclosed in Japanese Patent Laid-open NO. 2005-38396, an image is reduced through resampling subsequent to passage of the image through a low-pass filter. When the reduced image has been created, a considerable number of image information pieces have been lost. That is, the image is stored in a memory after the word length of the luminance values in the image information is greatly shortened through the arithmetic operation in the low-pass filter. Thus, most of less significant bits of pixel information have no effect on the reduced image.

In contrast, in the novel block matching method employed in this embodiment, the entire bit information of the luminance values of all the pixels is equally used without loss to calculate SAD values, so that distribution values of the SAD values are obtained so as to be added to a reduced SAD table. As long as the word length of each table element value in the reduced SAD table is increased, arithmetic operation can be performed in the form of not involving a round-off error at all until the final output of SAD values. Because the area of the reduced SAD table is smaller than that of a frame memory, the expansion of the word length of the reduced SAD table does not lead to a serious problem. As a result, creation of the reduced SAD table and detection of motion vectors can be realized with high accuracy.

Processing Operation of Motion Vector Detector 15

FIRST EXAMPLE

The flow of a first example of the processing operation by the motion vector detector 15 will be described below with reference to the flowchart of FIGS. 25 and 26.

Initially, the reference vector (vx, vy) corresponding to one reference block Ii in the search range 105 or each of the search ranges SR1 to SR16 shown in FIG. 47 or 21 is specified (step S101). As described above, (vx, vy) denotes the position indicated by the specified reference vector, with the position of the target block on the frame (center position of the search range) being defined as the reference position (0, 0). Symbol vx denotes the component of the horizontal shift amount relative to the reference position, indicated by the specified reference vector, while symbol vy denotes the component of the vertical shift amount relative to the reference position, indicated by the specified reference vector. Furthermore, similarly to the above-described existing example, the shift amounts vx and vy each have a value in units of pixels.

If the center position of the search range is defined as the reference position (0, 0), and the coverage of the search range in the horizontal and vertical directions is defined as ±Rx and ±Ry, respectively, the relationships $-Rx \leq vx \leq +Rx$ and $-Ry \leq vy \leq +Ry$ are obtained.

Subsequently to the step S101, the coordinate (x, y) of one pixel in the target block Io is specified (step S102). The step S102 is followed by calculation of the absolute difference α between the pixel value Io(x, y) of the specified coordinate (x, y) in the target block Io and the pixel value Ii(x+vx, y+vy) of the corresponding pixel position in the reference block Ii in accordance with the above-represented (Equation 1) (step S103).

Subsequently, the calculated absolute difference α is added to the previous SAD value of the address (table element) indicated by the reference vector (vx, vy) of the reference block Ii, and the resultant SAD value is rewritten to this address (step S104). Specifically, if the SAD value corresponding to the reference vector (vx, vy) is expressed as SAD(vx, vy), this SAD(vx, vy) is calculated in accordance with (Equation 2), which is represented also above, so that the calculated value is written to the address indicated by the reference vector (vx, vy).

$$SAD(vx, vy) = \Sigma\alpha = \Sigma|Io(x, y) - Ii(x+vx, y+vy)| \quad \text{(Equation 2)}$$

Subsequently, a determination is made as to whether or not the above-described arithmetic operation of the steps S102 to S104 has been performed on the pixels of all the coordinates (x, y) in the target block Io (step S105). If it is determined that the operation for all the coordinates (x, y) in the target block Io has not been completed yet, the processing sequence returns to the step S102, where the pixel position of the next coordinate (x, y) in the target block Io is specified, followed by repetition of the processing subsequent to the step S102.

Figure 49:
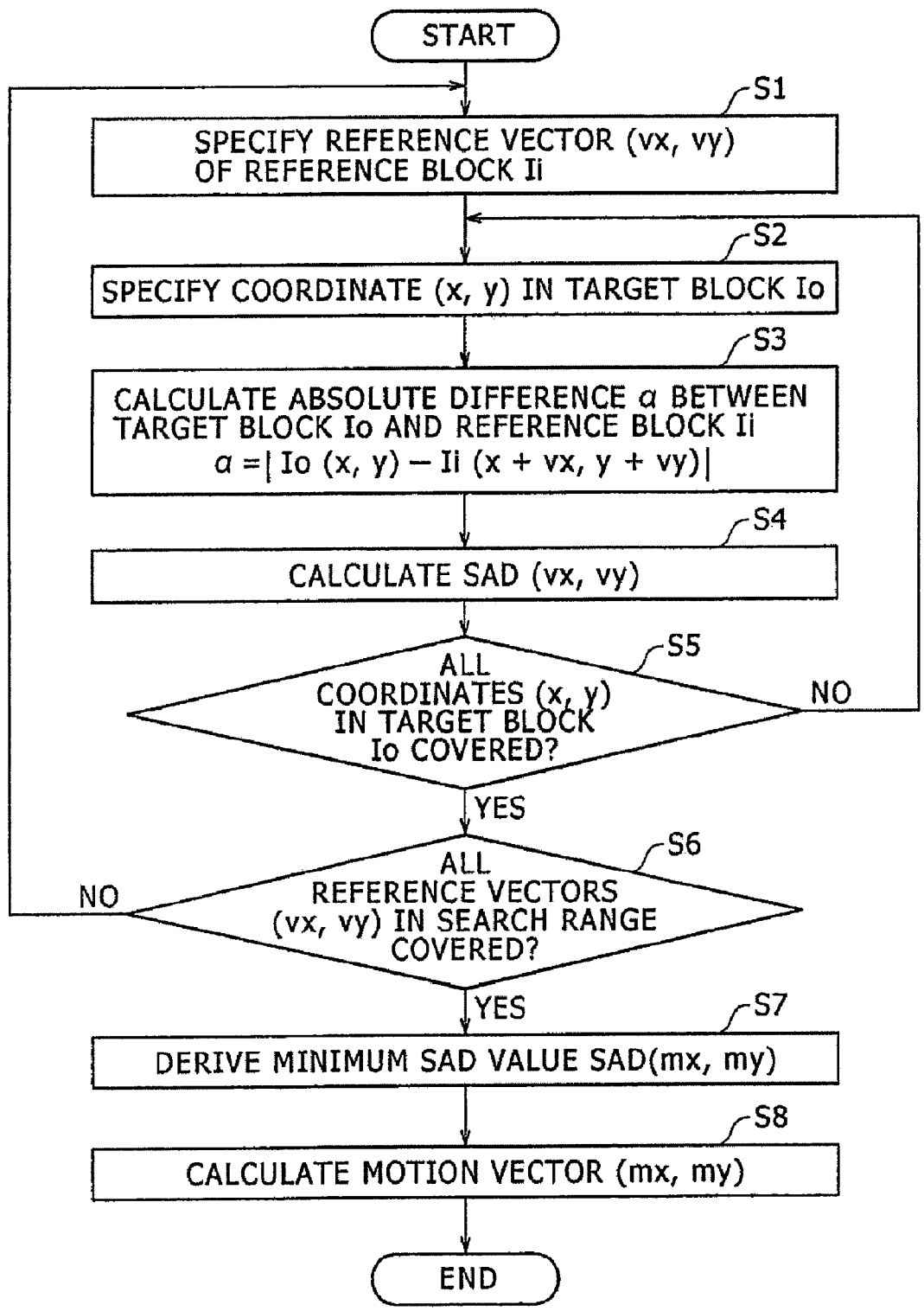
FIG. 49 is a flowchart for explaining the motion vector detection processing employing block matching.
Figure 50:
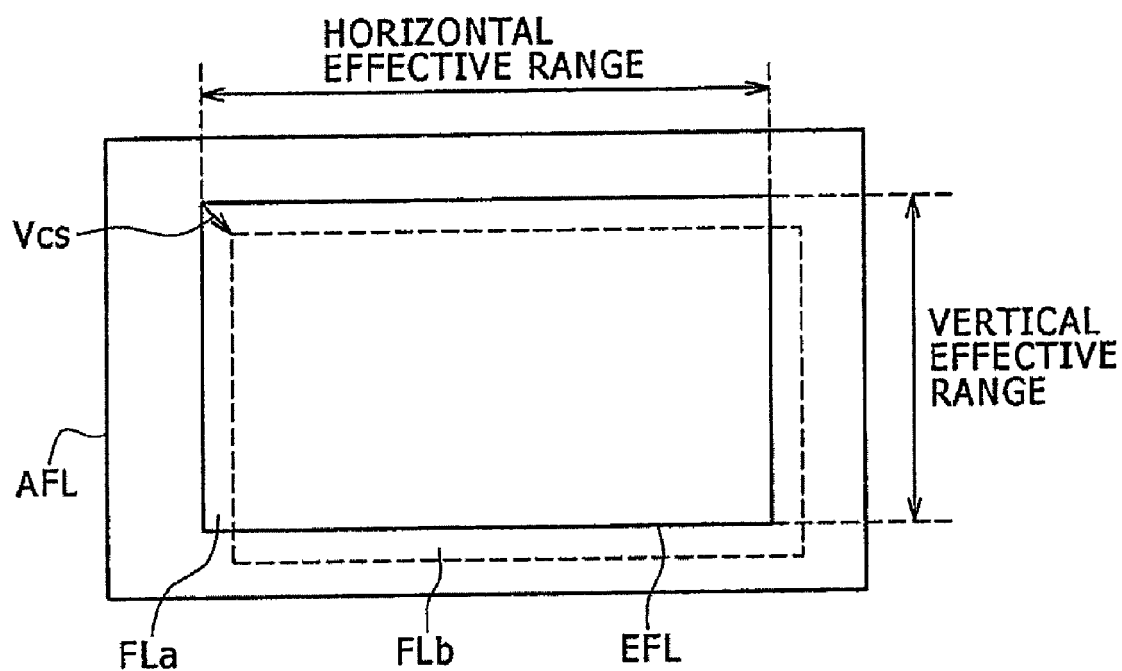
FIG. 50 is a diagram for explaining the motion vector detection processing employing block matching.

The processing of the steps S101 to S105 is completely the same as that of the steps S1 to S5 in the flowchart of FIG. 49.

In this embodiment, if it is determined in the step S105 that the above-described operation has been performed on the pixels of all the coordinates (x, y) in the target block Io, a reference reduced vector (vx/n, vy/n) obtained by reducing the reference vector (vx, vy) by a reduction ratio of 1/n is calculated (step S106).

Subsequently, plural reference vectors near to the reference reduced vector (vx/n, vy/n) are detected. In this example, four near reference vectors are detected as described above (step S107). Next, from the SAD value obtained in the step S104, values to be distribution-added to the table elements corresponding to the detected four near reference vectors are obtained as linearly-weighted distribution values based on the positional relationship among the positions indicated by the reference reduced vector and near reference vectors as described above (step S108). The step S108 is followed by addition of the obtained four linearly-weighted distribution values to the SAD table element values corresponding to the respective near reference vectors (step S109).

The completion of the step S109 leads to a determination that the calculation of the SAD value about the reference vector of interest has been completed. Therefore, next, a determination is made as to whether or not the arithmetic operation of the steps S101 to S109 has been performed on all the reference blocks in the search range, i.e., all the reference vectors (vx, vy) (step S111 in FIG. 26), If it is determined in the step S111 that the reference vector (vx, vy) for which the above-described arithmetic processing has not been completed yet remains, the processing sequence returns to the step S101, where the next reference vector (vx, vy) for which the above-described arithmetic processing has not been completed is specified, followed by repetition of the processing subsequent to the step S101.

If it is determined in the step S11/ that the search range has been free from the reference vector (vx, vy) for which the above-described arithmetic processing has not been completed, a determination is made that a reduced SAD table has been completed. Therefore, subsequently, from the completed reduced SAD table, the minimum SAD value is detected (step S112).

Next, a quadratic surface is created by using the (minimum) SAD value of the table element address (mx, my) corresponding to the detected minimum value and SAD values of plural near table elements, i.e., fifteen near table elements in this example as described above (step S113), followed by calculation of the minimum-value vector (px, py) indicating the decimal-accuracy position corresponding to the minimum SAD value on the quadratic surface (step S114). This minimum-value vector (px, py) corresponds to the decimal-accuracy minimum-value table element address.

The calculated minimum-value vector (px, py) indicating the decimal-accuracy position is then multiplied by n, to thereby calculate an intended motion vector (px×n, py×n) (step S115).

The completion of the step S115 is equivalent to the end of the processing of detecting a motion vector regarding one target block through block matching in this embodiment. If plural motion vectors are to be detected for regions arising from division of one frame like the example shown in FIG. 21, the above-described processing sequence shown in FIGS. 25 and 26 is repeated for the target blocks in the respective divided regions, with the search range and reduction ratio 1/n being redefined in every repetition.

It should be obvious that the above-described method of employing horizontal and vertical cubic curves may be used as the method for calculating the minimum-value vector (px, py) indicating the decimal-accuracy position.

SECOND EXAMPLE

In the above-described first example, after the SAD value of one reference block (reference vector) is calculated, distribution-addition values for plural reference vectors near to a reference reduced vector are obtained, followed by distribution-addition processing.

In contrast, in a second example, immediately after detection of the difference between a pixel in a reference block and the corresponding pixel in a target block, distribution-addition values (not SAD values but difference values) for plural reference vectors near to a reference reduced vector are obtained from the detected difference, followed by distribution-addition processing of the obtained difference values. In the second example, therefore, a reduced SAD table is created at the timing of completion of arithmetic operation of the differences of all the pixels in one reference block.

Figure 27:
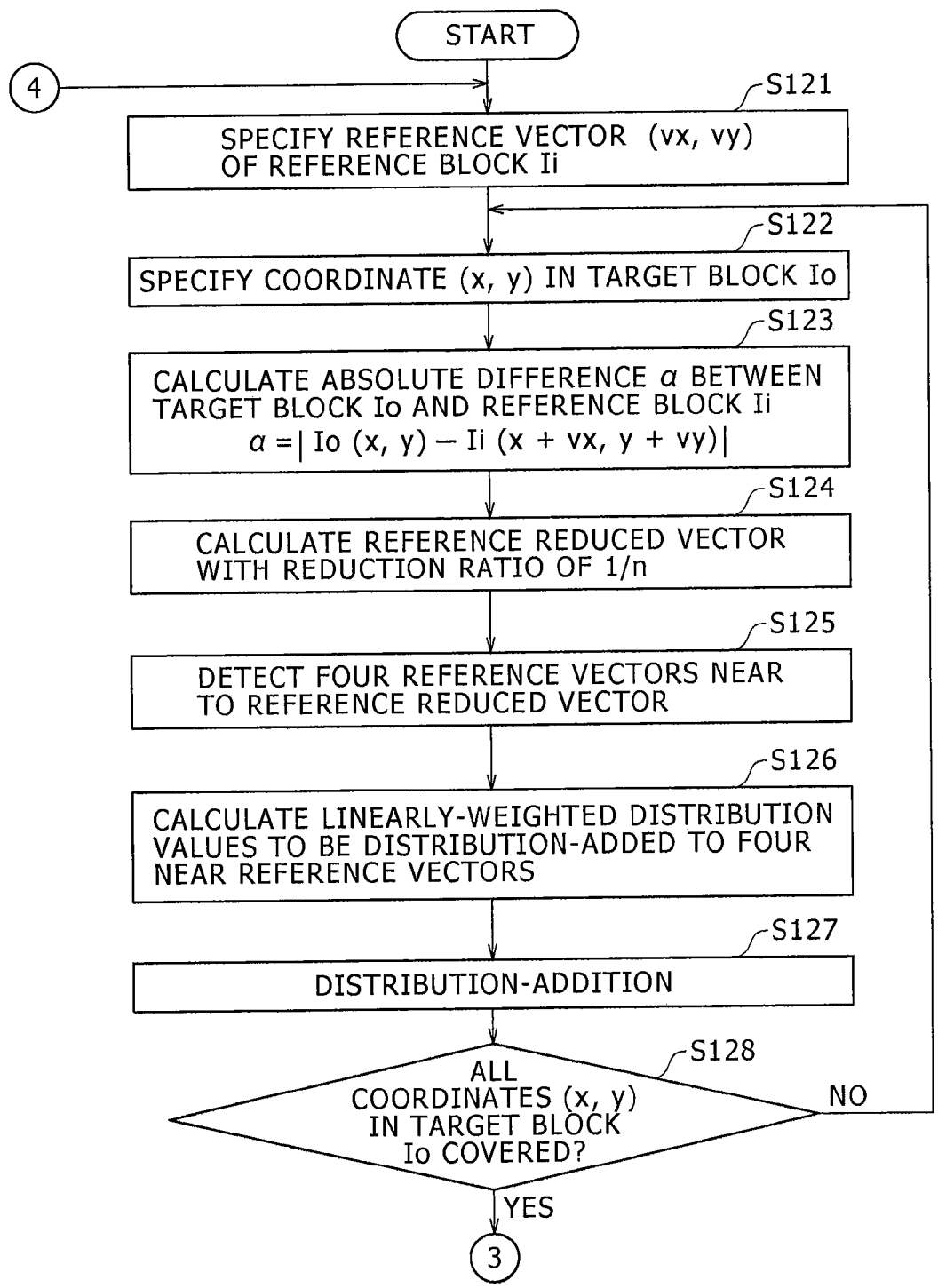
FIG. 27 is a part of a flowchart for explaining a second example of the motion vector detection processing of the imaging device according to the first embodiment.
Figure 28:
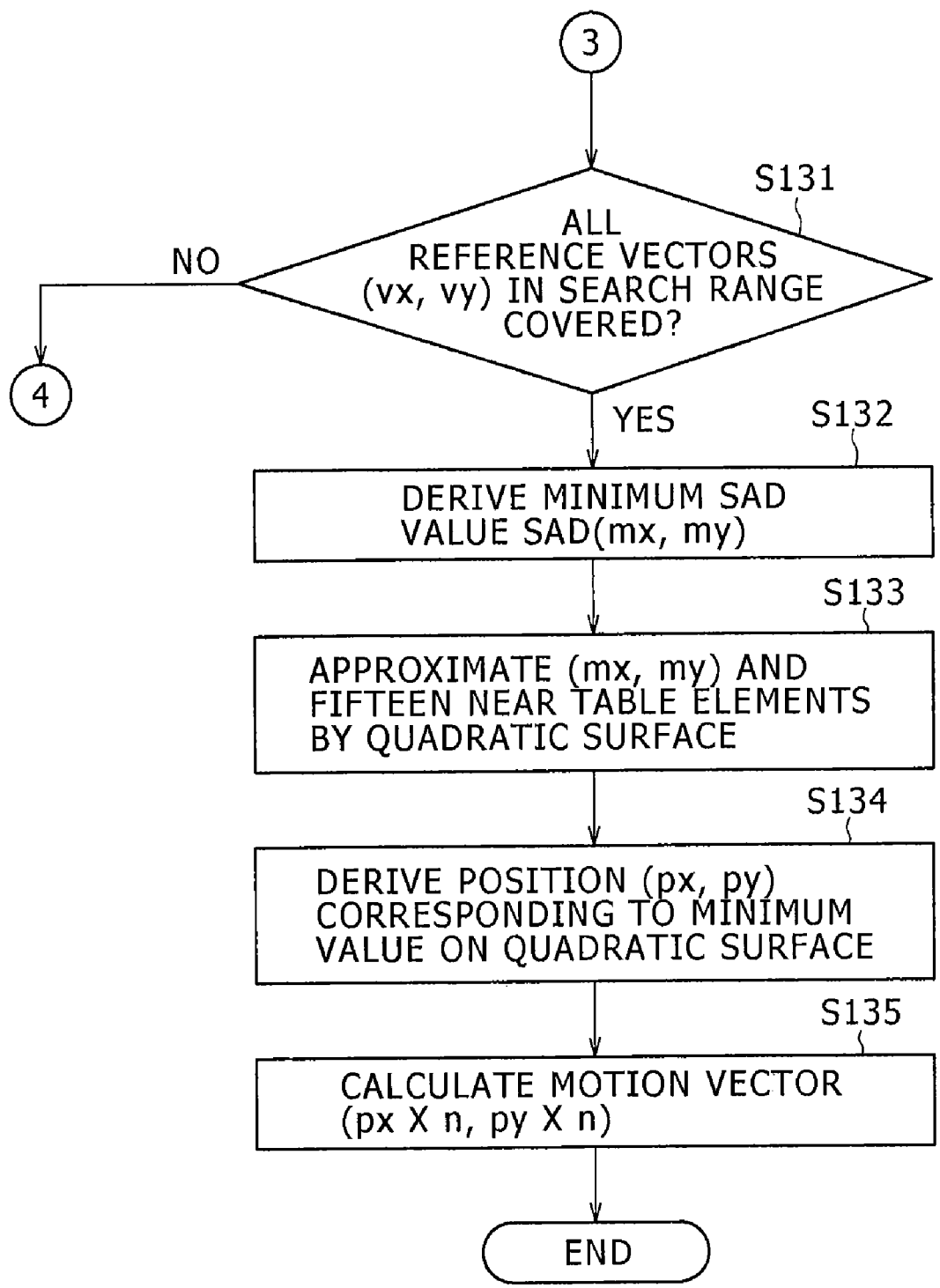
FIG. 28 is a part of the flowchart for explaining the second example of the motion vector detection processing of the imaging device according to the first embodiment.
Figure 29:
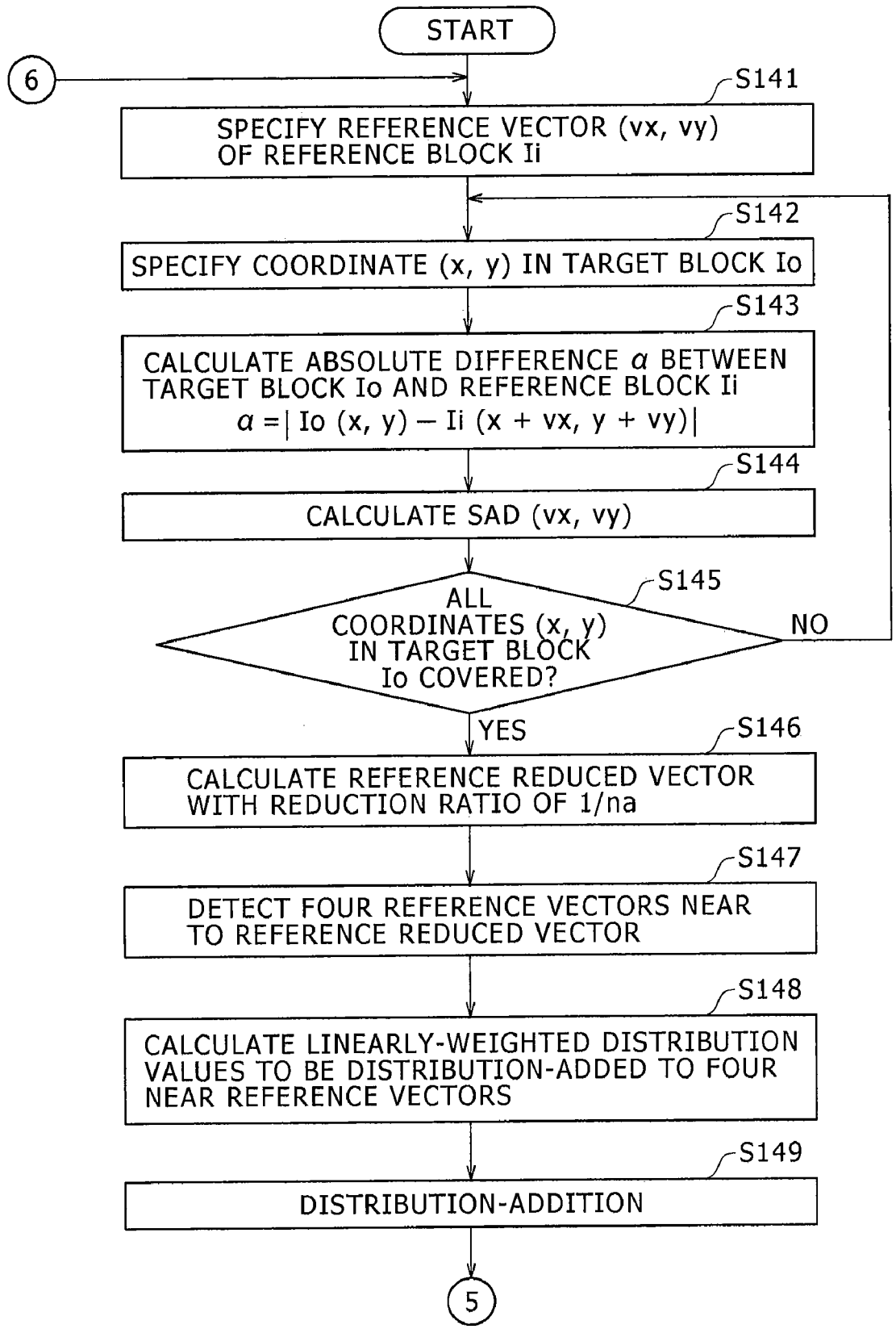
FIG. 29 is a part of a flowchart for explaining a third example of the motion vector detection processing of the imaging device according to the first embodiment.

FIGS. 27 and 28 show a flowchart of motion vector detection processing of the second example.

Figure 25:
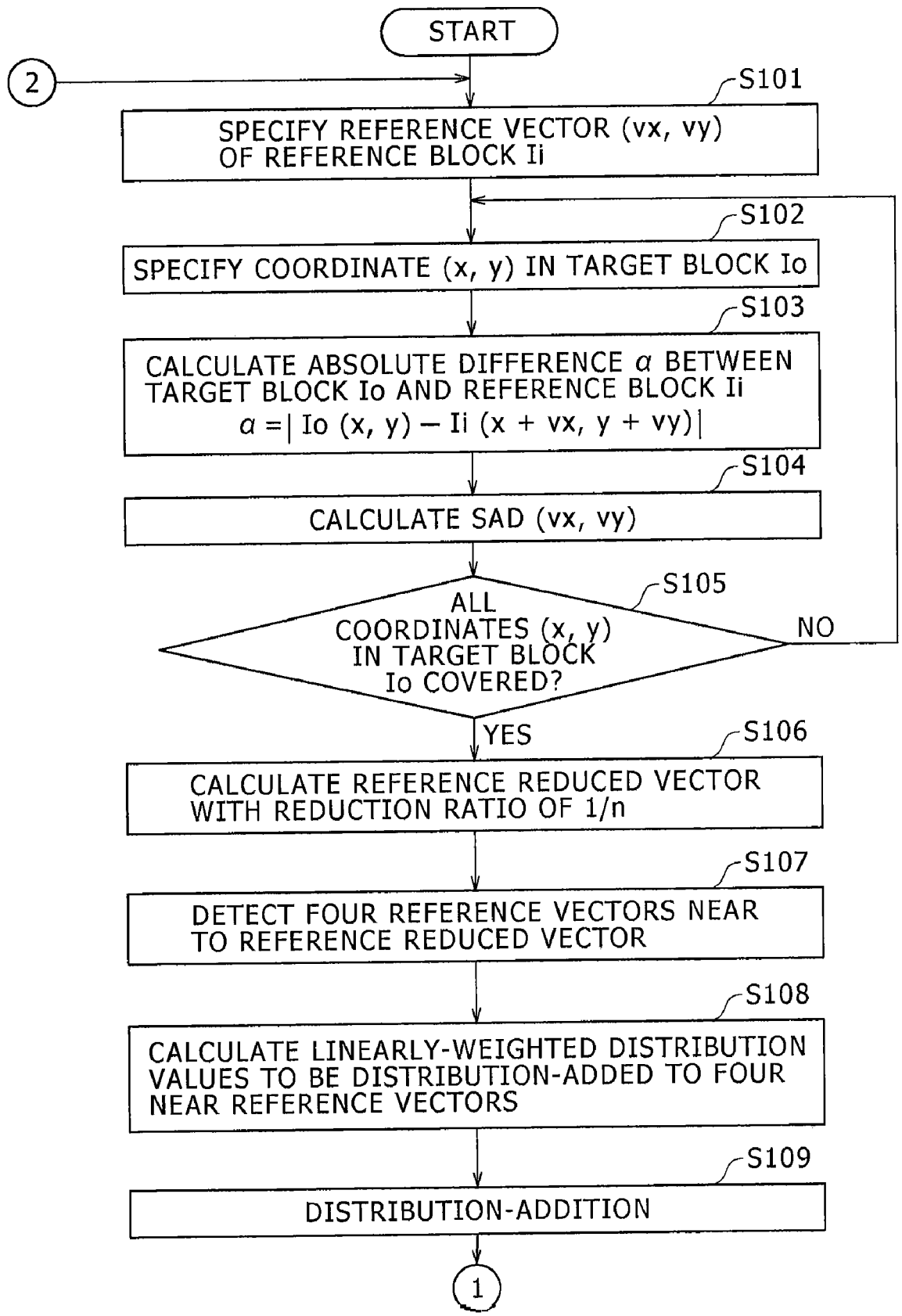
FIG. 25 is a part of a flowchart for explaining a first example of motion vector detection processing of the imaging device according to the first embodiment.
Figure 26:
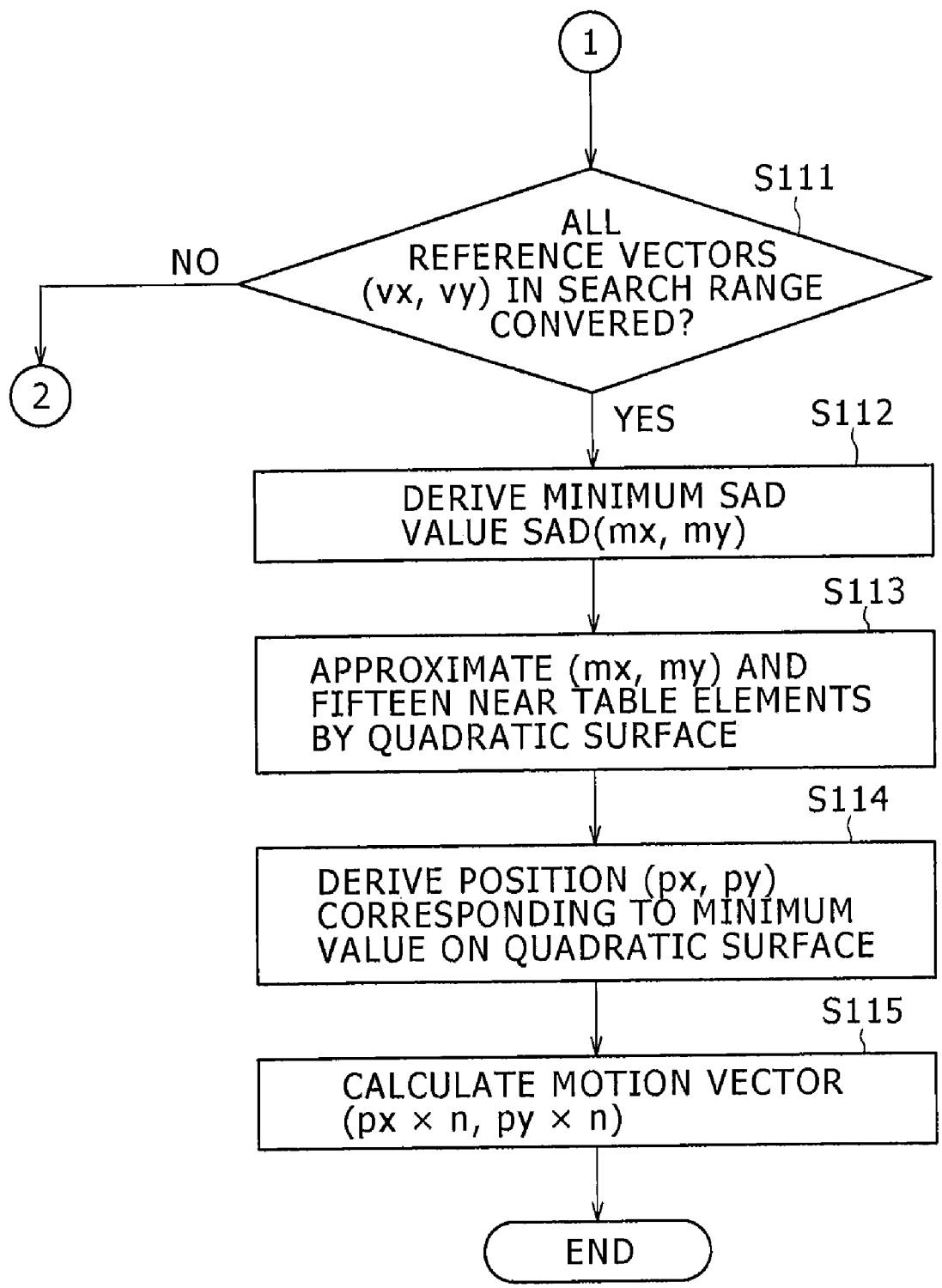
FIG. 26 is a part of the flowchart for explaining the first example of the motion vector detection processing of the imaging device according to the first embodiment.

The processing of steps S121 to S123 in FIG. 27 is completely the same as that of the steps S101 to S103 in FIG. 25, and hence detailed description thereof will be omitted.

In this second example, after a difference α between a reference block and a target block about the pixel of the coordinate (x, y) is calculated in the step S123, a reference reduced vector (vx/n, vy/n) obtained by reducing the reference vector (vx, vy) by a reduction ratio of 1/n is calculated (step S124).

Subsequently, plural reference vectors near to the reference reduced vector (vx/n, vy/n) are detected. In this example, four near reference vectors are detected as described above (step S125). Next, from the difference α obtained in the step S123, difference values to be distribution-added to the table elements corresponding to the detected four near reference vectors are obtained as linearly-weighted distribution values (difference values) based on the positional relationship among the positions indicated by the reference reduced vector and near reference vectors as described above (step S126).

The step S126 is followed by addition of the obtained four linearly-weighted distribution values to the table element values corresponding to the respective near reference vectors (step S127).

Upon the completion of the step S127, a determination is made as to whether or not the above-described arithmetic operation of the steps S122 to S127 has been performed on the pixels of all the coordinates (x, y) in the target block Io (step S128). If it is determined that the operation for all the coordinates (x, y) has not been completed yet, the processing sequence returns to the step S122, where the pixel position of the next coordinate (x, y) in the target block Io is specified, followed by repetition of the processing subsequent to the step S122.

If it is determined in the step S128 that the above-described arithmetic operation has been performed on the pixels of all the coordinates (x, y) in the target block Io, a determination is made that calculation of the SAD value for the reference block of interest has been completed. Therefore, subsequently, a determination is made as to whether or not the above-described arithmetic processing of the steps S121 to S128 has been completed for all the reference blocks in the search range, i.e., for all the reference vectors (vx, vy) (step S131 in FIG. 28).

If it is determined in the step S131 that the reference vector (vx, vy) for which the above-described arithmetic processing has not been completed yet remains, the processing sequence returns to the step S121, where the next reference vector (vx, vy) for which the above-described arithmetic processing has not been completed is specified, followed by repetition of the processing subsequent to the step S121.

If it is determined in the step S131 that the search range has been free from the reference vector (vx, vy) for which the above-described arithmetic processing has not been completed, a determination is made that a reduced SAD table has been completed. Therefore, subsequently, from the completed reduced SAD table, the minimum SAD value is detected (step S132).

Next, a quadratic surface is created by using the (minimum) SAD value of the table element address (mx, my) corresponding to the detected minimum value and SAD values of plural near table elements, i.e., fifteen near table elements in this example as described above (step S133), followed by calculation of the minimum-value vector (px, py) indicating the decimal-accuracy position corresponding to the minimum SAD value on the quadratic surface (step S134). This minimum-value vector (px, py) corresponds to the decimal-accuracy minimum-value table element address.

The calculated minimum-value vector (px, py) indicating the decimal-accuracy position is then multiplied by n, to thereby calculate an intended motion vector (px×n, py×n) (step S135).

The completion of the step S135 is equivalent to the end of the processing of detecting a motion vector regarding one target block through block matching in the second example. If plural motion vectors are to be detected for regions arising from division of one frame like the example shown in FIG. 21, the above-described processing sequence shown in FIGS. 27 and 28 is repeated for the respective divided regions, with the search range and reduction ratio 1/n being redefined in every repetition.

It should be appreciated that also in this second example, the above-described method of employing horizontal and vertical cubic curves may be used as the method for calculating the minimum-value vector (px, py) indicating the decimal-accuracy position.

THIRD EXAMPLE

If the motion vector detection method of this embodiment is used, as shown in FIG. 20, a failure such as output of a very different motion vector is not observed even when the reduction ratio of a reference vector is 1/64. Therefore, reduction of a SAD table to 1/4096 is allowed practically.

In a third example, with a reduced SAD table arising from reduction to 1/4096 being prepared, a first-time motion vector is detected with a first-time reduction ratio of e.g. 1/na=1/64. Subsequently, the search range is narrowed based on the detected first-time motion vector, and second-time detection is carried out with a second-time reduction ratio 1/nb smaller than the first-time reduction ratio 1/na, i.e., with a reduction ratio of e.g. 1/nb=1/8. That is, if the second-time reduction ratio different from the first-time reduction ratio is defined so that the vector error of the first-time detection can be covered, a motion vector can be detected with considerably high accuracy.

The motion vector detection processing of the third example will be described below with reference to the flowchart of FIGS. 29 to 32.

Figure 30:
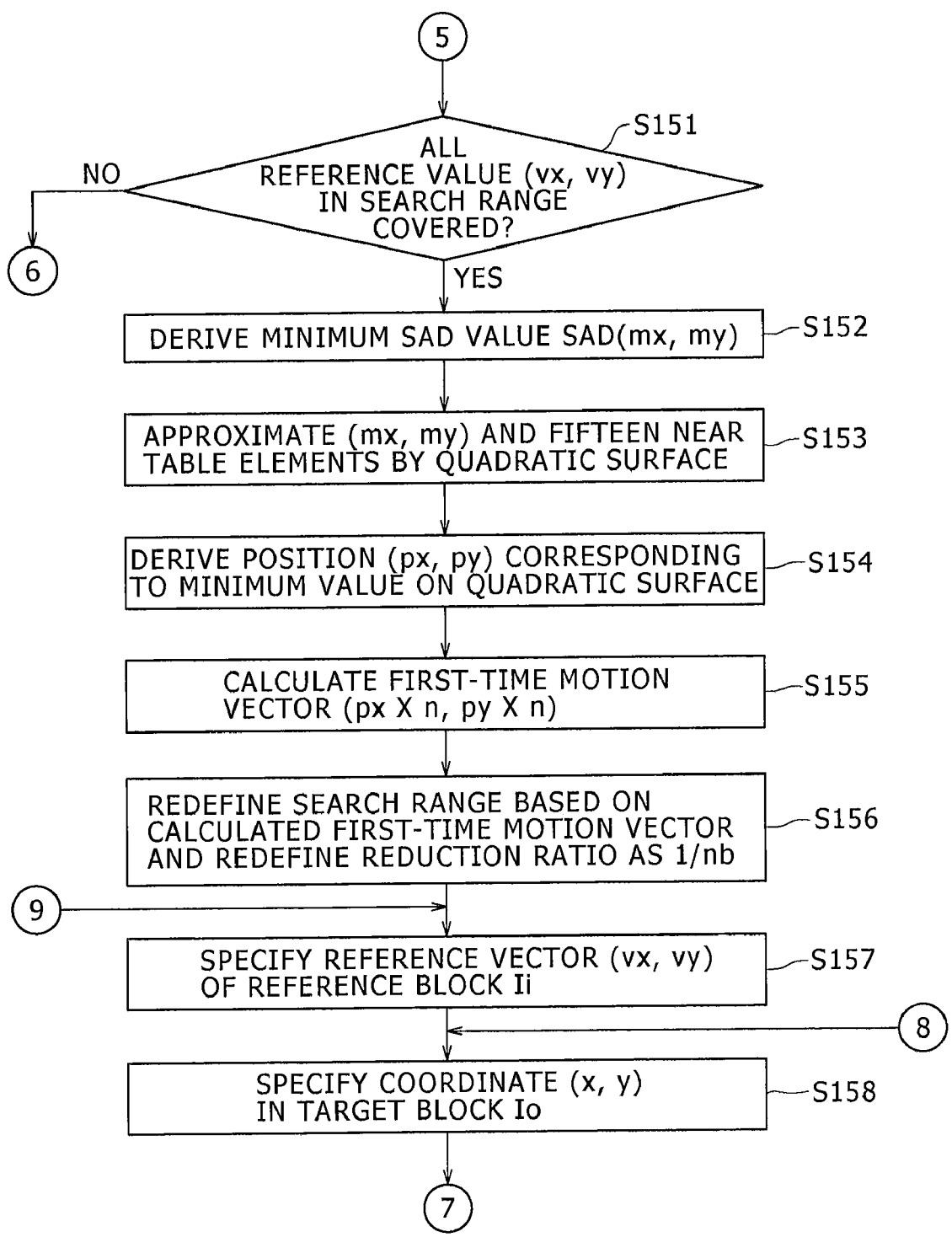
FIG. 30 is a part of the flowchart for explaining the third example of the motion vector detection processing of the imaging device according to the first embodiment.

In the third example shown in FIGS. 29 to 32, the above-described first example is employed as basic motion detection processing. Therefore, the processing steps of steps S141 to S149 in FIG. 29 and the processing steps of steps S151 to S155 in FIG. 30 are completely the same as those of the steps S101 to S109 in FIG. 25 and those of the steps S11 to S115 in FIG. 26.

In this third example, the processing is not ended at the completion of calculation of a motion vector in the step S155 in FIG. 30, but the processing sequence further proceeds to a step S156 and subsequent steps, with the motion vector calculated in the step S155 being treated as a first-time motion vector. In the step S156, based on the calculated first-time motion vector, the search range is narrowed in the same reference frame, and the reduction ratio of a reference vector is changed to 1/nb smaller than the first-time reduction ratio 1/na.

That is, if a motion vector is calculated through first-time processing, a block range on the reference frame having correlation with a certain range on the original frame can be roughly detected from the calculated motion vector. Therefore, a narrowed search range centered on the block range having correlation can be defined. Furthermore, setting the second-time reduction ratio smaller than the first-time reduction ratio is expected to allow calculation of a second-time motion vector with smaller error.

Figure 31:
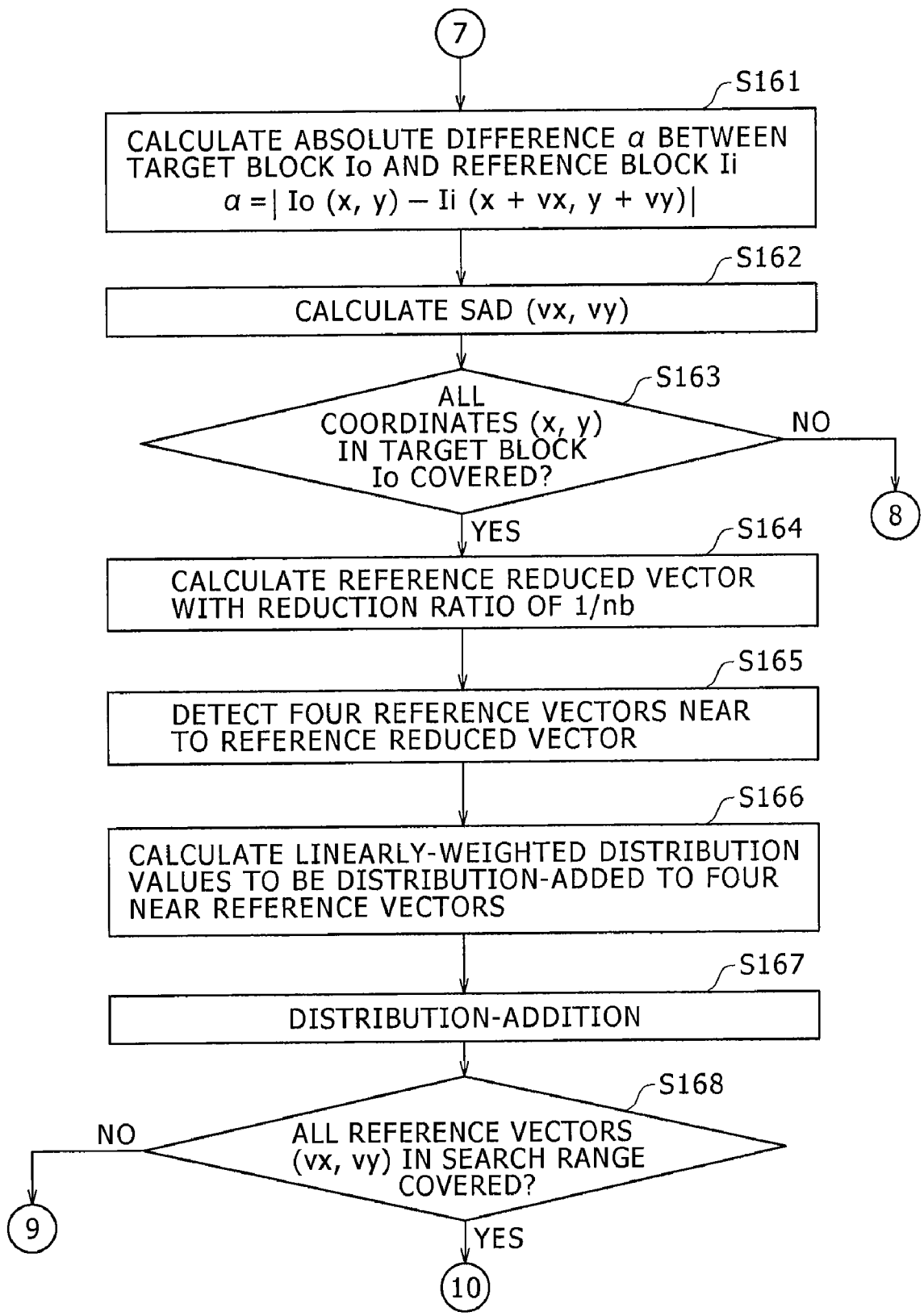
FIG. 31 is a part of the flowchart for explaining the third example of the motion vector detection processing of the imaging device according to the first embodiment.
Figure 32:
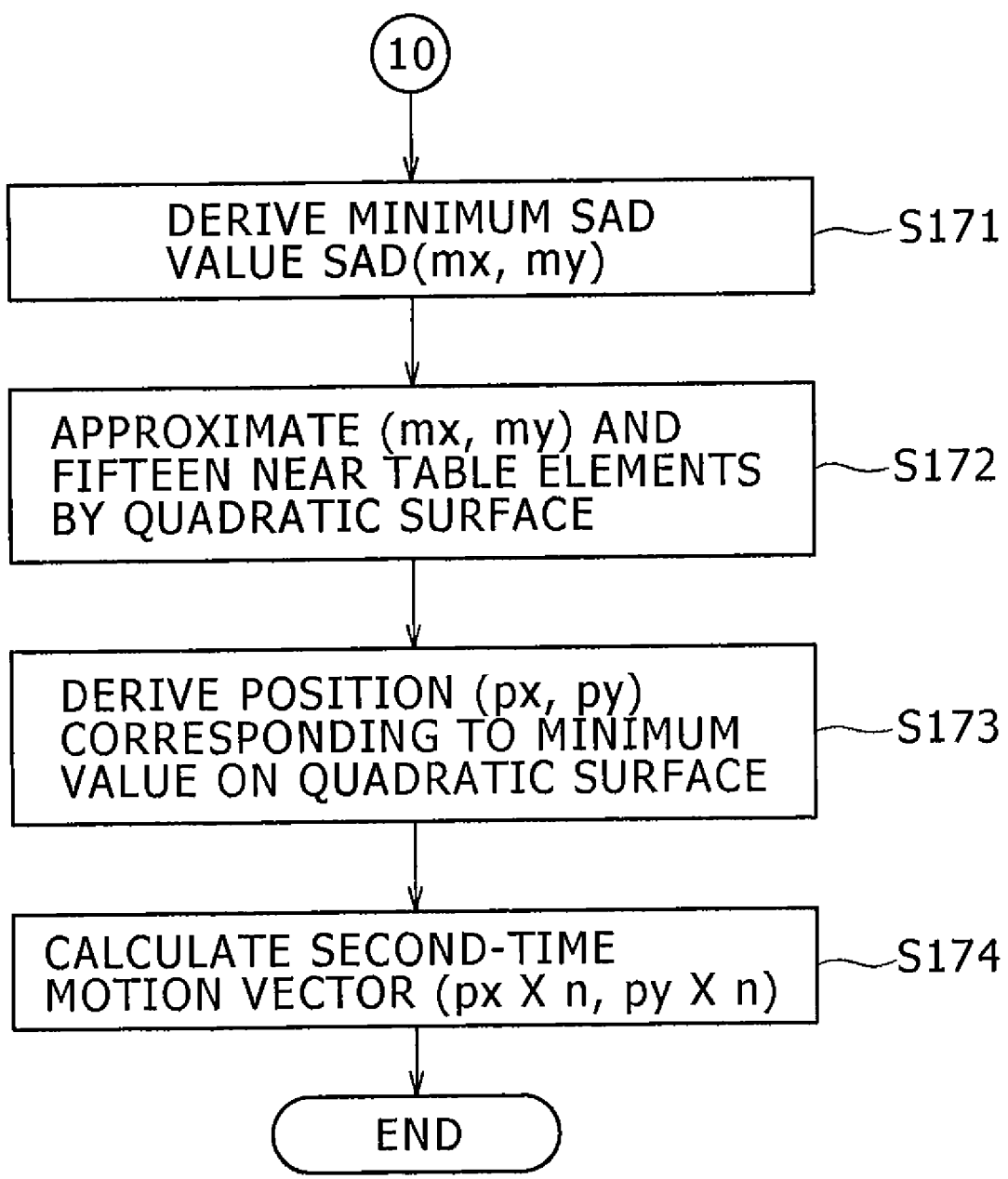
FIG. 32 is a part of the flowchart for explaining the third example of the motion vector detection processing of the imaging device according to the first embodiment.

After the narrowed search range and new reduction ratio are defined in the step S156, processing of detecting the second-time motion vector is executed in completely the same manner as the first-time processing, through steps S157 and S158, steps S161 to S168 in FIG. 31, and steps S171 to S174 in FIG. 32. The processing of these steps is completely the same as that of the steps S101 to S109 in FIG. 25 and the steps S111 to S115 in FIG. 26.

In this manner, an intended motion vector is eventually obtained as the second-time motion vector in the step S174.

In the above-described example, the above-described first example is employed as a motion vector detection method, and the detection processing is repeated as two-stage processing. However, it should be appreciated that the detection processing may be further repeated as more-stage processing with the search range being further narrowed and the reduction ratio being changed according to need.

Furthermore, it should be appreciated that the above-described second example can be used instead of the above-described first example as a motion vector detection method. Moreover, similarly to the above-described examples, the above-described method of employing horizontal and vertical cubic curves may be used as the method for calculating a minimum-value vector (px, py) indicating a decimal-accuracy position.

Device for Correcting Distortion in Captured Image According to Second Embodiment In the above-described imaging device to which the device for correcting distortion in a captured image according to the first embodiment is applied, the motion vector detector 15 is based on the premise that two images, i.e., both an original frame image and a reference frame image, are stored in the frame memories 41 and 42 in the image memory 4 as shown in FIG. 1. Therefore, the timing of motion vector detection is delayed by the period corresponding to one frame.

In contrast, a second embodiment has a configuration in which stream image data from the imaging element 11 is used as a reference frame so that real-time SAD value calculation for the raster-scanned stream data is allowed.

Figure 33:
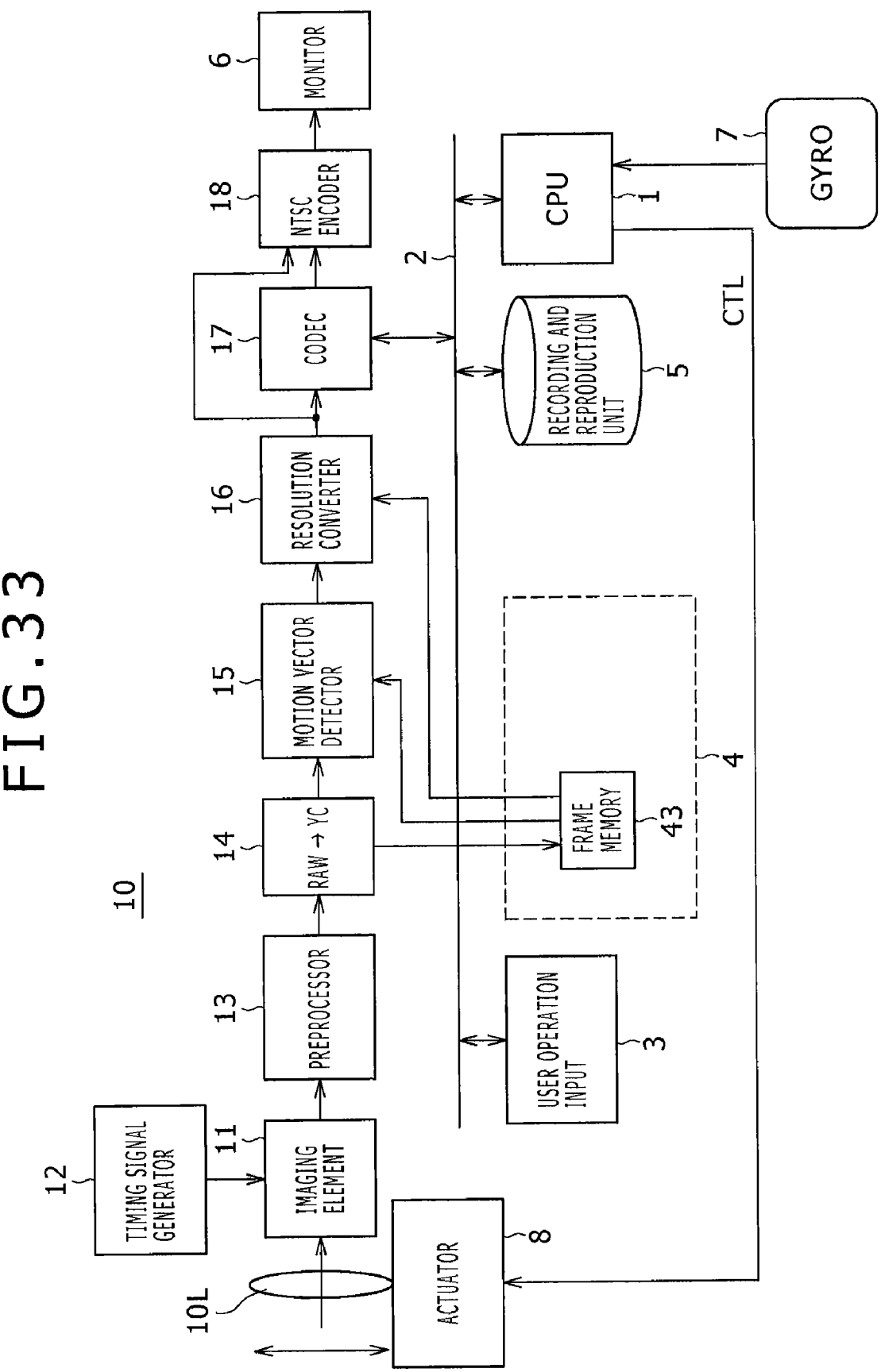
FIG. 33 is a block diagram showing a configuration example of an imaging device to which a method for correcting distortion of a captured image according to a second embodiment is applied.

FIG. 33 is a block diagram showing a configuration example of an imaging device according to the second embodiment. As is apparent from FIG. 33, the configuration block of an imaging signal processing system 10 and other configuration blocks in the second embodiment are completely the same as those in the first embodiment shown in FIG. 1. However, in this second embodiment, an image memory 4 is formed of one frame memory 43 as shown in FIG. 33.

In the second embodiment, an original frame is stored in the frame memory 43, while stream data input from a data converter 14 to a motion vector detector 15 is used as a reference frame. In the first embodiment, the motion vector detector 15 uses two image data stored in two frame memories 41 and 42 to execute processing of obtaining SAD values about reference blocks. In contrast, in the second embodiment, SAD values of reference blocks are obtained with stream image data from the data converter 14 being used as the image data of a reference frame, and the image data stored in the frame memory 43 being used as the image data of an original frame as shown in FIG. 33. Similarly to the first embodiment, an SAD value is calculated by using e.g. a luminance signal component Y. However, it should be appreciated that not only a luminance signal component but also color difference signal components may be used for calculation of an SAD value.

Figure 34:
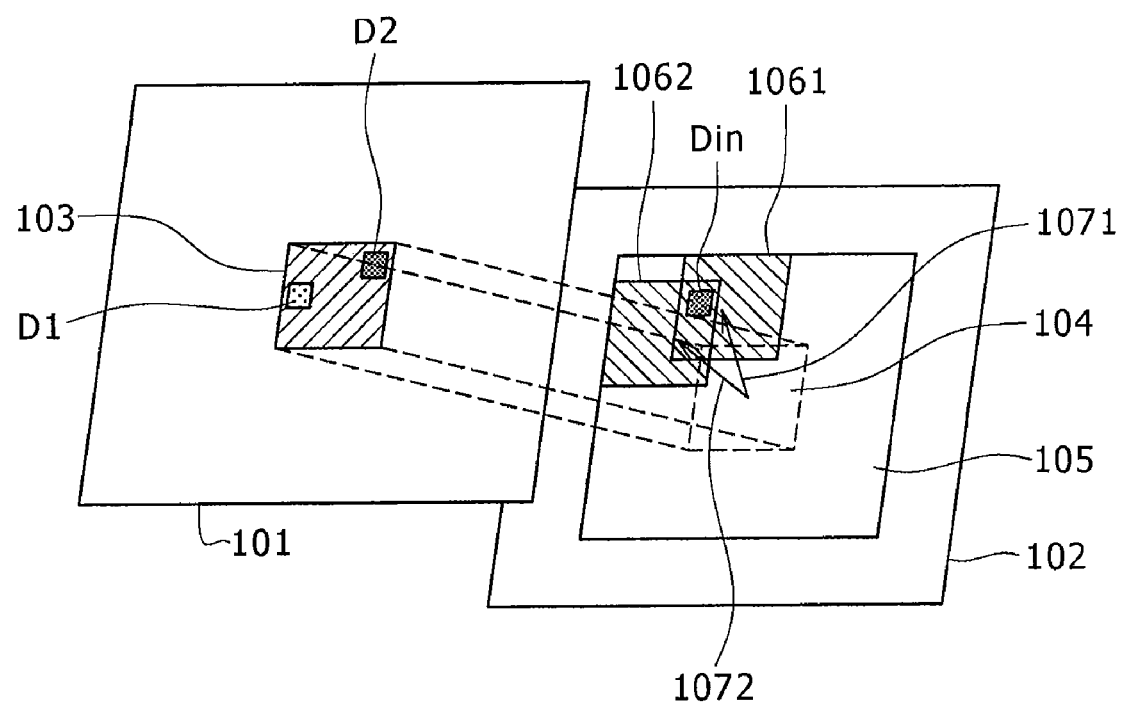
FIG. 34 is a diagram for explaining motion vector detection processing of the imaging device of the second embodiment.

As described above, in the second embodiment, stream image data from the data converter 14 is used as the image data of a reference frame. It follows that when a certain pixel is input, plural reference blocks each including this pixel exist on a reference frame simultaneously. FIG. 34 is a diagram explaining this fact.

Specifically, FIG. 34 shows that an input pixel Din in a search range 105 on a reference frame 102 can be treated both as a pixel on the left side of a reference block 1061 corresponding to a reference vector 1071 and as a pixel on the upper right side of a reference block 1062 corresponding to a reference vector 1072.

Therefore, when the input pixel Din is regarded as an element included in the reference block 1061, it is necessary that a pixel D1 in a target block 103 be retrieved and the difference between the pixels D1 and Din be calculated. Furthermore, when the input pixel Din is regarded as an element included in the reference block 1062, it is necessary that a pixel D2 in the target block 103 be retrieved and the difference between the pixels D2 and Din be calculated.

Although FIG. 34 and FIG. 35 to be described later show two reference blocks for simple explanation, there are practically a large number of reference blocks that include the input pixel Din.

The SAD calculation in the second embodiment is carried out as follows. Specifically, the absolute difference between the luminance value Y of the input pixel Din and the luminance value Y of each pixel in the target block, having the pixel position corresponding to the relative position of the input pixel Din in a respective one of reference blocks, is calculated. Subsequently, each calculated absolute difference is added to an SAD table in linkage with the reference vector of the corresponding reference block.

Figure 35:
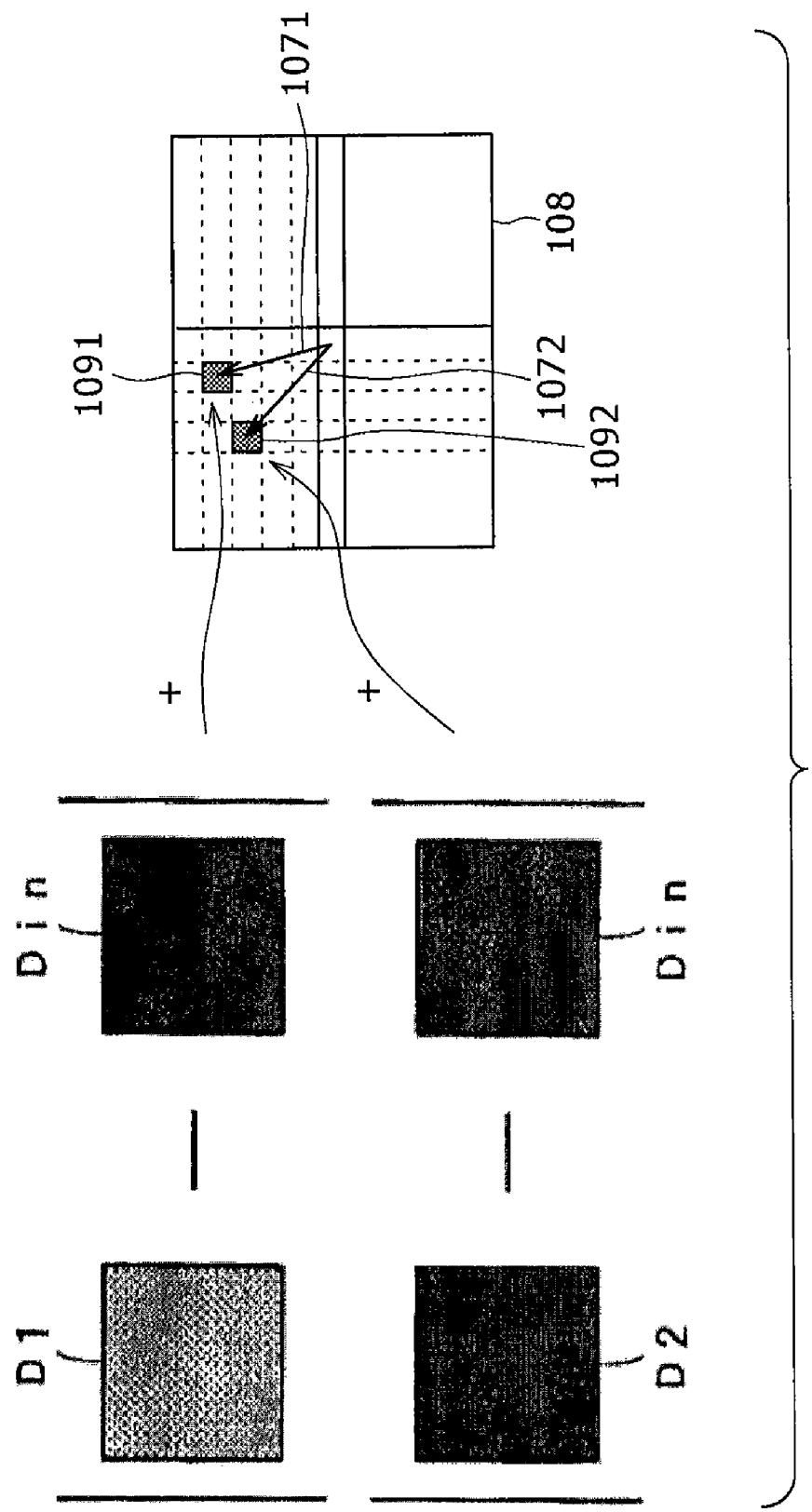
FIG. 35 is a diagram for explaining the motion vector detection processing of the imaging device of the second embodiment.

More specifically, when the input pixel Din is regarded as an element included in the reference block 1061, as shown in FIG. 35, the absolute difference between the pixel D1 in the target block 103 and the input pixel Din is written to an SAD table 108 in such a manner as to be added to an SAD table element 1091 corresponding to the reference vector 1071. Furthermore, when the input pixel Din is regarded as an element included in the reference block 1062, the absolute difference between the pixel D2 in the target block 103 and the input pixel Din is written to the SAD table 108 in such a manner as to be added to an SAD table element 1092 corresponding to the reference vector 1072 as shown in FIG. 35.

Therefore, the SAD table is completed at the timing when the pixels in the entire search range have been input and the processing therefore has been completed. That is, the SAD table is created in real time.

The first one frame of a digital imaging signal from the data converter 14 is merely stored in the frame memory 43, without execution of arithmetic processing by the motion vector detector 15 such as SAD value calculation.

After the storing of the first one frame in the frame memory 43, the motion vector detector 15 starts the calculation of SAD values of reference blocks for the next and subsequent frames of the digital imaging signal. In this calculation, as described with FIGS. 34 and 35, the motion vector detector 15 reads out image data from the data converter 14, and reads out via a system bus 2 from the frame memory 43 the image data of all the reference blocks considered to include an image that should be compared with the image data from the data converter 14. Subsequently, the motion vector detector 15 obtains the SAD values of the respective reference blocks, and adds the obtained SAD values to the previous SAD values at the SAD table addresses corresponding to the respective reference blocks.

In this embodiment, the motion vector detector 15 creates SAD tables for plural search ranges on one frame like those shown in FIG. 21, and obtains the minimum SAD values on the SAD tables to thereby obtain motion vectors (per-search-range motion vectors) of the respective search ranges.

Subsequently, the motion vector detector 15 detects a global motion vector as a motion vector per one frame from all the per-search-range motion vectors of the plural search ranges on one frame, with taking into consideration also transition from past motion vectors. The motion vector detector 15 transmits the global motion vector, which is the detection result, as a control signal to a subsequent-stage resolution converter 16.

The resolution converter 16 executes processing of converting into requisite resolution and image size, with sequentially extracting the image data of the delayed frame stored in the frame memory 43 in accordance with the global motion vector received from the motion vector detector 15. Due to this sequential extraction from the frame memory 43 in accordance with the global motion vector, the converted image is obtained as an image from which a camera shake has been removed.

In the example of FIG. 35, the real-time SAD calculation processing is applied to an existing method. In contrast, in the second embodiment, calculated absolute differences are not directly added to the SAD table elements 1091 and 1092 on the SAD table 108, corresponding to the reference vectors 1071 and 1072, respectively, unlike the example of FIG. 35. In the second embodiment, similarly to the first embodiment, reference reduced vectors arising from reduction of the reference vectors 1071 and 1072 by a reduction ratio of 1/n are calculated, and distribution-addition values to be distribution-added to plural reference vectors near to the reference reduced vectors are obtained from the calculated absolute differences. The obtained distribution-addition values are then added to the SAD values corresponding to the plural near reference vectors.

Also in the second embodiment, a method of employing a quadratic surface or horizontal and vertical cubic curves can be used for detection of an accurate motion vector after the completion of an SAD table (reduced SAD table), similarly to the first embodiment.

Configuration Example Of Motion Vector Detector 15 In Second Embodiment

In a configuration in which motion vectors of plural search ranges defined on one frame of captured image data are detected in real time as described above, captured image data input to the motion vector detector 15 is raster-scanned image data read out with the horizontal and vertical directions thereof being defined as the main-scanning direction and the sub-scanning direction, respectively. Therefore, in such a configuration, an SAD arithmetic processor and an SAD table memory are generally provided in one-to-one correspondence with a respective one of all the search ranges.

However, such a configuration becomes a large circuit scale. Furthermore, although the memory size of each one SAD table for one search range is small, the entire memory size for one frame is very large. Consequently, it is impractical and difficult to construct the SAD table memory by an expensive SRAM for obtaining high-speed processing in a consumer product.

To address this, in the second embodiment, an improvement is made on setting of target blocks and search ranges so that plural search ranges can share an SAD arithmetic processor and SAD table memories as much as possible, to thereby allow a reduced circuit scale and lower costs.

Figure 36A:
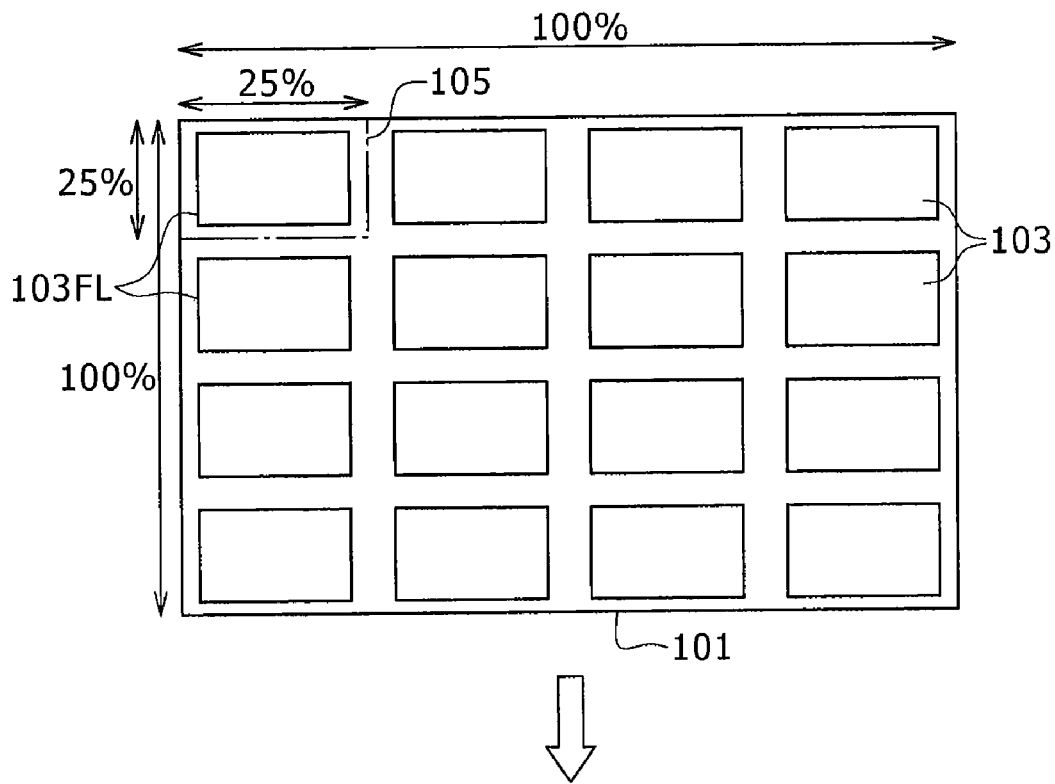
FIGS. 36A and 36B are diagrams for explaining major part of the motion vector detection processing of the imaging device of the second embodiment.
Figure 36B:
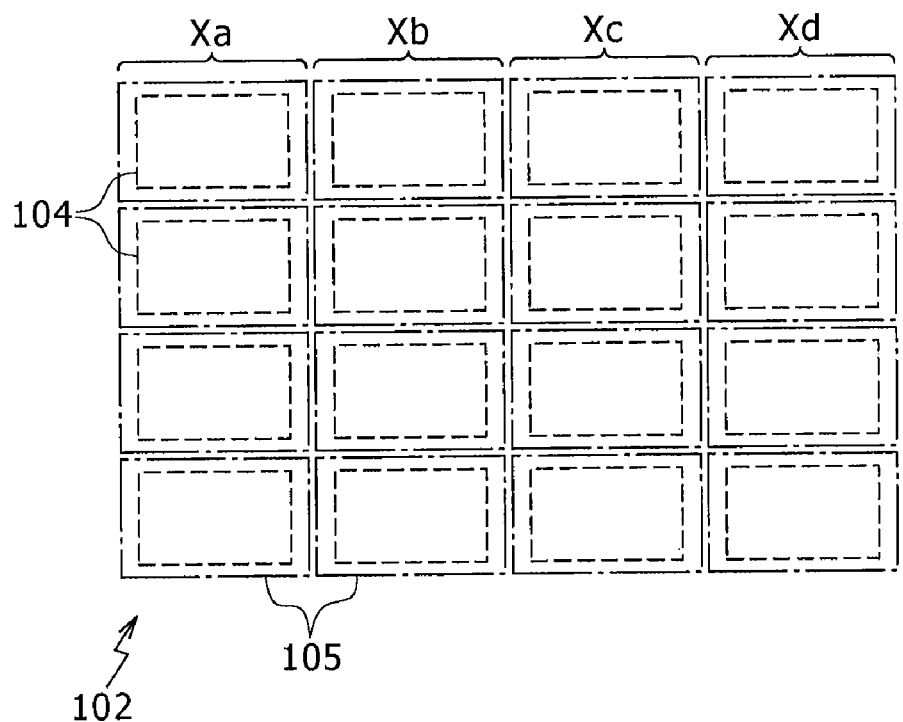

FIGS. 36 and 37 are diagrams for explaining the improvement in the second embodiment for achieving the reduction in the circuit scale and costs. In this example, as shown in FIGS. 36A and 36B, plural search ranges 105 are defined on the reference frame 102 so as not to overlap with each other as image regions.

The size of target blocks 103 on an original frame 101 is defined so that the target blocks 103 fall within the search ranges 105, depending on the size of motion vectors to be detected. In the present specification, a frame 103FL having the same size as the target block 103 is referred to as a detection frame.

It may be impossible that the detection frame 103FL gets beyond the search range 105. If the size of the detection frame 103FL is too small, a problem arises in the accuracy of motion vector detection.

The distance across which the reference block corresponding to the target block can be moved within the search range 105 is dependent upon the size of a motion vector to be detected. Therefore, when the size of a motion vector to be detected is large, the size of the detection frame 103FL is set small. In contrast, the size of a motion vector to be detected is small, the size of the detection frame 103FL can be set large.

In view of the above-described characteristics, the sizes of the detection frames 103FL and the search ranges 105 and the numbers thereof on a frame are determined in consideration for the size of motion vectors to be detected.

In the example shown in FIG. 36, four target blocks 103, i.e., four detection frames 103FL, are arranged both in the horizontal and vertical directions as shown in FIG. 36A. Hence, four search ranges 105 are arranged both in the horizontal and vertical directions, i.e., total sixteen search ranges 105 are defined.

The number of the detection frames 103FL per one frame in FIG. 36 is merely one example. The important point of this example is that the search ranges 105 are defined so as not to overlap with each other.

In this example, the distance between adjacent target blocks is dependent upon the size of a motion vector to be detected. Therefore, this example is suitable when the size of a motion vector to be detected is small, in terms of ensuring of the detection frames 103FL larger than a predetermined size.

As a result of a many-person evaluation with use of plural digital still cameras and digital video cameras, in which a camera shake was measured based on the premise that optical zoom of 10× was used, a comparatively small camera shake of about ±2% was measured in capturing of a moving image at a rate of 60 fps. This numeric value of a camera shake, expressed by %, indicates the range of a camera shake correction vector, with both the horizontal and vertical ranges of the entire frame being defined as 100% as shown in FIG. 36A. Similarly, in the present specification, the sizes of the target blocks 103 and the search ranges 105 to be described later will be expressed by a % numeric value.

When a camera of which optical zoom magnification is low or that has no optical zoom function is used, the degree of the numeric value of a camera shake that should be considered is comparable with the above-cited value even in capturing of a still image. Furthermore, the motion vector detector 15 of this embodiment obtains a motion vector from captured image data resulting from rough correction through optical camera shake correction. Therefore, even if use of optical zoom of e.g. 10× is assumed, the size of a motion vector to be detected by the motion vector detector 15 of this embodiment may be comparable with the above-cited value. Consequently, the second embodiment is very useful.

Figure 37A:
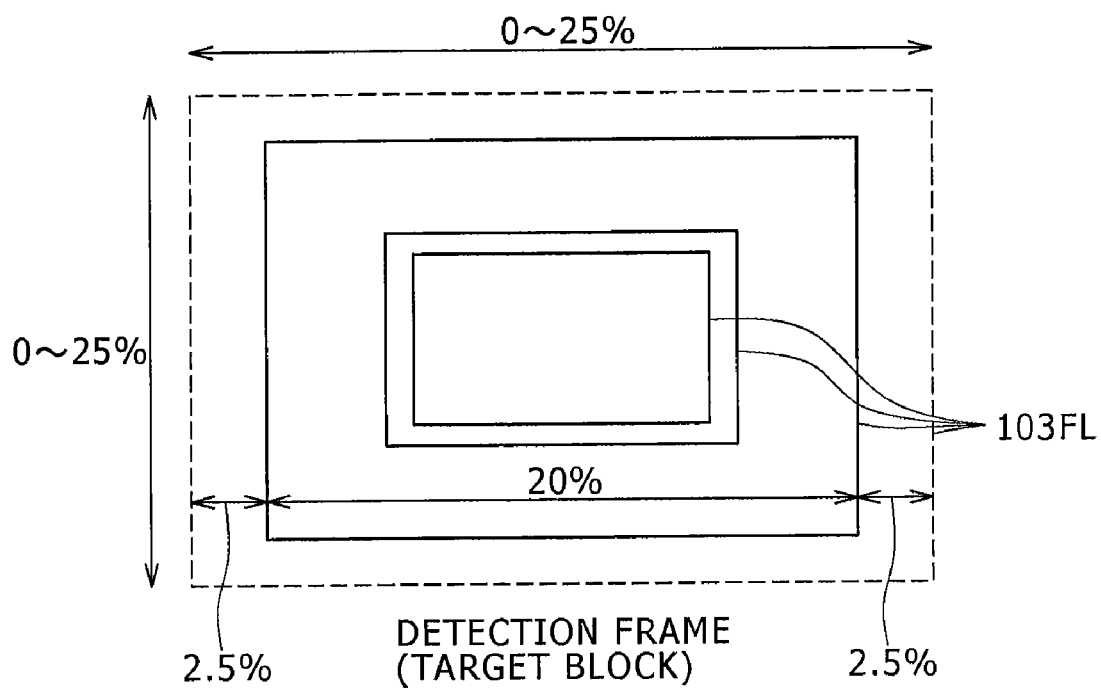
FIGS. 37A and 37B are diagrams for explaining major part of the motion vector detection processing of the imaging device of the second embodiment.
Figure 37B:
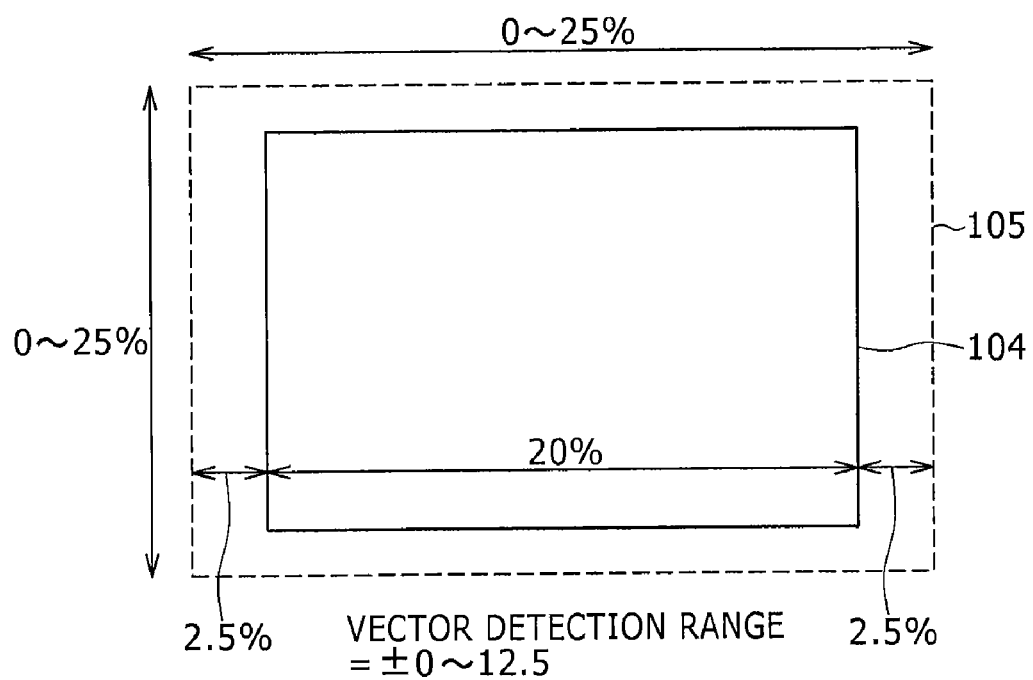

In the example of FIG. 36, if the size of the search range 105 is expressed by (horizontal size (%), vertical size (%)), the maximum size of the search range 105 is (25%, 25%) as shown in FIGS. 37A and 37B because the number of the search ranges 105 arranged in the horizontal and vertical directions is four. At this time, when being expressed in the same manner as that for the search range, the maximum range of motion vector detection is (±12.5%, ±12.5%) as shown in FIG. 37B.

Furthermore, as shown in FIG. 37A, the size of the detection frame 103FL is (0 to 25%, 0 to 25%) in the same expression manner; the maximum size thereof is (25%, 25%).

In this example, the size of the search range 105 is set to a proper value within the above-described range, and the sizes of the motion vector detection range and detection frame are also set to proper values. For example, the search range is set to the maximum value (25%, 25%), and the detection frame 103FL is set to (20%, 20%) based on an assumption that the motion vector detection range is (±2.5%, ±2.5%).

If all the search ranges 105 are arranged on the reference frame 102 so as not to overlap with each other like the example of FIG. 36, sharing of an SAD arithmetic processor (hereinafter, referred to as an SAD arithmetic processing engine) by all the search ranges 105 is allowed, and thus the number of SAD arithmetic processing engines can be set to one.

However, because captured image data is raster-scanned image data, there is a need to execute SAD arithmetic processing on four search ranges in the scanning period of the main-scanning direction, which is the horizontal direction. Therefore, there is a need to provide the same number of SAD tables as the search ranges arranged in the horizontal direction.

The SAD arithmetic processing engine identifies the region including the captured image data to be subjected to SAD arithmetic processing from four regions Xa, Xb, Xc, and Xd that are arranged in the horizontal direction and correspond to the horizontally arranged four search ranges, respectively, as shown in FIG. 36B. In accordance with the identification result, the SAD arithmetic processing engine switches the SAD table memory to be used among the four SAD table memories.

On the other hand, the search ranges arranged in the vertical direction are allowed to share a corresponding one of the four SAD table memories, which are provided corresponding to the horizontally arranged four regions Xa, Xb, Xc, and Xd, respectively. Specifically, in this second embodiment, when SAD table information about one search range has been stored in the SAD table memory, a per-search-range motion vector is detected by the SAD arithmetic processing engine, so that the information on the per-search-range motion vector as the detection result is transferred to another storage as described later.

After the SAD arithmetic processing for one search range has been thus completed, the stored data in the SAD table memory can be erased. Therefore, if the search range to be processed is shifted in the vertical direction, the same SAD table memory can be used after data erasing.

FIG. 38 shows a detailed configuration example of the motion vector detector 15 in the second embodiment.

Referring to FIG. 38, the motion vector detector 15 of this example includes an input buffer 151, one SAD arithmetic processing engine 152, and four SAD table memories 153a, 153b, 153c, and 153d formed of e.g. SRAMs. Furthermore, the motion vector detector 15 includes a motion vector memory 154 formed of e.g. a dynamic RAM (DRAM) for storing of motion vectors of one frame, and a global motion vector calculator 155.

In this example, the SAD table memories 153a, 153b, 153c, and 153d are used for the regions Xa, Xb, Xc, and Xd in the horizontal direction, respectively.

These four SAD table memories 153a, 153b, 153c, and 153d are connected to the SAD arithmetic processing engine 152 and a bus 150. To the bus 150, the motion vector memory 154 and the global motion vector calculator 155 are also connected.

Captured image data Din from the data converter 14 is directly supplied to the SAD arithmetic processing engine 152 in the motion vector detector 15 via the input buffer 151. In addition, the captured image data Din is supplied also to the frame memory 43 in the image memory 4 and delayed therein by one frame, followed by being supplied to the SAD arithmetic processing engine 152.

If all the pixel data in the detection frame 103FL (target block) are stored in the frame memory 43, a large memory capacity is necessary. Therefore, only pixel data of representative points, such as every n-th pixel (n is a natural number), are stored in the frame memory 43, and SAD calculation is carried out only for the representative points, to thereby reduce the calculation amount itself.

The SAD arithmetic processing engine 152 determines which of four SAD table memories 153a, 153b, 153c, and 153d is to be used as the SAD table employed for SAD arithmetic processing of the input captured image data Din, depending on which of the horizontally arranged four regions Xa, Xb, Xc, and Xd includes the input captured image data Din.

The SAD arithmetic processing engine 152 executes SAD arithmetic processing to be described later for each search range, and stores SAD table information in the SAD table memories corresponding to the respective search ranges.

After completing the creation of the SAD table of the search range, the SAD arithmetic processing engine 152 obtains the minimum SAD value from the SAD table and detects a per-search-range motion vector from the minimum SAD value. Furthermore, the SAD arithmetic processing engine 152 transfers the detected per-search-range motion vector to the motion vector memory 154. Thereafter, the SAD arithmetic processing engine 152 clears the SAD table memory used for the search range for which the processing of detecting a motion vector has been completed so that this SAD table memory can be used for the next search range.

Completion of the processing by the SAD arithmetic processing engine 152 for all captured image data of one frame is equivalent to completion of storing of motion vectors about all the plural target blocks (detection frames) on the one frame in the motion vector memory 154.

The global motion vector calculator 155 detects a global motion vector of the one frame from the plural motion vectors about the one frame stored in the motion vector memory 154, with taking into consideration also transition from past motion vectors stored in the memory 154. Subsequently, the global motion vector calculator 155 supplies information on the calculated global motion vector to the resolution converter 16.

The motion vector detector 15 in the second embodiment can be constructed by hardware, or can be constructed by using a digital signal processor (DSP). More alternatively, it can be implemented through software processing by the CPU 1.

Processing Operation Example Of Motion Vector Detector 15 In Second Embodiment

Figure 40:
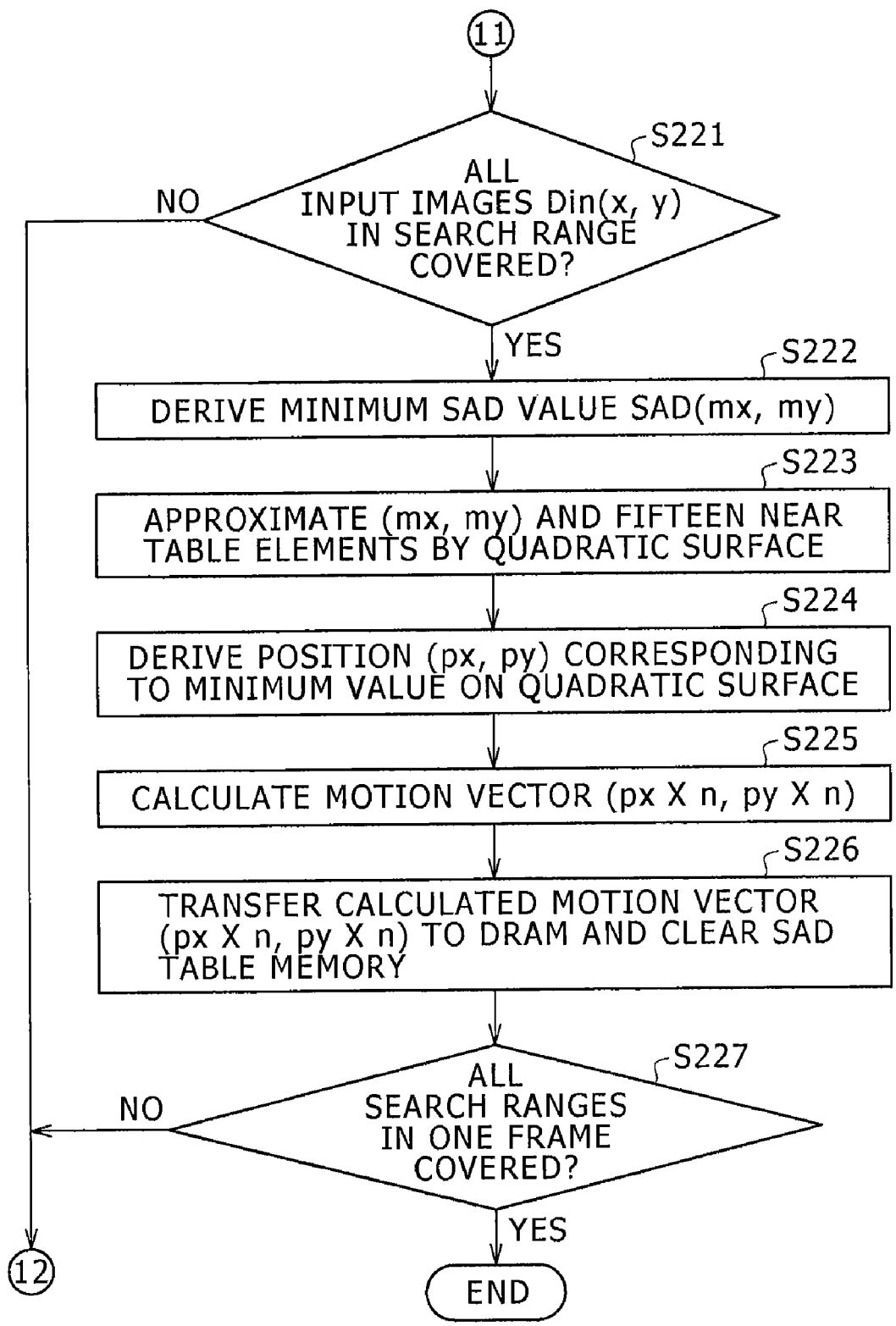
FIG. 40 is a part of the flowchart for explaining the example of the motion vector detection processing of the imaging device of the second embodiment.

With reference to the flowchart of FIGS. 39 and 40, a description will be made below on the flow of an example of the processing operation of detecting motion vectors by the SAD arithmetic processing engine 152 in the motion vector detector 15. The processing of the flowchart in FIGS. 39 and 40 is shown as processing for captured image data of one frame for convenience of explanation.

Initially, the SAD arithmetic processing engine 152 receives pixel data Din(x, y) at any position (x, y) in an input image frame (reference frame) (step S201). Subsequently, the SAD arithmetic processing engine 152 identifies the pixel position (x, y) of the input image data Din(x, y) on the frame (step S202).

From the recognized pixel position, the SAD arithmetic processing engine 152 determines which of search ranges on the frame includes this pixel data. Furthermore, based on the determination result, the SAD arithmetic processing engine 152 selects one of the SAD table memories 153a, 153b, 153c, and 153d as the memory in which SAD table values are to be stored (step S203).

Subsequently, the SAD arithmetic processing engine 152 specifies the reference vector (vx, vy) corresponding to one of plural reference blocks each including the pixel position (x, y) of the input captured image data (step S204).

As described above, (vx, vy) denotes the position indicated by the specified reference vector, with the position of the target block on the frame (center position of the search range) being defined as the reference position (0, 0). Symbol vx denotes the component of the horizontal shift amount relative to the reference position, indicated by the specified reference vector, while symbol vy denotes the component of the vertical shift amount relative to the reference position, indicated by the specified reference vector. Furthermore, similarly to the above-described existing example, the shift amounts vx and vy each have a value in units of pixels.

If the center position of the search range is defined as the reference position (0, 0), and the coverage of the search range in the horizontal and vertical directions is defined as ±Rx and ±Ry, respectively, the relationships −Rx≦vx≦+Rx and −Ry≦vy≦+Ry are obtained.

The step S204 is followed by calculation of the absolute value α of the difference between the pixel value Ii(x, y) of the pixel position (x, y) in the reference vector Ii corresponding to the specified reference vector (vx, vy) and the pixel value Io(x−vx, y−vy) of the corresponding pixel position in the target block Io (step S205). That is, the absolute difference α is calculated in accordance with (Equation 3).

$$\alpha = |Io(x-vx, y-vy) - Ii(x, y)| \qquad \text{(Equation 3)}$$

Next, the reduction ratio is set to 1/n, and the reference reduced vector (vx/n, vy/n) arising from reduction of the size of the reference vector (vx, vy) to 1/n is calculated (step S206).

Subsequently, plural reference vectors near to the reference reduced vector (vx/n, vy/n) are detected. In this example, four near reference vectors are detected as described above (step S207). Next, from the absolute difference α obtained in the step S205, values (absolute differences) to be distribution-added to the table elements corresponding to the detected four near reference vectors are obtained as linearly-weighted distribution values based on the positional relationship among the positions indicated by the reference reduced vector and near reference vectors as described above (step S208).

The step S208 is followed by addition of the obtained four linearly-weighted distribution values to the SAD table element values corresponding to the respective near reference vectors, on the SAD table in the SAD table memory selected in the step S203 (step S209).

Subsequently, a determination is made as to whether or not the arithmetic operation of the steps S204 to S209 has been performed on all the reference blocks including the input pixel Din(x, y) (step S210). If it is determined that another reference block including the input pixel Din(x, y) remains, the processing sequence returns to the step S204, where another reference block (vx, vy) including the input pixel Din is specified, followed by repetition of the processing of the steps S204 to S209.

If it is determined in the step S210 that the operation of the steps S204 to S209 has been performed on all the reference blocks including the input pixel Din(x, y), a determination is made as to whether or not the above-described arithmetic processing steps have been completed for all the input pixels Din in the search range (step S221 in FIG. 40). If "No" is determined in the step S221, the processing sequence returns to the step S201 in FIG. 39, where the next input pixel Din is captured, followed by repetition of the processing subsequent to the step S201.

If it is determined in the step S221 that the above-described arithmetic processing steps have been completed for all the input pixels Din in the search range, a determination is made that a reduced SAD table has been completed. Therefore, subsequently, from the completed reduced SAD table, the minimum SAD value is detected (step S222).

Next, a quadratic surface is created by using the (minimum) SAD value of the table element address (mx, my) corresponding to the detected minimum value and SAD values of plural near table elements, i.e., fifteen near table elements in this example as described above (step S223), followed by calculation of the minimum-value vector (px, py) indicating the decimal-accuracy position corresponding to the minimum SAD value on the quadratic surface (step S224). This minimum-value vector (px, py) corresponds to the decimal-accuracy minimum-value table element address.

The calculated minimum-value vector (px, py) indicating the decimal-accuracy position is then multiplied by n, to thereby calculate an intended motion vector (px×n, py×n) for the search range (step S225).

Subsequently, information on the calculated per-search-range motion vector (px×n, py×n) is transferred to the motion vector memory 154, and then the stored data in the SAD table memory used for the search range for which the SAD arithmetic processing has been completed is erased so that this SAD table memory can be used for processing of the subsequent search range (step S226).

Next, a determination is made as to whether or not the processing for all the search ranges in one frame has been completed (step S227). If it is determined that the one frame includes a search range yet to be processed, the processing sequence returns to the step S201 in FIG. 39, so that the processing subsequent to the step S201 is repeated. In contrast, if it is determined in the step S227 that the processing for all the search ranges in the one frame has been completed, this processing routine is ended.

This is the end of the processing of detecting motion vectors through block matching with target blocks in plural search ranges defined in one frame. In actual processing, the processing of FIGS. 39 and 40 is repeated across plural frames.

As described above, after the completion of the detection of the plural per-search-range motion vectors of the one frame, the global motion vector calculator 155 starts its operation to detect a global motion vector by using these plural per-search-range motion vectors and past plural per-search-range motion vectors stored in the motion vector memory 154.

In the above-described example, a method of employing a quadratic surface is used as the method for calculating the minimum-value vector (px, py) indicating the decimal-accuracy position. However, it should be appreciated that the above-described method of employing horizontal and vertical cubic curves may be used.

Furthermore, it should be appreciated that in this second embodiment, motion vector detection processing with use of a reduced SAD table may be repeated as two-stage or more-stage processing with the search ranges being narrowed and the reduction ratio being changed according to need in every repetition, similar to the above-described third example of the first embodiment.

Advantages of the second embodiment are as follows: a frame memory for one frame can be reduced compared with the first embodiment; the time it takes for an input image to be stored in a frame memory can be shortened; and the configuration of the motion vector detector 15 can be simplified, and hence reduction in the circuit scale and costs can be achieved.

In recent years, emphasis has been also put on shortening the processing time, to say nothing of the memory reduction. When a moving image is treated in particular, the shortening of the processing time directly leads to shortening of system delay. It greatly appeals to users to eliminate, as much as possible, a sense of incongruity between an actual object and the image thereof on a display panel, arising due to the system delay.

Device for Correcting Distortion in Captured Image According to Third Embodiment In the first and second embodiments, the motion vector detector 15 fixedly defines a search range that allows detection of a remaining motion vector resulting from insufficiency in correction through optical camera shake correction, with taking into consideration the performance of the optical camera shake correction.

Therefore, a comparatively large search range needs to be defined because there is a need to take the following factors into consideration: the maximum magnitude of the remaining motion vector resulting from insufficiency in correction through the optical camera shake correction; feedback delay in the optical camera shake correction; error in detection of a camera shake motion vector due to error in the gyro sensor 7 itself; and a predetermined margin.

A third embodiment improves upon this problem. The third embodiment can be applied to both the first and second embodiments. The following description relates to an example in which it is applied to the second embodiment.

Figure 41:
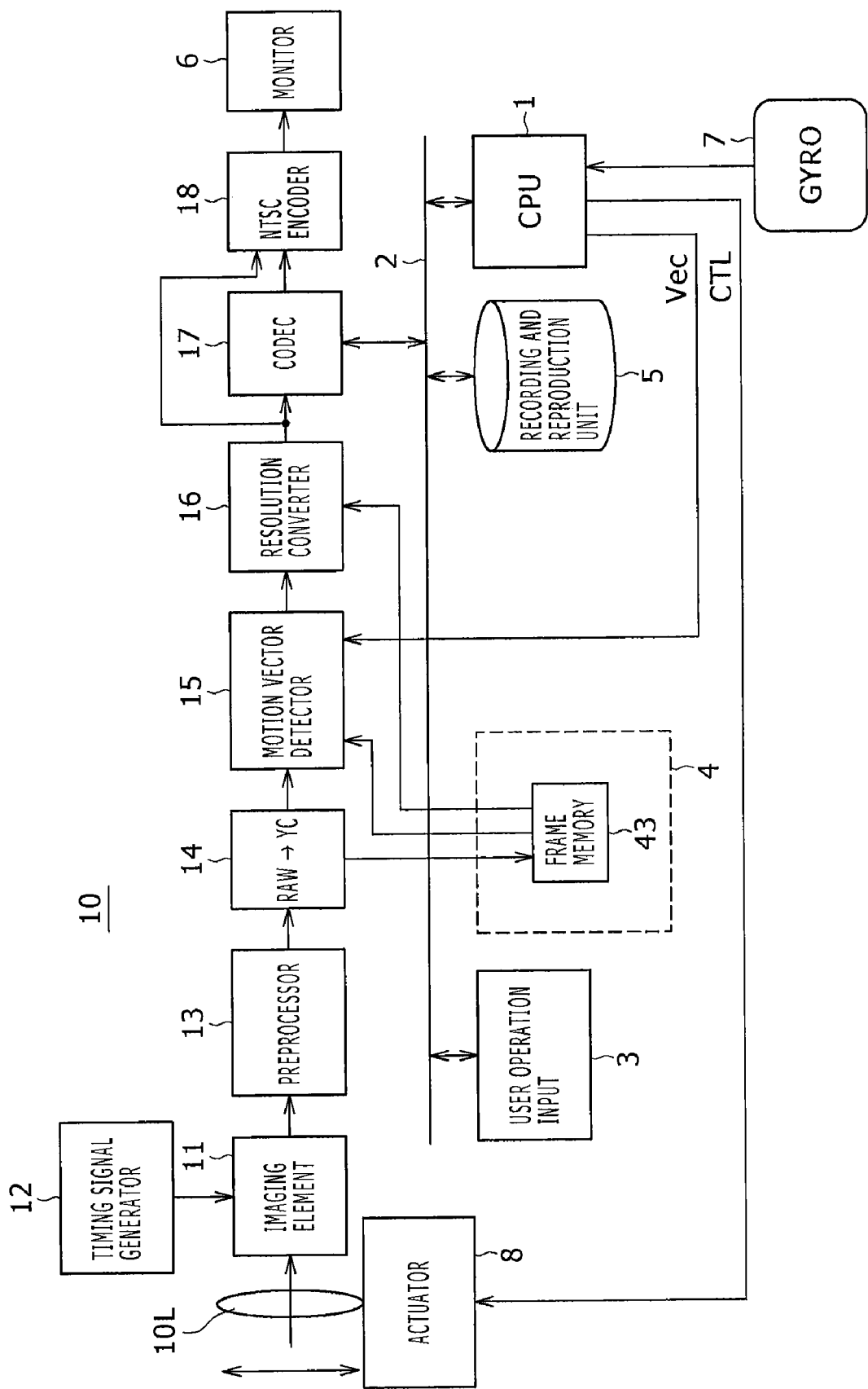
FIG. 41 is a block diagram showing a configuration example of an imaging device to which a method for correcting distortion of a captured image according to a third embodiment of the invention is applied.

FIG. 41 is a block diagram showing one example of an imaging device to which the third embodiment is applied. The same parts in FIG. 41 as those in the imaging device shown in FIG. 33, to which the second embodiment is applied, are given the same numerals.

Also in this third embodiment, a CPU 1 detects a motion vector (camera shake vector) dependent upon a caused camera shake based on a detection output from a gyro sensor 7, and produces an optical camera shake correction signal CTL from the detected motion vector. Furthermore, in this third embodiment in particular, the CPU 1 supplies a motion vector detector 15 with information Vec on the motion vector detected from the detection output by the gyro sensor 7.

The motion vector detector 15 in the third embodiment does not fixedly define a search range for motion vector detection unlike the first and second embodiments, but dynamically defines the search range with reference to the motion vector information Vec supplied from the CPU 1.

As described above, in the defining of the search range, there is a need to take into consideration the size of a camera shake motion vector detected by the gyro sensor 7 and feedback delay in an optical camera shake correction mechanism based on an actuator 8.

This is because the feedback delay causes a possibility that the camera shake motion vector that is a detection output from the gyro sensor 7 at the timing when captured image data read out from an imaging element 11 has been obtained is different from the camera shake motion vector serving as the source to produce the optical camera shake correction signal, and the difference in the camera shake motion vector is included in a motion vector detected by the motion vector detector 15.

That is, due to the existence of the feedback delay, the optical camera shake correction is carried out not for the camera shake vector that is actually generated at the timing of this optical correction, but for the camera shake vector at the timing previous to the optical correction timing by the feedback delay time. This results in a state where image distortion dependent upon the difference in the camera shake vector across the delay time is left in image data from the imaging element 11.

The feedback delay is generally a fixed time amount, and can be measured or can be estimated as a predetermined delay time. Therefore, if the motion vector detector 15 can find the size of the camera shake vector detected based on a detection output from the gyro sensor 7 at two timings: the timing (present timing) T1 when image data for which a motion vector is to be detected has been obtained from the imaging element 11; and the timing T2 previous to the timing T1 by the feedback delay time, the difference in the camera shake motion vector due to the feedback delay can be detected as the difference in the size between the timings T1 and T2.

Furthermore, if the motion vector detector 15 can detect the difference in the camera shake motion vector due to the feedback delay and the size of the camera shake motion vector based on a detection output from the gyro sensor 7 at the present timing, the motion vector detector 15 can properly define the size of the necessary search range.

Based on the above-described features, the motion vector detector 15 of the third embodiment refers to the camera shake motion vector information Vec from the CPU 1 to thereby detect the difference in the camera shake motion vector due to the feedback delay and the size of the camera shake motion vector based on a detection output from the gyro sensor 7 at the present timing, and define a search range based on the detection result.

As described above, in the third embodiment, the motion vector detector 15 can define the minimum necessary search range for detection of a motion vector from captured image data by referring to the camera shake motion vector information Vec from the CPU 1. Therefore, according to the third embodiment, the scale of an SAD table can be further decreased. Furthermore, a camera shake vector with high accuracy can be detected, which allows highly accurate camera shake correction.

A processing operation example of the motion vector detector 15 in the third embodiment will be described below with reference to the flowchart of FIGS. 42 and 43.

Specifically, in the motion vector detector 15 of the third embodiment, initially an SAD arithmetic processing engine 152 refers to the camera shake motion vector information Vec from the CPU 1 to thereby detect the difference in the camera shake motion vector due to feedback delay and the size of the camera shake motion vector based on a detection output from the gyro sensor 7 at the present timing. Subsequently, the motion vector detector 15 determines a search range with taking into consideration the detected difference in the camera shake motion vector due to the feedback delay, the size of the camera shake motion vector based on a detection output from the gyro sensor 7 at the present timing, the accuracy of the gyro sensor 7, a predetermined margin, and so on (step S301).

The step S301 is followed by execution of the processing of the steps S201 to S210 and S221 to S227 in the flowchart of FIGS. 39 and 40, shown in the above-described processing operation example of the motion vector detector 15 in the second embodiment.

Figure 42:
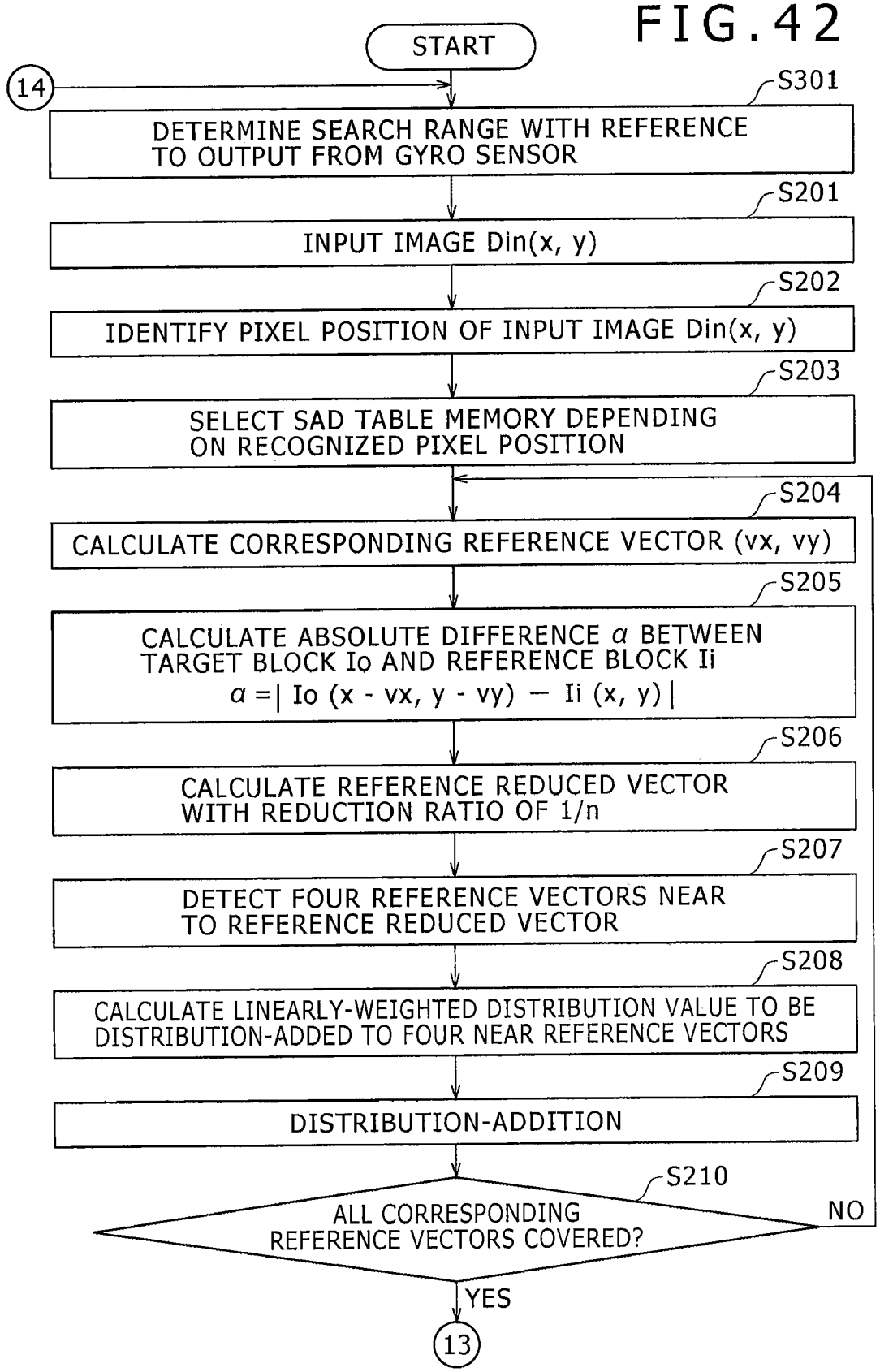
FIG. 42 is a part of a flowchart for explaining an example of motion vector detection processing of the imaging device of the third embodiment.
Figure 43:
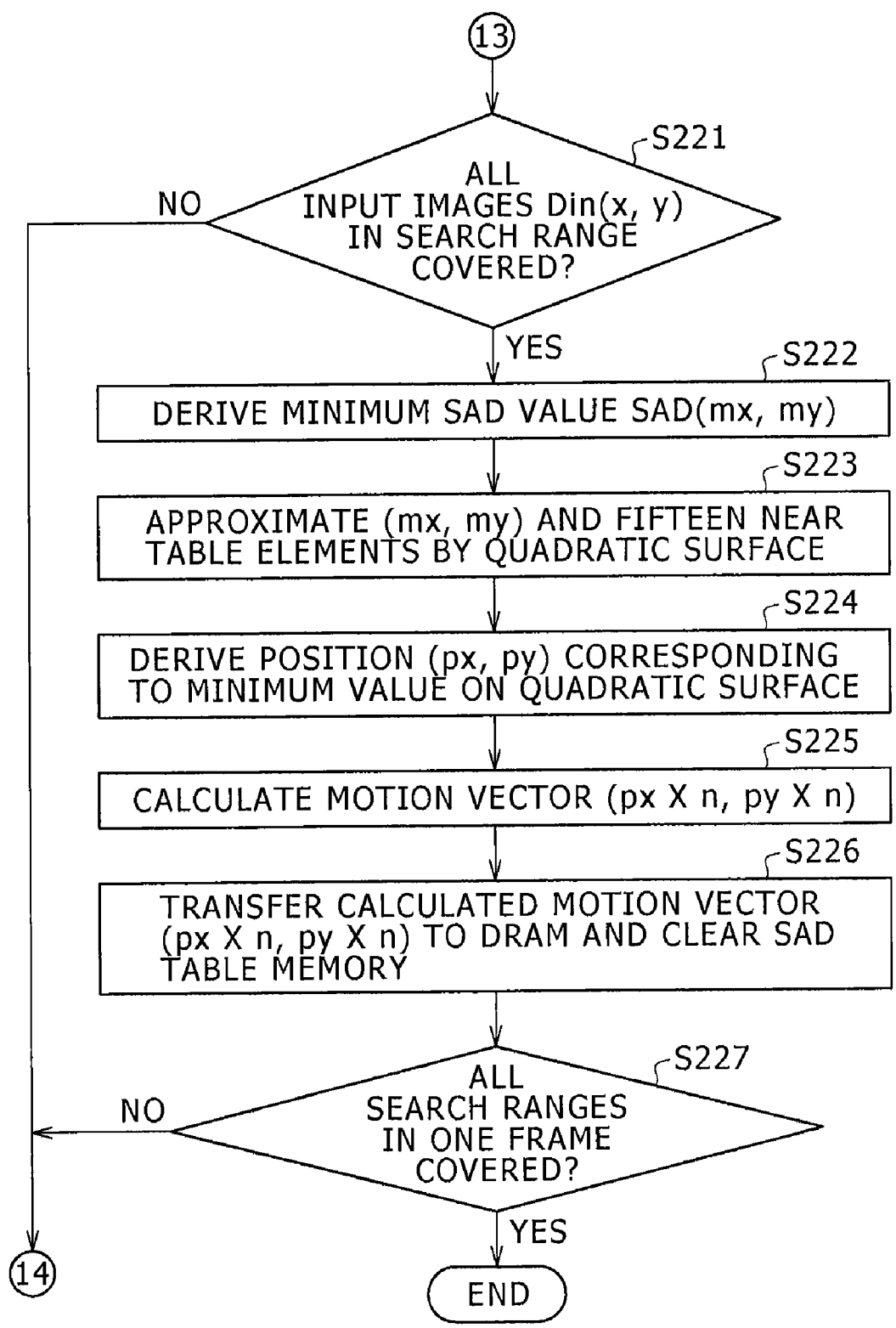
FIG. 43 is a part of the flowchart for explaining the example of the motion vector detection processing of the imaging device of the third embodiment.

In this example, if it is determined in the step S227 that the one frame includes a search range yet to be processed, the processing sequence returns to the step S301 in FIG. 42, where the motion vector detector 15 defines a search range with referring to the camera shake motion vector information Vec from the CPU 1 again. Subsequently, the processing of the steps S201 to S210 and S221 to S227 is repeated.

In contrast, if it is determined in the step S227 that the processing for all the search ranges in the one frame has been completed, this processing routine is ended.

In this example, the motion vector detector 15 defines search ranges with referring to the motion vector information Vec from the CPU 1 on each search range basis. However, it should be obvious that the defining of search ranges may be carried out on each one frame basis. In this case, if it is determined in the step S227 in FIG. 43 that the one frame includes a search range yet to be processed, the processing sequence returns to the step S201 in FIG. 42.

Device for Correcting Distortion in Captured Image According to Fourth Embodiment In the above-described embodiments, image distortion due to a camera shake or the like resulting from insufficiency in correction through optical camera shake correction is removed by using a motion vector detected from image data from an imaging element by the motion vector detector 15. Therefore, the above-described embodiments should use image data of at least two frames for the motion vector detection, and hence should include a frame memory.

A fourth embodiment is configured so that remaining image distortion resulting from insufficiency in optical camera shake correction can be reduced without using the above-described motion vector detector 15, and in particular, by using image data in one frame.

Figure 44:
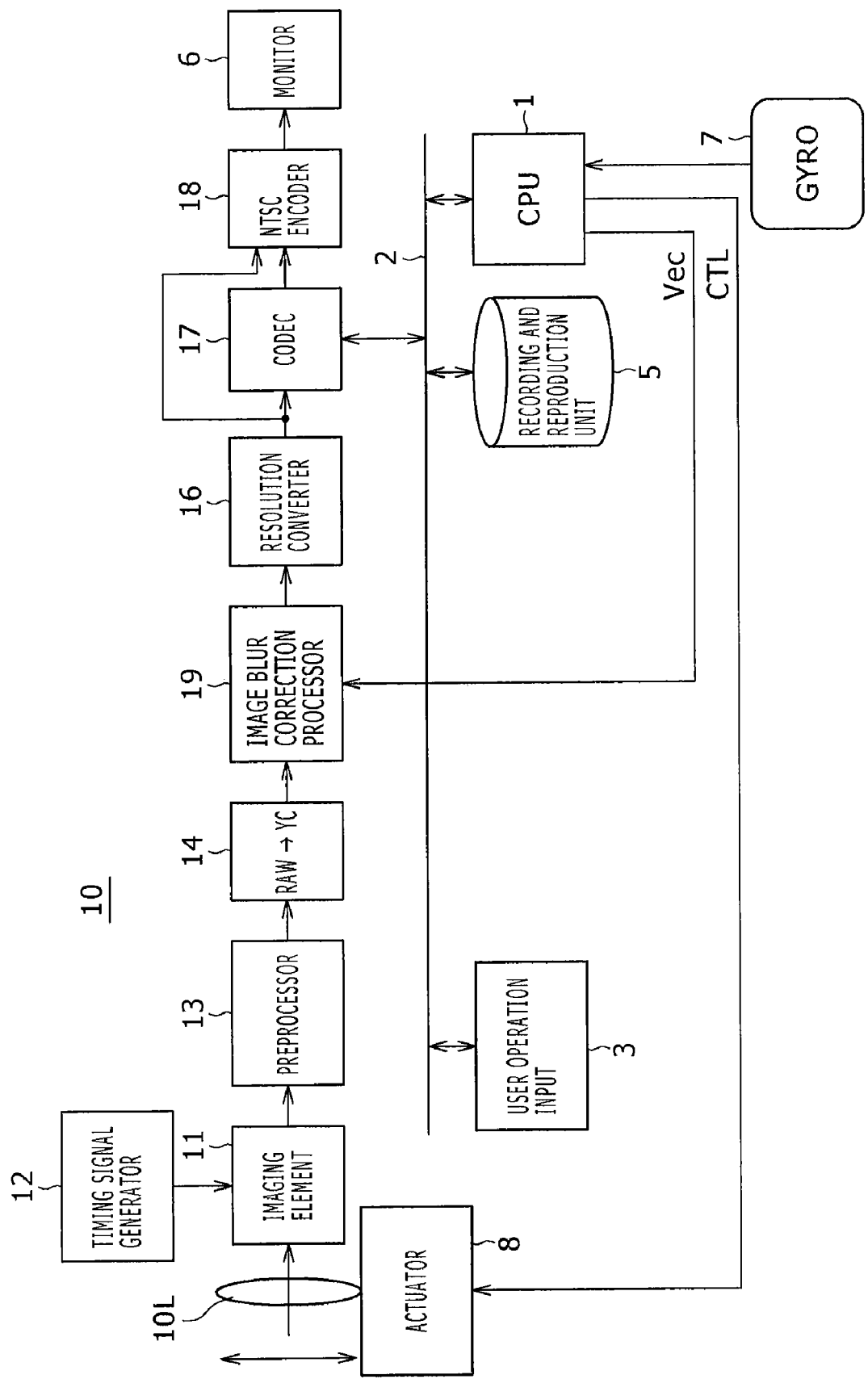
FIG. 44 is a block diagram showing a configuration example of an imaging device to which a method for correcting distortion of a captured image according to a fourth embodiment is applied.

FIG. 44 is a block diagram showing a configuration example of an imaging device according to the fourth embodiment. The same parts in FIG. 44 as those in the configuration examples of the imaging devices according to the above-described embodiments are given the same numerals, and detailed description thereof will be omitted.

In the fourth embodiment, as shown in FIG. 44, an image blur correction processor 19 is provided instead of the motion vector detector 15, and image data composed of a luminance signal component and color signal components from a data converter 14 is supplied to the image blur correction processor 19. The fourth embodiment requires no image memory 4. The image blur correction processor 19 includes an image buffer (not shown) for correcting an image blur.

When an image based on image data from the data converter 14 includes remaining image distortion resulting from insufficiency in correction through the above-described optical camera shake correction, the image blur correction processor 19 executes processing of converting the image data including the remaining camera shake (image motion blur) into image data that offers an image free from the camera shake, i.e., an image for which the image motion blur has been corrected.

The correction processing by the image blur correction processor 19 is disclosed in detail in e.g. Japanese Patent Laid-open No. 2001-250119 and Japanese Patent Laid-open No. 2005-328117, and therefore detailed description thereof will be omitted.

In the fourth embodiment, the image blur correction processor 19 is supplied with camera shake motion vector information Vec produced by a CPU 1 based on a detection output from a gyro sensor 7. In this embodiment, the image blur correction processor 19 refers to the camera shake motion vector information Vec. Based on the reference result, if a camera shake motion vector larger than a predetermined magnitude exists, the image blur correction processor 19 executes image blur correction processing. If such a camera shake motion vector does not exist, the image blur correction processor 19 does not execute the image blur correction processing but supplies the captured image data to a resolution converter 16 as it is.

It should be appreciated that in the image blur correction processing, the image blur correction processor 19 may take into consideration the difference between the latest camera shake motion vector and the camera shake motion vector at the timing previous to the timing of the latest motion vector by the above-described feedback delay time of the optical camera shake correction, with reference to the camera shake motion vector information Vec.

Figure 45:
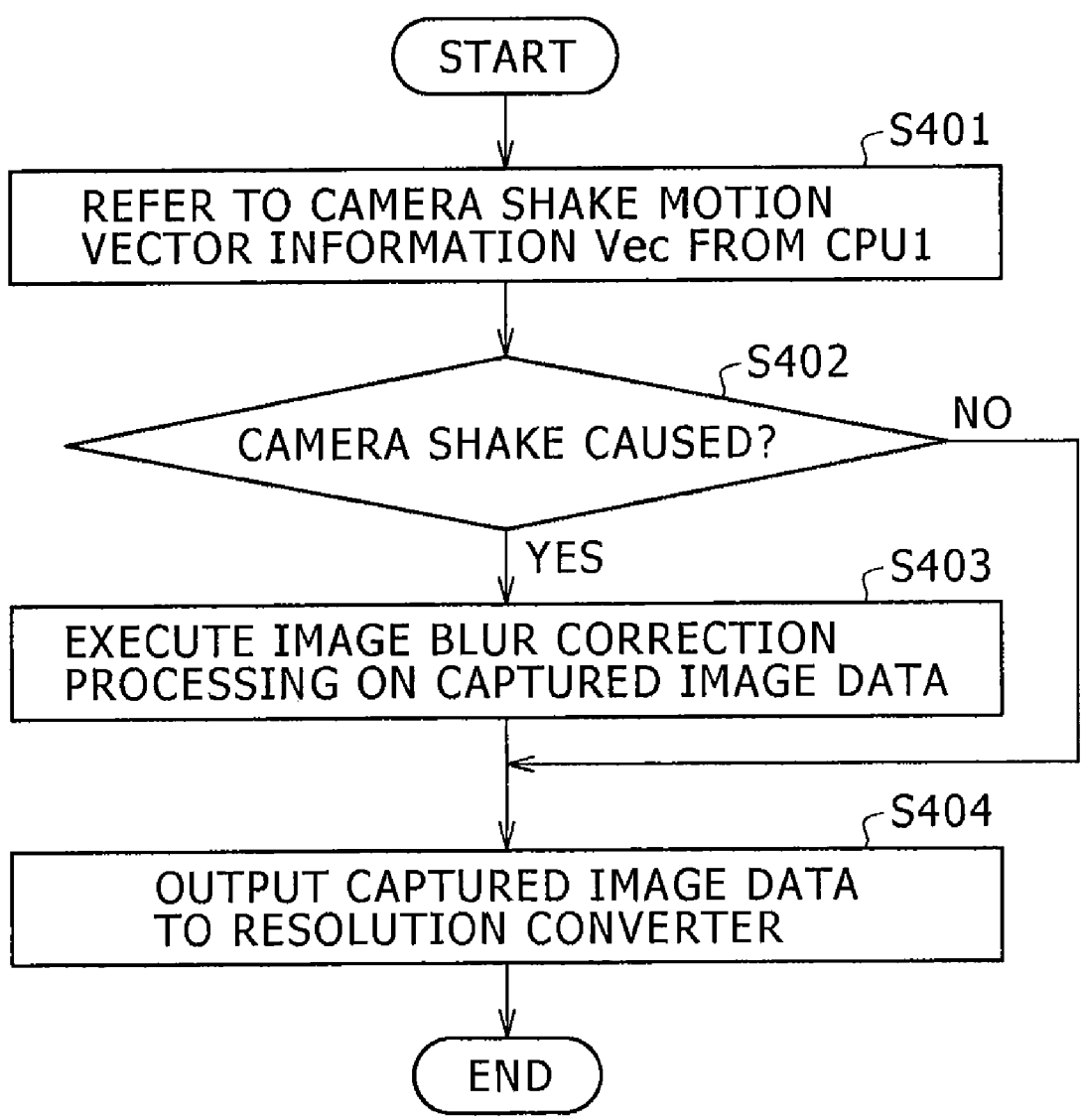
FIG. 45 is a flowchart for explaining a processing operation example of an image blur correction processor in the imaging device of the fourth embodiment.
Figure 46A:
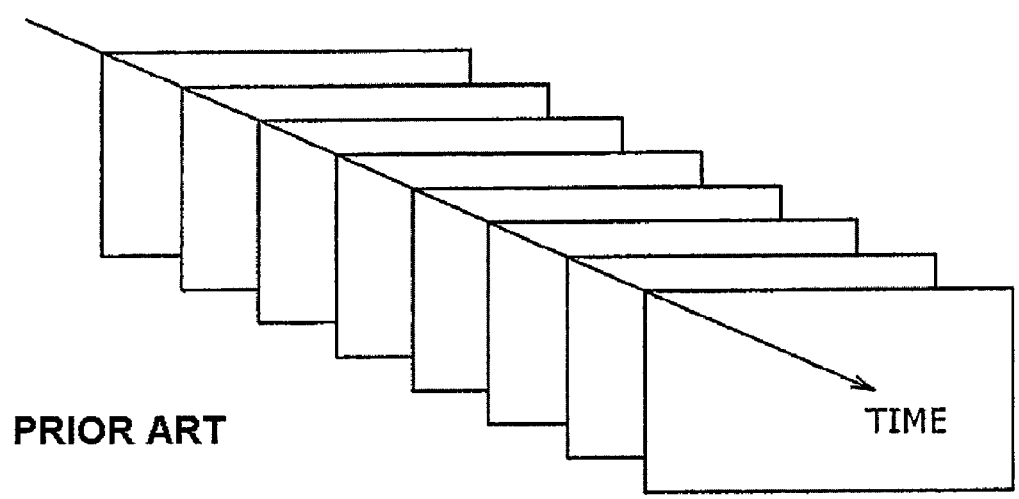
FIGS. 46A and 46B are diagrams for explaining an inter-frame camera shake in a captured image.
Figure 46B:
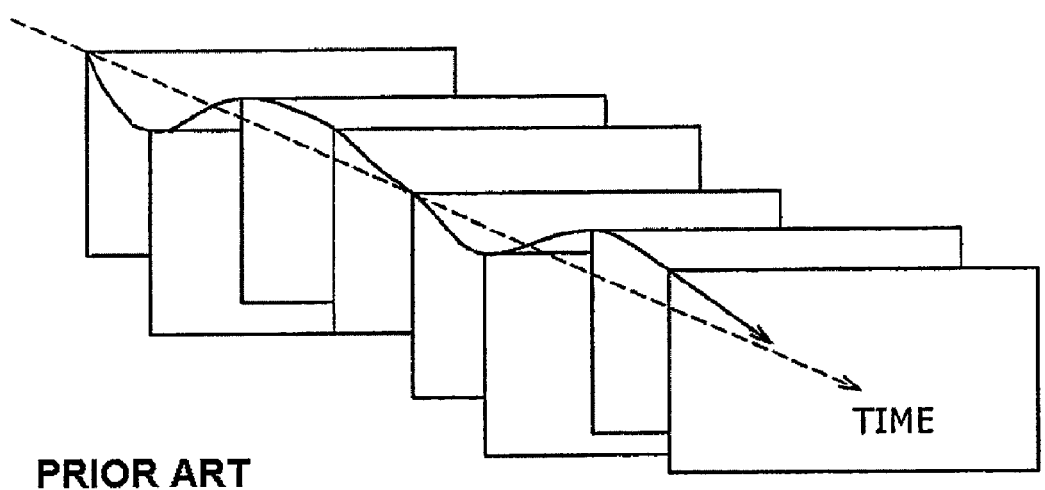

FIG. 45 is a flowchart showing a processing operation example of the image blur correction processor 19 in the fourth embodiment. In this example, the image blur correction processor 19 refers to the camera shake motion vector information Vec from the CPU 1. Based on the reference result, if a camera shake motion vector larger than a predetermined magnitude exists, the image blur correction processor 19 executes image blur correction processing. If such a camera shake motion vector does not exist, the image blur correction processor 19 does not execute the image blur correction processing but supplies the captured image data to a resolution converter 16 as it is.

Specifically, in the example of FIG. 45, initially the image blur correction processor 19 refers to the camera shake motion vector information Vec from the CPU 1 (step S401). Subsequently, the image blur correction processor 19 determines whether or not a camera shake larger than a predetermined magnitude is caused, depending on the reference result (step S402). The term "predetermined magnitude" means the magnitude of a motion vector that can be regarded as a camera shake vector. If the detected motion vector is too small to result in acknowledgement of occurrence of a camera shake, the image blur correction processing is not executed, so that the burden of the processing is reduced.

If it is determined in the step S402 that a camera shake larger than a predetermined magnitude is caused, the image blur correction processor 19 executes the image blur correction processing on the captured image data (step S403). Subsequently, the image data resulting from the image blur correction processing is output to the resolution converter 16 (step S404).

If it is determined in the step S402 that a camera shake larger than a predetermined magnitude is not caused, the image blur correction processor 19 outputs the image data to the resolution converter 16 without executing the image blur correction processing (step S404).

According to the fourth embodiment, there is no need to provide an image memory 4, which allows a further simplified configuration of an imaging device and contributes to cost reduction.

Other Embodiments and Modifications

The above-described embodiments relate to correction of image distortion due to a camera shake caused by a user who is operating the imaging device. However, it should be appreciated that the correction is possible not only for a camera shake caused by a user but also for image distortion attributed to a biasing force, such as vibration, that is applied to an imaging element at the time of imaging to cause a positional change of the imaging element in the horizontal direction and/or the vertical direction of a captured image thereof.

The present embodiments can be applied not only to imaging devices (cameras) but also to e.g. cell phone terminals and portable information terminals that are equipped with an imaging element to capture images. Furthermore, the embodiments can be applied not only to devices that are held by a user's hand at the time of imaging, but also to stationary devices such as personal computers and video telephones that possibly vibrate due to application of an external force thereto, and vehicles equipped with an imaging element to capture images.

In the first to third embodiments, the reduction ratio of a reference vector about the horizontal direction is made identical to that about the vertical direction by the motion vector detector 15. Alternatively, the reference vector reduction ratios about the horizontal and vertical directions may be made different from each other.

In the first to third embodiments, SAD values may be obtained about all the pixels in a reference block and a target block. Alternatively, SAD values may be obtained by using e.g. only every k-th pixel (k is a natural number) as described above.

The motion vector detector 15 of the second embodiment for real-time processing often executes SAD calculation in which a reference block is searched for points corresponding to representative points in a target block for the purpose of reduction in calculation costs and processing time. Also in other embodiments, a large degree of memory reduction can be achieved if representative points in the respective blocks in a frame image are stored in a frame memory in which an original frame is stored. In addition, a small-scale memory for representative points may be included as a local memory separately from a frame memory, for reduction in the band of the global memory (DRAM).

In the first to third embodiments, pixel difference values and SAD values are calculated by using only pixel luminance values Y. Alternatively, not only luminance values Y but also color difference components Cb/Cr may be used to detect a motion vector. Moreover, the motion vector detection processing may be executed on RAW data before conversion of the RAW data into a luminance component Y and color difference components Cb/Cr by the data converter 14.

The above description relates to a novel method in which the size of a reference vector is reduced in SAD arithmetic processing. However, it should be obvious that the existing SAD arithmetic processing described with FIGS. 47 to 50 can be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for correcting distortion of a captured image, the method comprising:
   receiving a detection output from a sensor that detects a change corresponding to a positional change of an imaging element in a horizontal direction and/or a vertical direction of a captured image at the time of imaging;
   optically correcting distortion of a captured image in image data from the imaging element due to the positional change of the imaging element by controlling a control mechanism depending on the detection output received from the sensor in the detection output receiving step, the control mechanism being configured to control a position at which incident light from a target object enters the imaging element;
   receiving image data resulting from the optical correction of a captured image in the correcting step from the imaging element, and detecting a motion vector per one screen of a captured image from the image data; and
   further correcting distortion of a captured image due to the positional change of the imaging element for the image data from the imaging element based on the motion vector detected in the motion vector detecting step,
   wherein when detecting the motion vector,
   at least one target block that is composed of a plurality of pixels and has a predetermined size is defined at a predetermined position in each of divided image regions in an original screen,
   a plurality of reference blocks each having the same size as the size of the target block are defined in a search range defined in a reference screen that is a screen of interest,
   a reference block having a strong correlation with the target block is detected from the plurality of reference blocks, and
   the motion vector is detected based on an amount of a position shift on a screen between the detected reference block and the target block,
   wherein detecting the motion vector includes:
   obtaining a sum of an absolute difference between a pixel value of each pixel in the reference block and a pixel value of a pixel at a corresponding position in the target block;
   obtaining a reference reduced vector arising from reduction in a size of a reference vector by a predetermined reduction ratio, the reference vector indicating an amount and a direction of a position shift between a position of the reference block on the reference screen and a position of the target block on a screen;
   creating a reduced sum-of-absolute-difference table in which values obtained based on a sum of an absolute difference about each of the reference blocks are stored as a plurality of table elements, the number of the table elements being obtained by reducing the number of the reference blocks depending on the predetermined reduction ratio, the table elements each having an address indicated by a reference vector with a size near or equivalent to a size of a reference reduced vector; and
   calculating a motion vector that corresponds to a difference between the reference screen and the original screen for each of the divided image regions by using at least a reference vector corresponding to a minimum value among the values stored in the reduced sum of absolute difference table, and
   creating the table includes:
   detecting a plurality of reference vectors near to the reference reduced vector obtained in the reference reduced vector obtaining step, as a plurality of near reference vectors;
   calculating distribution values, each corresponding to a respective one of the near reference vectors detected in the detecting step from the sum of an absolute difference calculated in the sum of absolute difference obtaining step; and
   adding the distribution values calculated in the distribution value calculating step to previous values in the reduced sum-of-absolute difference table each corresponding to a respective one of the near reference vectors.

2. The method for correcting distortion of a captured image according to claim 1, wherein
   in the motion vector detecting step, the motion vector is detected after the search range is defined with reference to a detection output from the sensor.

3. An imaging device comprising:
   a sensor configured to detect a positional change of an imaging element in a horizontal direction and/or a vertical direction of a captured image at the time of imaging;
   an optical corrector configured to optically correct distortion of a captured image in image data from the imaging element due to the positional change of the imaging element by controlling a control mechanism depending on a detection output from the sensor, the control mechanism being configured to control a position at which incident light from a target object enters the imaging element;

a motion vector detector configured to receive image data resulting from the optical correction of a captured image from the imaging element and detect a motion vector per one screen of a captured image from the image data;

an image distortion correction processor configured to further correct distortion of a captured image due to the positional change of the imaging element for the image data from the imaging element based on the motion vector detected by the motion vector detector; and a recorder configured to record image information of the captured image corrected by the image distortion correction processor in a recording medium, wherein:

the motion vector detector calculates a motion vector that corresponds to a difference between a reference screen that is a screen of interest and an original screen previous to the reference screen, at least one target block that is composed of a plurality of pixels and has a predetermined size is defined at a predetermined position in each of the divided image regions in the original screen, and a plurality of reference blocks each having the same size as the size of the target block are defined in a search range defined in the reference screen, a reference block having a strong correlation with the target block is detected from the plurality of reference blocks, and the motion vector is detected based on an amount of a position shift on a screen between the detected reference block and the target block, the motion vector detector includes:

a sum-of-absolute-difference calculator that obtains a sum of an absolute difference between a pixel value of each pixel in the reference block and a pixel value of a pixel at a corresponding position in the target block;

a reference reduced vector obtainer that obtains a reference reduced vector arising from reduction in a size of a reference vector by a predetermined reduction ratio, the reference vector indicating an amount and a direction of a position shift between a position of the reference block on the reference screen and a position of the target block on a screen;

a table creator that creates a reduced sum of absolute difference table in which values obtained based on a sum of an absolute difference about each of the reference blocks are stored as a plurality of table elements, the number of the table elements being obtained by reducing the number of the reference blocks depending on the predetermined reduction ratio, the table elements each having an address indicated by a reference vector with a size near or equivalent to a size of a reference reduced vector; and a motion vector calculator that calculates a motion vector corresponding to a difference between the reference screen and the original screen for each of the divided image regions by using at least a reference vector corresponding to a minimum value among the values stored in the reduced sum of absolute difference table, and wherein the table creator includes:

a near reference vector detector that detects a plurality of reference vectors near to the reference reduced vector obtained by the reference reduced vector obtainer, as a plurality of near reference vectors;

a distribution value calculator that calculates distribution values each corresponding to a respective one of the near reference vectors from the sum of an absolute difference of the reference block, calculated by the sum of absolute difference calculator; and a distribution adder that adds the distribution values each corresponding to a respective one of the near reference vectors, calculated by the distribution value calculator, to previous values in the reduced sum of absolute difference table each corresponding to a respective one of the near reference vectors.

4. The imaging device according to claim 3, wherein the motion vector detector detects the motion vector after defining the search range with reference to a detection output from the sensor.

* * * * *